(12) United States Patent
Take

(10) Patent No.: US 9,001,441 B2
(45) Date of Patent: Apr. 7, 2015

(54) IMAGING LENS, OPTICAL APPARATUS EQUIPPED THEREWITH, AND METHOD FOR MANUFACTURING IMAGING LENS

(75) Inventor: Toshinori Take, Yokohama (JP)

(73) Assignee: Nikon Corporation, Tokyo (JP)

( * ) Notice: Subject to any disclaimer, the term of this patent is extended or adjusted under 35 U.S.C. 154(b) by 639 days.

(21) Appl. No.: 13/095,755

(22) Filed: Apr. 27, 2011

(65) Prior Publication Data

US 2011/0267707 A1 Nov. 3, 2011

(30) Foreign Application Priority Data

| Apr. 28, 2010 | (JP) | 2010-104444 |
| Apr. 28, 2010 | (JP) | 2010-104450 |
| Apr. 28, 2010 | (JP) | 2010-104461 |
| Apr. 13, 2011 | (JP) | 2011-089196 |
| Apr. 13, 2011 | (JP) | 2011-089204 |
| Apr. 13, 2011 | (JP) | 2011-089211 |

(51) Int. Cl.
*G02B 9/04* (2006.01)
*G02B 13/00* (2006.01)

(52) U.S. Cl.
CPC .......... *G02B 13/0045* (2013.01); *G02B 13/006* (2013.01)

(58) Field of Classification Search
USPC .................................. 359/717, 793, 794, 740
See application file for complete search history.

(56) References Cited

U.S. PATENT DOCUMENTS

| 5,668,668 A | 9/1997 | Shibayama et al. |
| 5,706,141 A | 1/1998 | Abe |
| 5,721,642 A | 2/1998 | Shibayama et al. |
| 5,798,871 A | 8/1998 | Shibayama et al. |
| 5,917,663 A | 6/1999 | Suzuki |
| 5,999,338 A | 12/1999 | Nagahara |
| 6,016,229 A | 1/2000 | Suzuki |
| 2009/0086340 A1* | 4/2009 | Sato ............................ 359/794 |

FOREIGN PATENT DOCUMENTS

| JP | 8-220427 A | 8/1996 |
| JP | 8-304704 A | 11/1996 |
| JP | 9-189856 A | 7/1997 |
| JP | 11-52228 A | 2/1999 |
| JP | 11-211977 A | 8/1999 |
| JP | 2000-258686 A | 9/2000 |

* cited by examiner

*Primary Examiner* — Alicia M Harrington
(74) *Attorney, Agent, or Firm* — Miles & Stockbridge P.C.

(57) ABSTRACT

An imaging lens including, in order from an object side: a first lens group G1 having positive refractive power; and a second lens group G2 having positive refractive power, a position of the first lens group G1 being fixed with respect to an image plane, the second lens group G2 consisting of a plurality of lens components, and given conditional expression being satisfied, thereby providing a compact imaging lens imaging lens having a large aperture and a wide angle of view and excellent optical performance over entire image frame with excellently correcting various aberrations upon focusing on an infinity object to a close object.

25 Claims, 33 Drawing Sheets

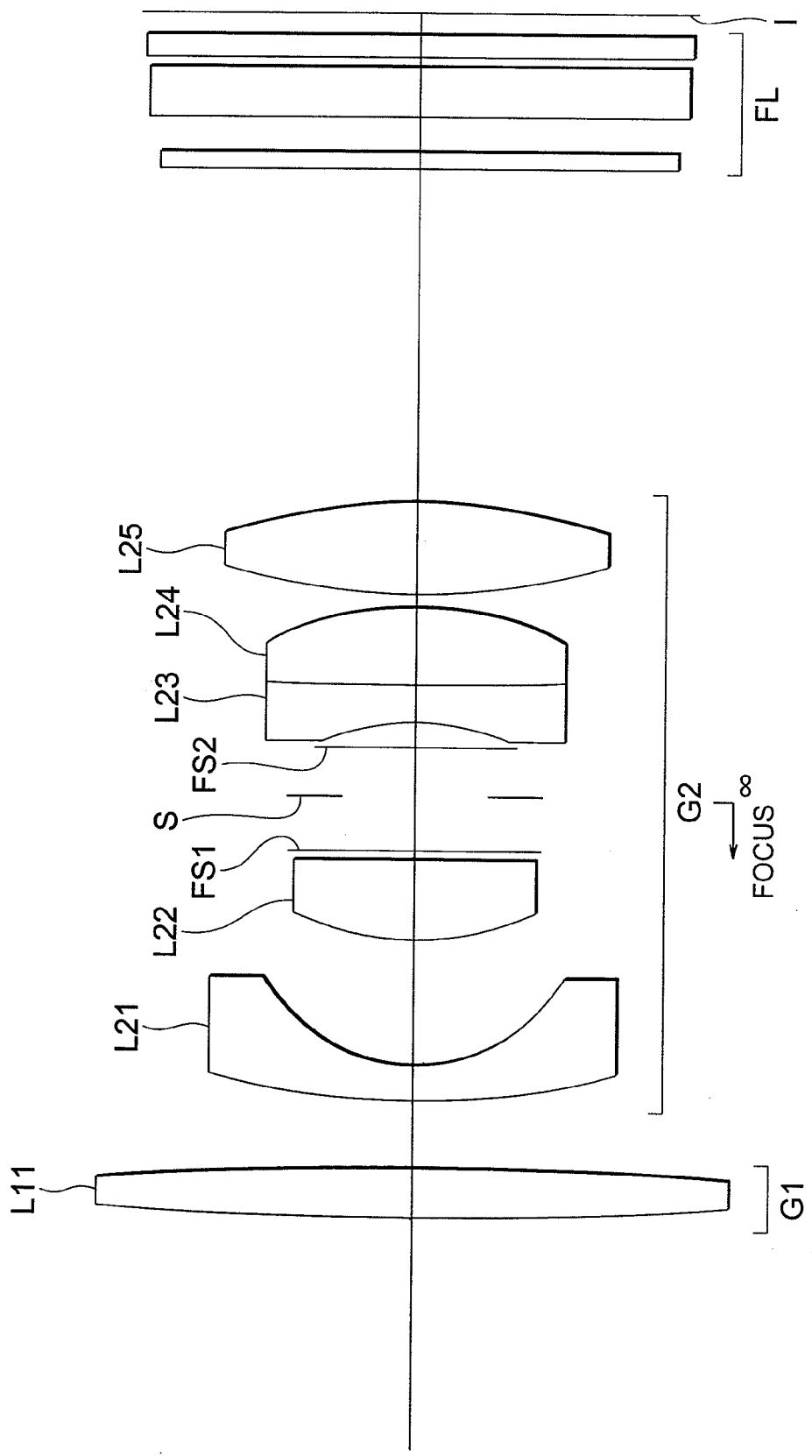

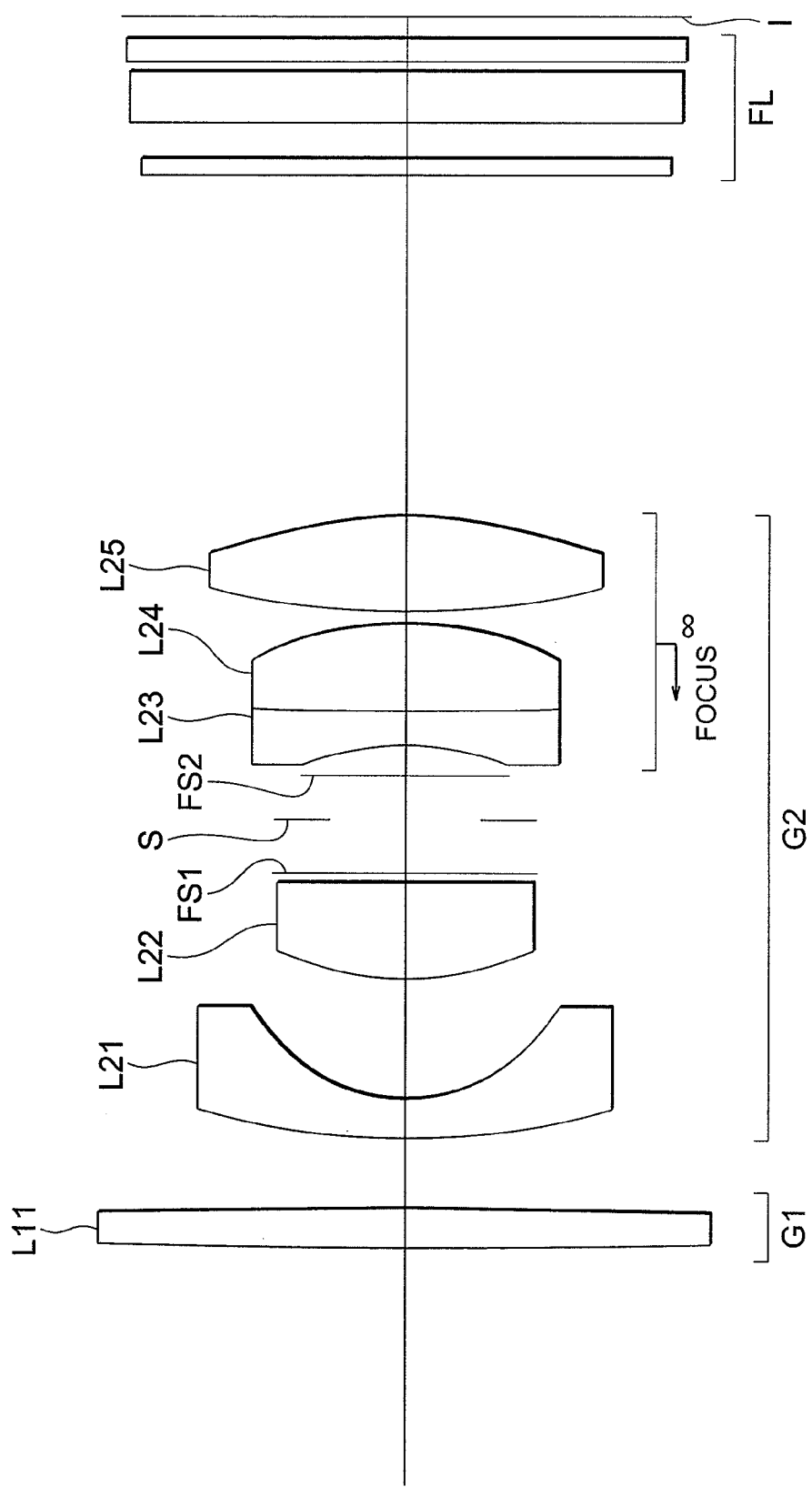

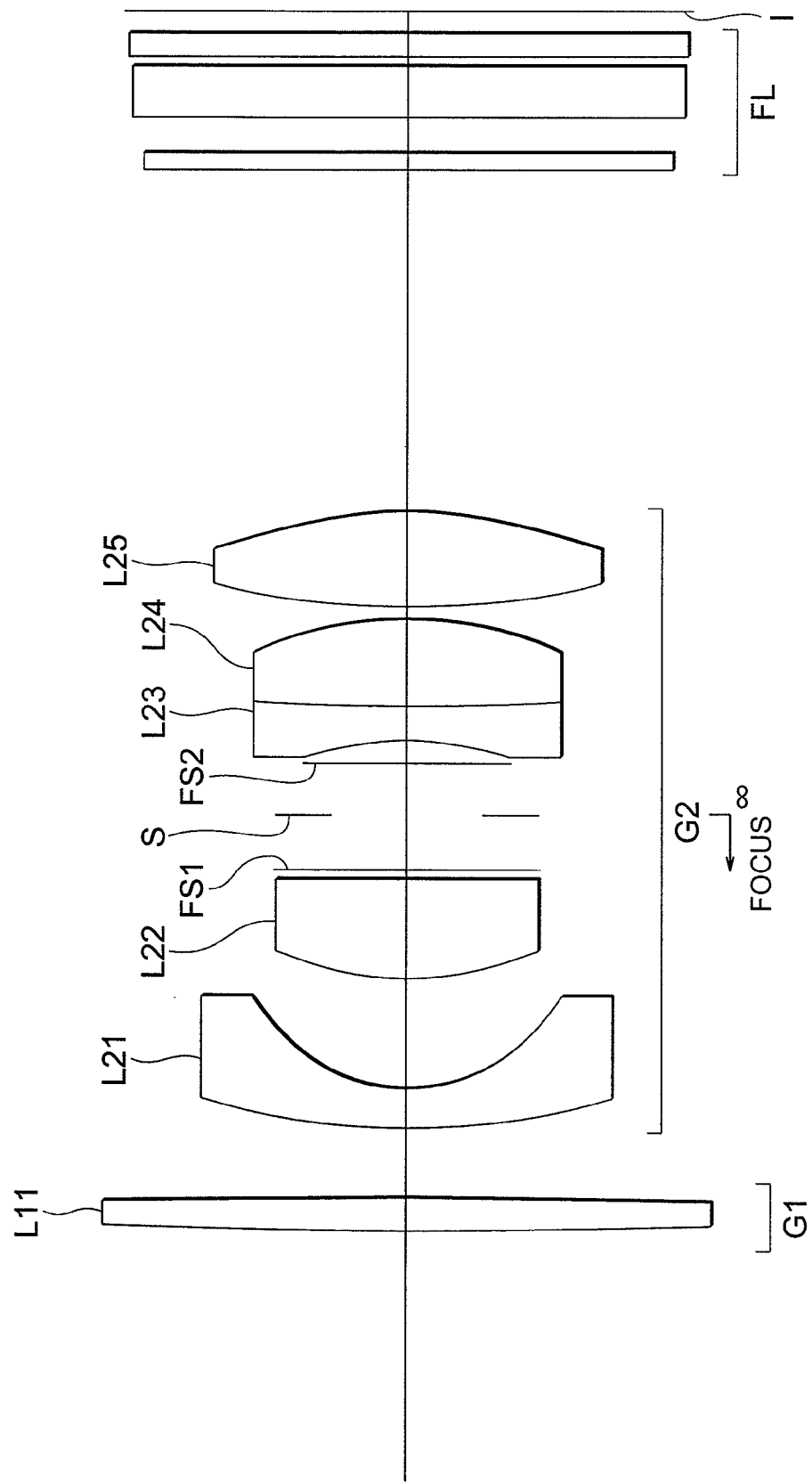

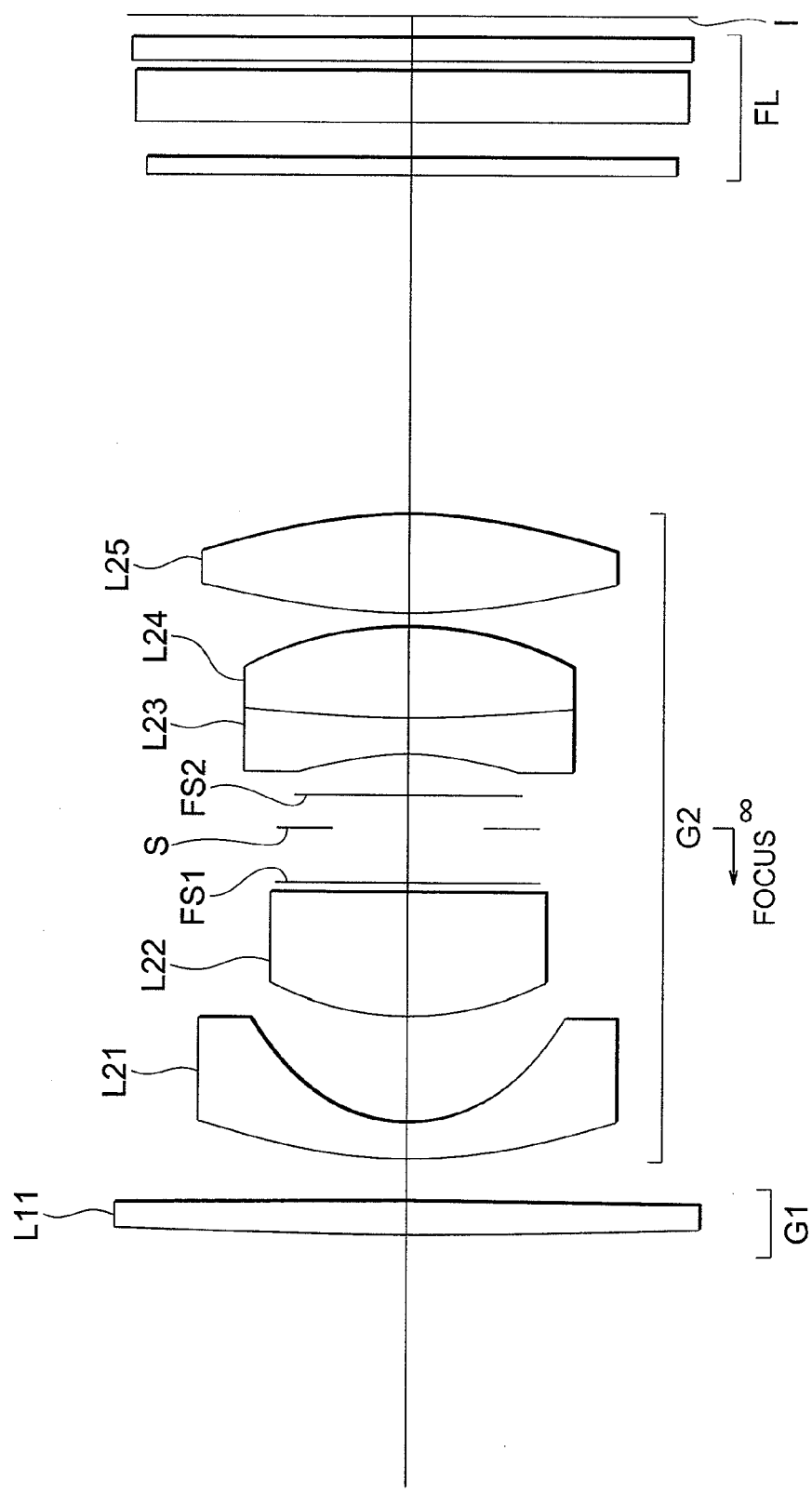

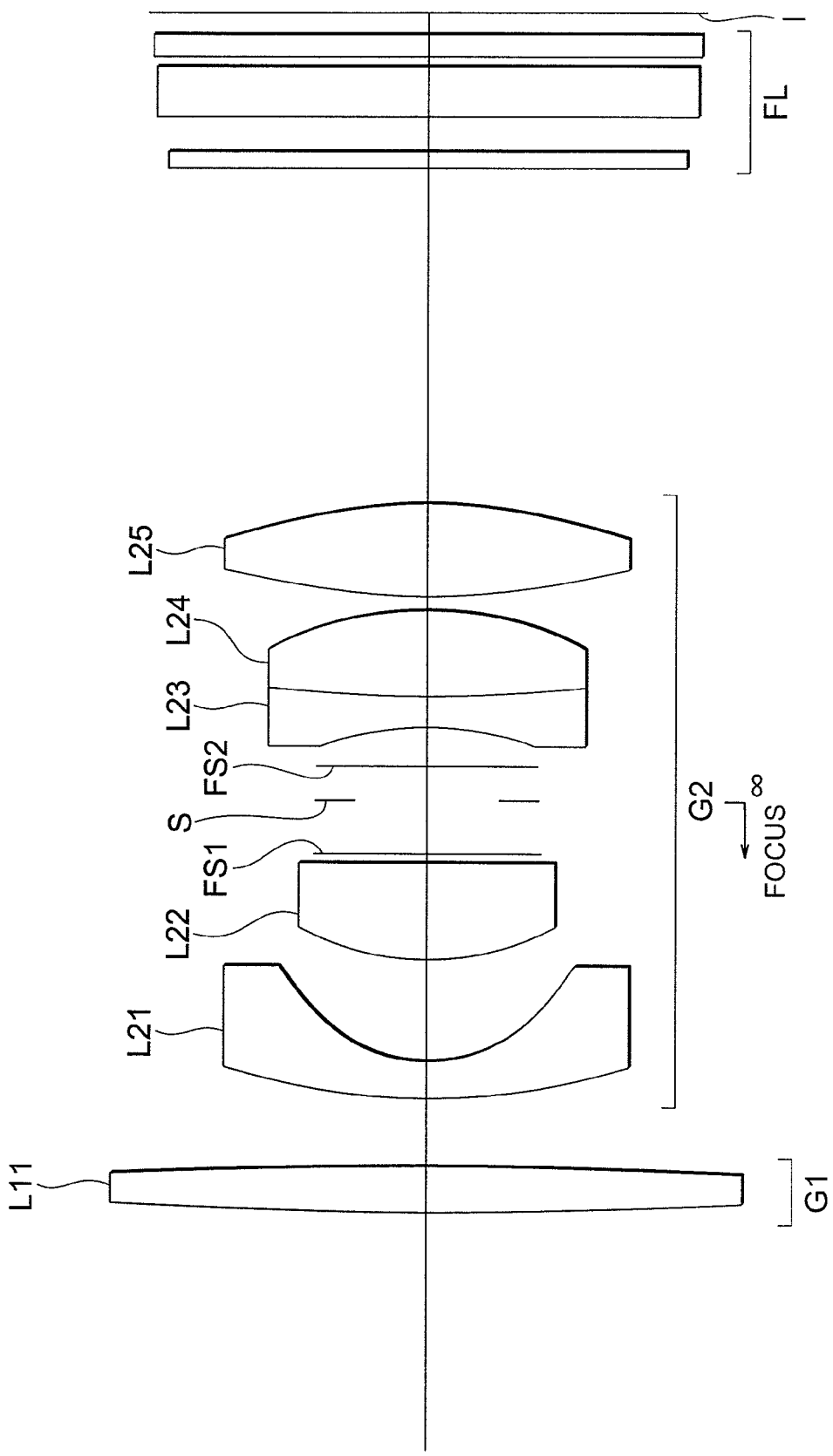

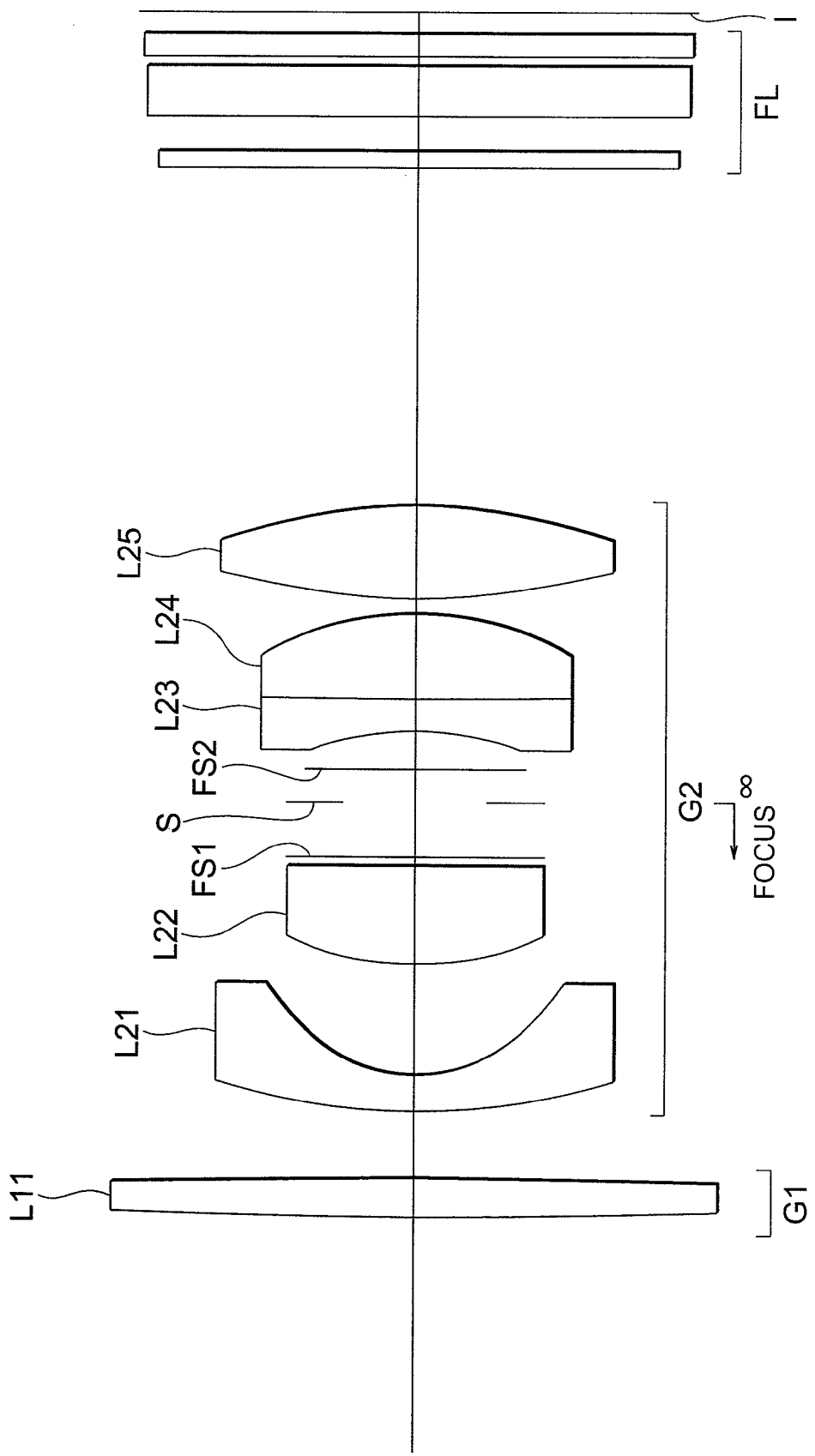

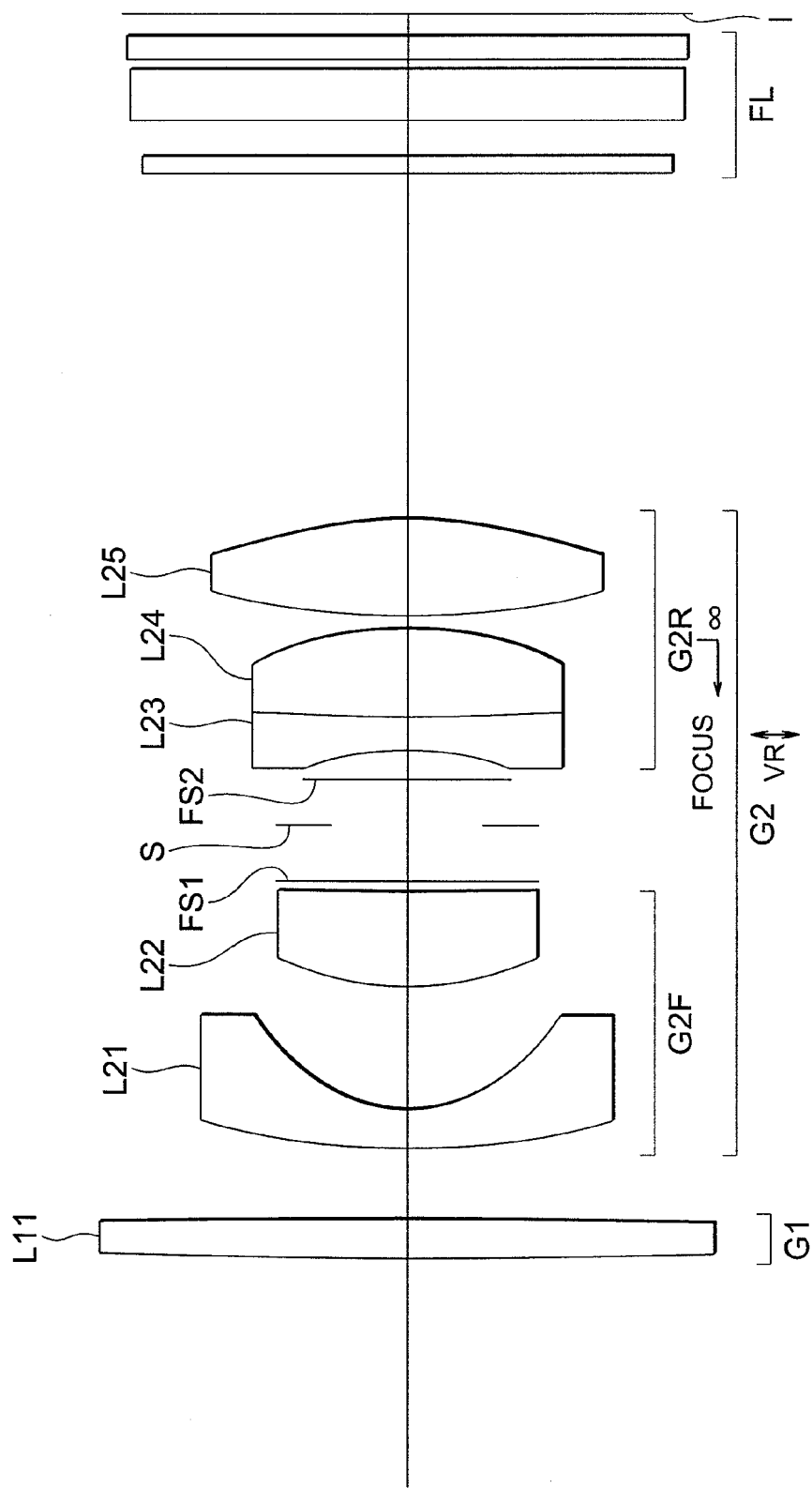

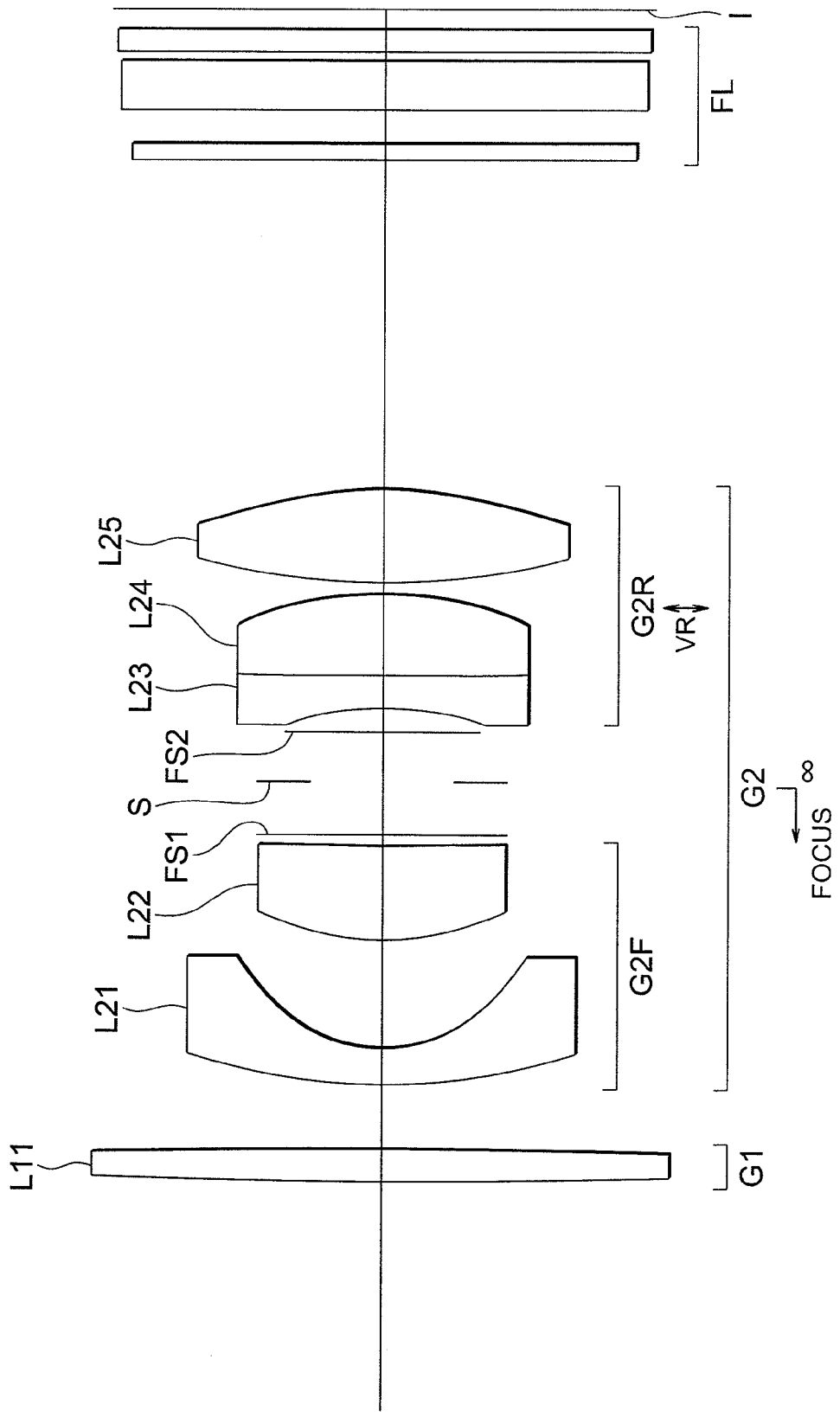

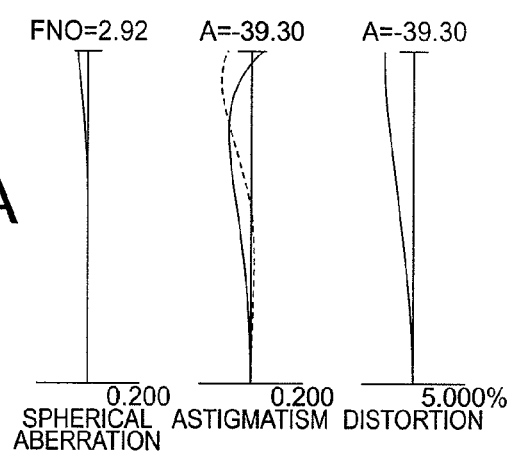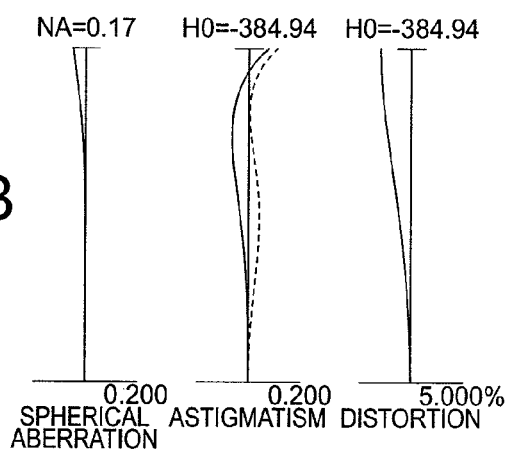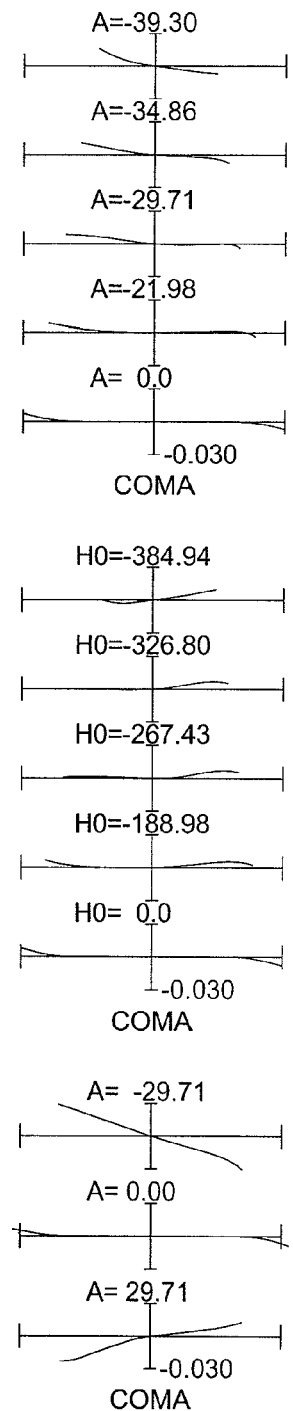

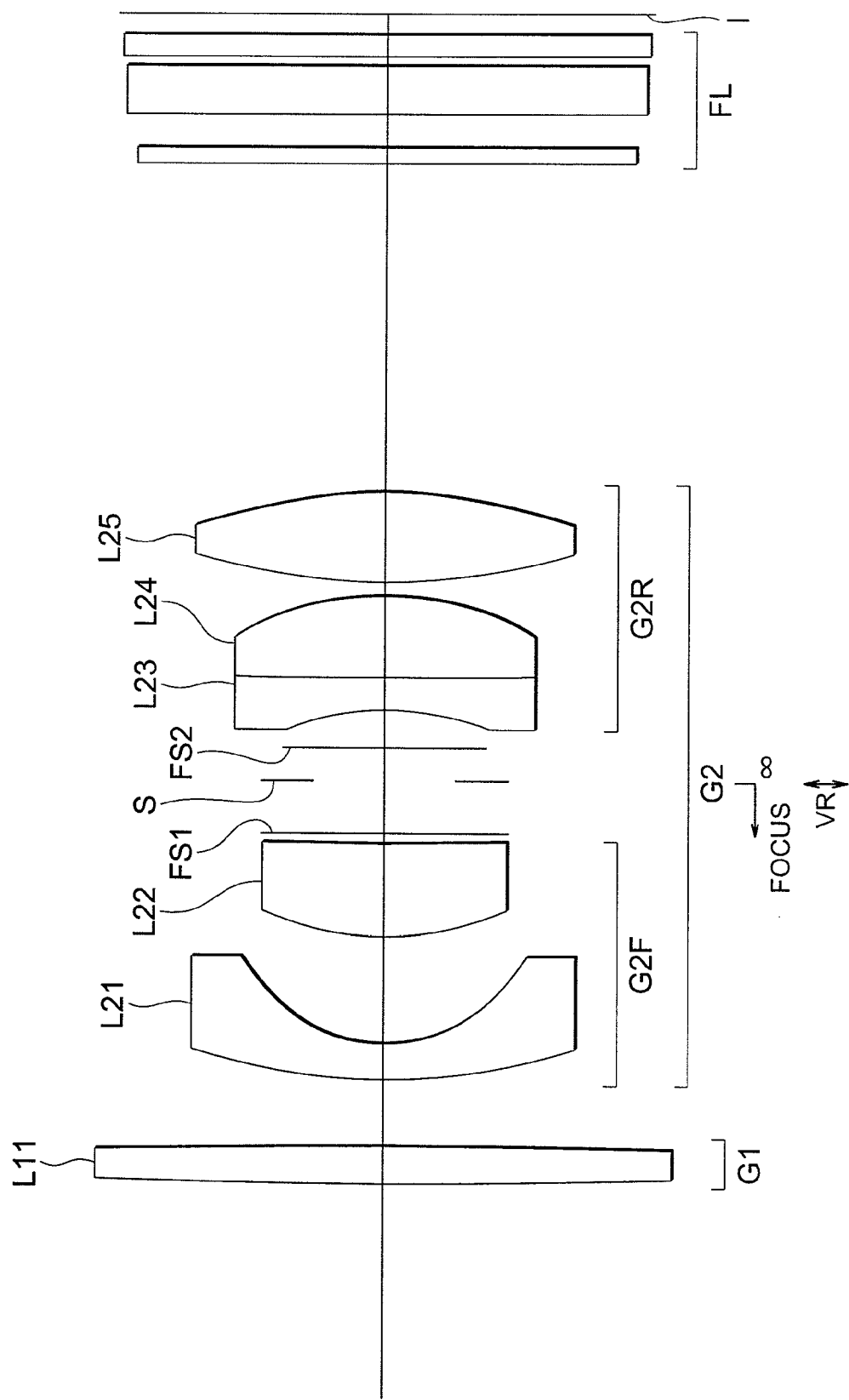

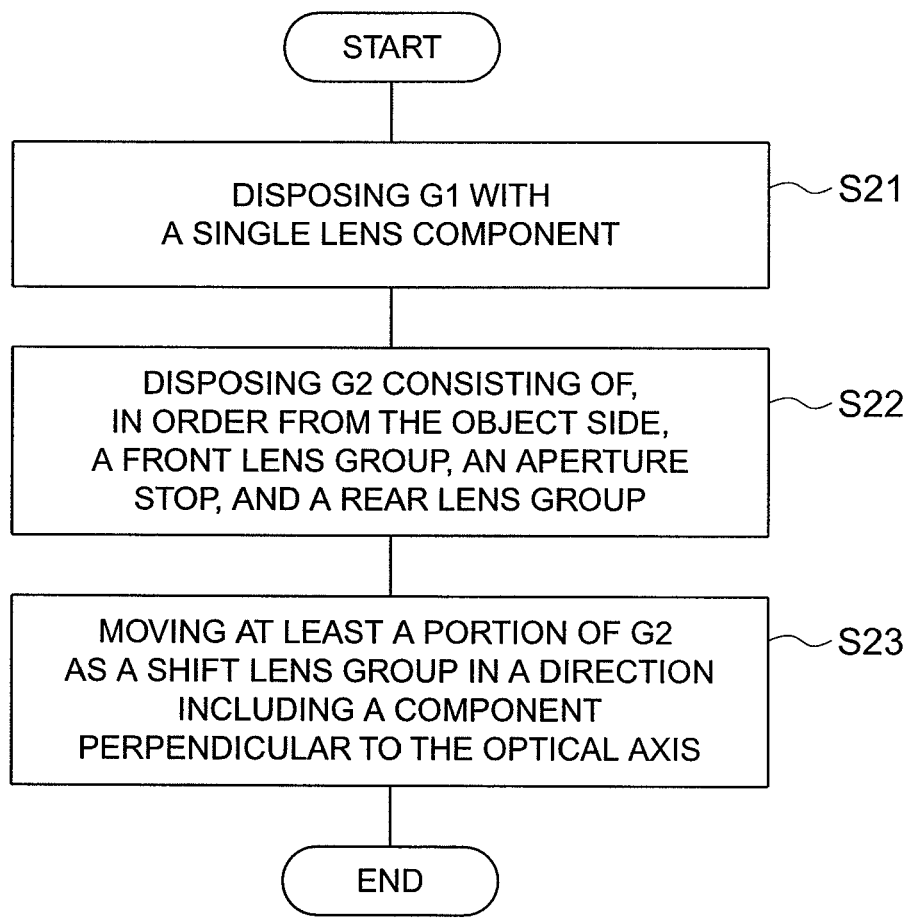

IMAGING LENS, OPTICAL APPARATUS EQUIPPED THEREWITH, AND METHOD FOR MANUFACTURING IMAGING LENS

The disclosure of the following priority applications are herein incorporated by reference:
Japanese Patent Application No. 2010-104444 filed on Apr. 28, 2010,
Japanese Patent Application No. 2010-104450 filed on Apr. 28, 2010,
Japanese Patent Application No. 2010-104461 filed on Apr. 28, 2010.
Japanese Patent Application No. 2011-089196 filed on Apr. 13, 2011,
Japanese Patent Application No. 2011-089204 filed on Apr. 13, 2011, and
Japanese Patent Application No. 2011-089211 filed on Apr. 13, 2011.

BACKGROUND OF THE INVENTION

1. Field of the Invention

The present invention relates to an imaging lens, an optical apparatus equipped with the imaging lens, and a method for manufacturing the imaging lens.

2. Related Background Art

A compact imaging lens suitable for a photographic camera, a video camera, and the like having an angle of view of about 50 degrees and relatively small value of an f-number has been proposed. Moreover, in such an imaging lens, there has been known a lens configuration including, in order from an object side, a first lens group composed of a negative lens and a positive lens, an aperture stop, and a second lens group composed of a cemented lens constructed by a negative lens cemented with a positive lens, and a positive lens, for example, Japanese Patent Application Laid-Open No. 9-189856.

However, in such a conventional imaging lens, when the whole lens is moved for focusing, the total lens length becomes long upon focusing from an infinity object to a close object. Moreover, various aberrations cannot be sufficiently corrected upon focusing on a close object.

Moreover, in a conventional camera equipped with such an imaging lens, when the camera becomes small, thin and lightweight, holding of the camera becomes difficult resulting in increase in shooting error cause by a camera shake or the like. In other words, the image is deteriorated by an image blur during exposure caused by a minute camera shake triggered by a hand movement occurred upon shooting (for example, a camera shake generated upon depressing a release button).

Accordingly, there has been known a method for correcting an image blur with installing a driving system that shifts a portion of lens as a shift lens group in a direction perpendicular to an optical axis, a detection system that detects a camera shake, and a calculation system that controls the driving system on the basis of a detection result of the detection system into such a conventional imaging lens.

However, in the above-described imaging lens capable of correcting an image blur, there has been a problem that various aberrations cannot be excellently corrected, and optical performance varies upon shifting the shifting lens group.

SUMMARY OF THE INVENTION

The present invention is made in view of the above-described problems and has an object to provide a compact imaging lens having a large aperture and a wide angle of view and excellent optical performance over entire image frame with excellently correcting various aberrations upon focusing on an infinity object to a close object with suppressing variation in optical performance upon shifting the shifting lens group, an optical apparatus equipped with the imaging lens, and a method for manufacturing the imaging lens. According to a first aspect of the present invention, there is provided an imaging lens comprising, in order from an object side: a first lens group having positive refractive power; and a second lens group having positive refractive power, a position of the first lens group being fixed with respect to an image plane, the second lens group consisting of a plurality of lens components, and the following conditional expression (1) being satisfied:

$$0.015 < f/f1 < 0.085 \quad (1)$$

where f denotes a focal length of the imaging lens, and f1 denotes a focal length of the first lens group.

According to a second aspect of the present invention, there is provided an optical apparatus equipped with the imaging lens according to the first aspect.

According to a third aspect of the present invention, there is provided an imaging lens comprising, in order from an object side: a first lens group having positive refractive power; and a second lens group having positive refractive power, the first lens group consisting of a single lens component, the second lens group consisting of, in order from the object side, a front lens group, an aperture stop, and a rear lens group, and at least a portion of the second lens group being moved as a shift lens group in a direction including a component perpendicular to an optical axis.

According to a fourth aspect of the present invention, there is provided an optical apparatus equipped with the imaging lens according to third aspect.

According to a fifth aspect of the present invention, there is provided an imaging lens comprising, in order from an object side: a first lens group having positive refractive power; and a second lens group having positive refractive power, the first lens group consisting of a single positive lens component having convex surface facing an image side, the second lens group consisting of, in order from the object side, a negative meniscus lens having a convex surface facing the object side, a positive lens having a convex surface facing the object side, an aperture stop, a cemented lens constructed by a negative lens having a concave surface facing the object side cemented with a positive lens having a convex surface facing the image side, and a positive lens, and at least a portion of the second lens group being moved along an optical axis, thereby carrying out focusing from an infinity object to a close object.

According to a sixth aspect of the present invention, there is provided an optical apparatus equipped with the imaging lens according to fifth aspect.

According to a seventh aspect of the present invention, there is provided a method for manufacturing an imaging lens including, in order from an object side, a first lens group having positive refractive power and a second lens group having positive refractive power, the method comprising steps of: disposing the second lens group with consisting of a plurality of lens components; disposing the imaging lens with satisfying the following conditional expression (1):

$$0.015 < f/f1 < 0.085 \quad (1)$$

where f denotes a focal length of the imaging lens, and f1 denotes a focal length of the first lens group; and fixing a position of the first lens group with respect to the image plane.

According to an eighth aspect of the present invention, there is provided a method for manufacturing an imaging lens including, in order from the object side, a first lens group having positive refractive power and a second lens group having positive refractive power, the method comprising steps of: disposing the first lens group with a single lens component; disposing the second lens group consisting of, in order from the object side, a front lens group, an aperture stop, and a rear lens group; and moving at least a portion of the second lens group as a shift lens group in a direction including a component perpendicular to an optical axis.

According to a ninth aspect of the present invention, there is provided a method for manufacturing an imaging lens including, in order from an object side, a first lens group having positive refractive power and a second lens group having positive refractive power, the method comprising steps of: disposing the first lens group with a single positive lens component having a convex surface facing an image side; disposing the second lens group consisting of, in order from the object side, a negative meniscus lens having a convex surface facing the object side, a positive lens having a convex surface facing the object side, an aperture stop, a cemented lens constructed by a negative lens having a concave surface facing the object side cemented with a positive lens having a convex surface facing the image side, and a positive lens; and moving at least a portion of the second lens group along an optical axis, thereby carrying out focusing from an infinity object to a close object.

The present invention makes it possible to provide a compact imaging lens having a large aperture and a wide angle of view and excellent optical performance over entire image frame with excellently correcting various aberrations upon focusing on an infinity object to a close object with suppressing variation in optical performance upon shifting the shifting lens group, an optical apparatus equipped with the imaging lens, and a method for manufacturing the imaging lens.

BRIEF DESCRIPTION OF THE DRAWINGS

FIG. 1 is a sectional view showing a lens configuration of an imaging lens according to Example 1 of a first embodiment of the present application.

FIGS. 2A and 2B are graphs showing various aberrations of the imaging lens according to Example 1 of the first embodiment, in which FIG. 2A is upon focusing on an infinity object, and FIG. 2B is upon focusing on a close shooting distance.

FIG. 3 is a sectional view showing a lens configuration of an imaging lens according to Example 2 of the first embodiment of the present application.

FIGS. 4A and 4B are graphs showing various aberrations of the imaging lens according to Example 2 of the first embodiment, in which FIG. 4A is upon focusing on an infinity object, and FIG. 4B is upon focusing on a close shooting distance.

FIG. 5 is a sectional view showing a lens configuration of an imaging lens according to Example 3 of the first embodiment of the present application.

FIGS. 6A and 6B are graphs showing various aberrations of the imaging lens according to Example 3 of the first embodiment, in which FIG. 6A is upon focusing on an infinity object, and FIG. 6B is upon focusing on a close shooting distance.

FIG. 7 is a sectional view showing a lens configuration of an imaging lens according to Example 4 of the first embodiment of the present application.

FIGS. 8A and 8B are graphs showing various aberrations of the imaging lens according to Example 4 of the first embodiment, in which FIG. 8A is upon focusing on an infinity object, and FIG. 8B is upon focusing on a close shooting distance.

FIGS. 10A and 10B are graphs showing various aberrations of the imaging lens according to Example 5 of the first embodiment, in which FIG. 10A is upon focusing on an infinity object, and FIG. 10B is upon focusing on a close shooting distance.

FIG. 11 is a sectional view showing a lens configuration of an imaging lens according to Example 6 of the first embodiment of the present application.

FIGS. 12A and 12B are graphs showing various aberrations of the imaging lens according to Example 6 of the first embodiment, in which FIG. 12A is upon focusing on an infinity object, and FIG. 12B is upon focusing on a close shooting distance.

FIG. 13 is a sectional view showing a lens configuration of an imaging lens according to Example 7 of the first embodiment of the present application.

FIGS. 14A and 14B are graphs showing various aberrations of the imaging lens according to Example 7 of the first embodiment, in which FIG. 14A is upon focusing on an infinity object, and FIG. 14B is upon focusing on a close shooting distance.

FIGS. 16A, 16B and 16C are graphs showing various aberrations of the imaging lens according to Example 8 of the second embodiment, in which FIG. 16A is upon focusing on an infinity object, FIG. 16B is upon focusing on a close shooting distance, and FIG. 16C shows coma upon vibration reduction.

FIG. 17 is a sectional view showing a lens configuration of an imaging lens according to Example 9 of the second embodiment of the present application.

FIGS. 18A, 18B and 18C are graphs showing various aberrations of the imaging lens according to Example 9 of the second embodiment, in which FIG. 18A is upon focusing on an infinity object, FIG. 18B is upon focusing on a close shooting distance, and FIG. 18C shows coma upon vibration reduction.

FIG. 19 is a sectional view showing a lens configuration of an imaging lens according to Example 10 of the second embodiment of the present application.

FIGS. 20A, 20B and 20C are graphs showing various aberrations of the imaging lens according to Example 10 of the second embodiment, in which FIG. 20A is upon focusing on an infinity object, FIG. 20B is upon focusing on a close shooting distance, and FIG. 20C shows coma upon vibration reduction.

FIGS. 22A, 22B and 22C are graphs showing various aberrations of the imaging lens according to Example 11 of the second embodiment, in which FIG. 22A is upon focusing on an infinity object, FIG. 22B is upon focusing on a close shooting distance, and FIG. 22C shows coma upon vibration reduction.

FIGS. 24A, 24B and 24C are graphs showing various aberrations of the imaging lens according to Example 12 of the second embodiment, in which FIG. 24A is upon focusing on an infinity object, FIG. 24B is upon focusing on a close shooting distance, and FIG. 24C shows coma upon vibration reduction.

FIGS. 26A, 26B and 26C are graphs showing various aberrations of the imaging lens according to Example 13 of the second embodiment, in which FIG. 26A is upon focusing on an infinity object, FIG. 26B is upon focusing on a close shooting distance, and FIG. 26C shows coma upon vibration reduction.

FIG. 27 is a sectional view showing a lens configuration of an imaging lens according to Example 14 of the second embodiment of the present application.

FIGS. 28A, 28B and 28C are graphs showing various aberrations of the imaging lens according to Example 14 of the second embodiment, in which FIG. 28A is upon focusing on an infinity object, FIG. 28B is upon focusing on a close shooting distance, and FIG. 28C shows coma upon vibration reduction.

FIGS. 29A and 29B are diagrams showing an electronic camera according to the present application, in which FIG. 29A is a front view and FIG. 29B is a rear view

FIG. 33 is a flowchart showing a method for manufacturing an imaging lens according to the second embodiment of the present application.

DESCRIPTION OF THE MOST PREFERRED EMBODIMENT

First Embodiment

Figure 2A:
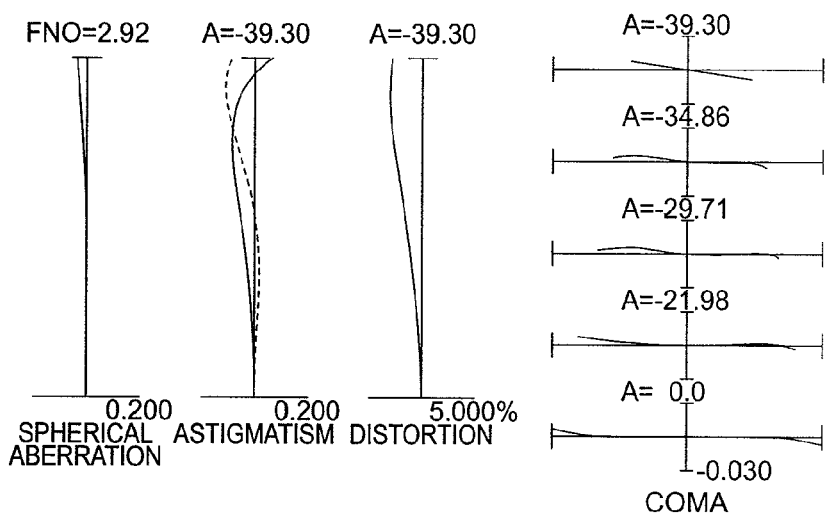

An imaging lens, an optical apparatus equipped with the imaging lens and a method for manufacturing the imaging lens according to a first embodiment of the present application are explained below.

An imaging lens according to the first embodiment of the present application includes, in order from an object side, a first lens group having positive refractive power and a second lens group having positive refractive power. A position of the first lens group is fixed with respect to an image plane. The second lens group is composed of a plurality of lens components. The following conditional expression (1) is satisfied:

$$0.015 < f/f1 < 0.085 \qquad (1)$$

where f denotes a focal length of the imaging lens, and f1 denotes a focal length of the first lens group.

As described above, an imaging lens according to the first embodiment of the present application includes, in order from the object side, the first lens group having positive refractive power and the second lens group having positive refractive power, the position of the first lens group is fixed with respect to the image plane, and the second lens group is composed of a plurality of lens components. With this lens configuration, it becomes possible to realize a compact imaging lens having excellent optical performance. Incidentally, a lens component is defined as a single lens or a cemented lens constructed by cementing two lenses or more.

In an imaging lens according to the first embodiment of the present application, with satisfying conditional expression (1) under the configuration described above, spherical aberration and coma generated in the first lens group alone can be suppressed minimally.

Conditional expression (1) defines the focal length of the first lens group and the focal length of the imaging lens.

When the ratio f/f1 is equal to or exceeds the upper limit of conditional expression (1), spherical aberration and coma generated in the first lens group alone become large, so that it becomes difficult to correct these aberrations. In order to secure the effect of the present application, it is preferable to set the upper limit of conditional expression (1) to 0.080. In order to further secure the effect of the present application, it is most preferable to set the upper limit of conditional expression (1) to 0.075.

On the other hand, when the ratio f/f1 is equal to or falls below the lower limit of conditional expression (1), the focal length of the first lens group becomes large, and the total lens length of the imaging lens becomes large, so that it becomes opposite to the intension of the present application. Moreover, when the total lens length of the imaging lens is to be secured, coma and curvature of field become worse, so that it is undesirable. In order to secure the effect of the present application, it is preferable to set the lower limit of conditional expression (1) to 0.020. In order to further secure the effect of the present application, it is most preferable to set the lower limit of conditional expression (1) to 0.025.

With the configuration described above, it becomes possible to realize a compact imaging lens having a large aperture, a wide angle of view and excellent optical performance over entire image frame with excellently correcting various aberrations upon focusing on an infinity object to a close object.

In an imaging lens according to the first embodiment of the present application, the first lens group is preferably composed of a single positive lens component having a convex surface facing the object side. With this configuration, an imaging lens according to the present application makes it possible to realize further excellent optical performance.

In an imaging lens according to the first embodiment of the present application, the single positive lens component is preferably a single lens. With this lens configuration, it becomes possible to excellently correct distortion and curvature of field generated in the whole lens system of the imaging lens.

In an imaging lens according to the first embodiment of the present application, at least a portion of the second lens group is preferably moved to the object side, thereby carrying out focusing from an infinity object to a close object. With this configuration, a moving amount of the focusing lens group toward the object side upon focusing becomes extremely small, so that variation in spherical aberration and curvature of field can be excellently suppressed. Moreover, interference between lenses and mechanical parts that hold lenses can be prevented. In particular, when the whole of the second lens group is made to be the focusing lens group, the driving mechanism can be simplified. Moreover, when a portion of the second lens group is made to be the focusing lens group, since the focusing lens group can be lightened, response speed for focusing can be increased.

In an imaging lens according to the first embodiment of the present application, the following conditional expression (2) is preferably satisfied:

$$0.015 < f2/f1 < 0.085 \qquad (2)$$

where f1 denotes a focal length of the first lens group, and f2 denotes a focal length of the second lens group.

Conditional expression (2) defines the focal length of the first lens group and the focal length of the second lens group. With satisfying conditional expression (2), an imaging lens according to the first embodiment of the present application makes it possible to excellently correct curvature of field, spherical aberration, coma and spherical aberration generated in the first lens group, and coma generated in the second lens group.

When the ratio f2/f1 is equal to or exceeds the upper limit of conditional expression (2), refractive power of the first lens group becomes relatively strong, so that it becomes difficult to correct spherical aberration and coma generated in the first lens group alone. Moreover, refractive power of the second lens group becomes relatively weak, so that curvature of field cannot be excellently corrected. Accordingly, it is undesirable. In order to secure the effect of the present application, it is preferable to set the upper limit of conditional expression (2) to 0.080. In order to further secure the effect of the present application, it is most preferable to set the upper limit of conditional expression (2) to 0.075.

On the other hand, when the ratio f2/f1 is equal to or falls below the lower limit of conditional expression (2), refractive power of the first lens group becomes relatively weak, so that correction of spherical aberration becomes insufficient. Accordingly, it is undesirable. Moreover, refractive power of the second lens group becomes relatively strong, so that coma generated in the second lens group becomes excessively large. Accordingly, the purpose of the present application to obtain excellent optical performance cannot be achieved. In order to secure the effect of the present application, it is preferable to set the lower limit of conditional expression (2) to 0.020. In order to further secure the effect of the present application, it is most preferable to set the lower limit of conditional expression (2) to 0.025.

In an imaging lens according to the first embodiment of the present application, in order to harmonize higher optical performance with compactness, the second lens group preferably includes at least one aspherical surface. With this configuration, spherical aberration and curvature of field can be excellently corrected.

In an imaging lens according to the first embodiment of the present application, the following conditional expression (3) is preferably satisfied:

$$0.80 < f/f2 < 1.10 \qquad (3)$$

where f denotes a focal length of the imaging lens, and f2 denotes a focal length of the second lens group.

Conditional expression (3) defines the focal length of the imaging lens and the focal length of the second lens group. With satisfying conditional expression (3), an imaging lens according to the first embodiment of the present application makes it possible to excellently correct spherical aberration generated in the second lens group alone.

When the ratio f/f2 is equal to or exceeds the upper limit of conditional expression (3), refractive power of the second lens group becomes strong, so that spherical aberration generated in the second lens group alone becomes large. Accordingly, it is undesirable. In order to secure the effect of the present application, it is preferable to set the upper limit of conditional expression (3) to 1.075. In order to further secure the effect of the present application, it is most preferable to set the upper limit of conditional expression (3) to 1.05.

On the other hand, when the ratio f/f2 is equal to or falls below the lower limit of conditional expression (3), refractive power of the second lens group becomes weak, so that the second lens group does not become a focal. Accordingly, when a portion of the imaging lens is shifted in a direction including a component perpendicular to the optical axis so as to carry out vibration reduction, variation in curvature of field upon vibration reduction becomes large. In order to secure the effect of the present application, it is preferable to set the lower limit of conditional expression (3) to 0.85. In order to further secure the effect of the present application, it is most preferable to set the lower limit of conditional expression (3) to 0.90.

In an imaging lens according to the first embodiment of the present application, in order to harmonize higher optical performance with compactness, the second lens group preferably includes, in order from the object side, a negative meniscus lens having a convex surface facing the object side, a positive meniscus lens having a convex surface facing the object side, an aperture stop, a cemented lens constructed by a negative lens having a concave surface facing the object side cemented with a positive lens having a convex surface facing an image side, and a positive lens. With this configuration, spherical aberration, curvature of field, and coma can be excellently corrected.

In an imaging lens according to the first embodiment of the present application, the following conditional expression (4) is preferably satisfied:

$$2.50 < (r3F + r2R)/(r3F - r2R) < 3.80 \qquad (4)$$

where r2R denotes a radius of curvature of the image side surface of the most object side lens component in the second lens group, and r3F denotes a radius of curvature of a lens surface adjacent to the image side of the image side surface.

Conditional expression (4) is for excellently correcting coma and curvature of field generated in the second lens group alone. With satisfying conditional expression (4), an imaging lens according to the first embodiment of the present application makes it possible to minimally suppress coma and curvature of field generated in the second lens group alone.

When the value (r3F+r2R)/(r3F−r2R) is equal to or exceeds the upper limit of conditional expression (4), coma and curvature of field generated in the second lens group alone cannot be corrected. Moreover, distortion increases, so that it is undesirable. In order to secure the effect of the present application, it is preferable to set the upper limit of conditional expression (4) to 3.70. In order to further secure the effect of the present application, it is most preferable to set the upper limit of conditional expression (4) to 3.60.

On the other hand, when the value (r3F+r2R)/(r3F−r2R) is equal to or falls below the lower limit of conditional expression (4), coma generated in the second lens group alone becomes excessively large, so that optical performance upon focusing on a close object becomes worse. Accordingly, it is undesirable. In order to secure the effect of the present application, it is preferable to set the lower limit of conditional expression (4) to 2.60. In order to further secure the effect of the present application, it is most preferable to set the lower limit of conditional expression (4) to 2.70.

In an imaging lens according to the first embodiment of the present application, in order to harmonize higher optical performance with compactness, the most object side lens component in the second lens group preferably includes at least one aspherical surface. With this configuration, spherical aberration and curvature of field can be excellently corrected, and higher optical performance and compactness can be harmonized.

In an imaging lens according to the first embodiment of the present application, in order to accomplish higher optical performance, the plurality of lens components in the second lens group preferably include at least one positive lens component, and the most object side positive lens component in the at least one positive lens component preferably includes at least one aspherical surface. With this configuration, variations in distortion and curvature of field generated upon focusing can be excellently corrected.

In an imaging lens according to the first embodiment of the present application, the following conditional expression (5) is preferably satisfied:

$$1.55<TL/\Sigma d<1.75 \qquad (5)$$

where TL denotes a total lens length of the imaging lens, and Σd denotes a distance along an optical axis between the most object side lens surface in the first lens group and the most image side lens surface in the second lens group.

Conditional expression (5) defines an appropriate total lens length of the imaging lens. With satisfying conditional expression (5), an imaging lens according to the first embodiment of the present application makes it possible to harmonize high optical performance with compactness.

When the ratio TL/Σd is equal to or exceeds the upper limit of conditional expression (5), the total lens length of the imaging lens becomes large. Accordingly, it becomes impossible to harmonize high optical performance with compactness, so that it becomes opposite to the intension of the present application. Accordingly, it is undesirable. When the total lens length of the imaging lens is to be secured, coma and curvature of field become worse, so that it is undesirable. In order to secure the effect of the present application, it is preferable to set the upper limit of conditional expression (5) to 1.74. In order to further secure the effect of the present application, it is most preferable to set the upper limit of conditional expression (5) to 1.72.

On the other hand, when the ratio TL/Σd is equal to or falls below the lower limit of conditional expression (5), although it is effective for downsizing the imaging lens, spherical aberration, coma and curvature of field generated in the whole system of the imaging lens cannot be excellently corrected, so that it is undesirable. Moreover, the back focal length cannot be made larger. In order to secure the effect of the present application, it is preferable to set the lower limit of conditional expression (5) to 1.60. In order to further secure the effect of the present application, it is most preferable to set the lower limit of conditional expression (5) to 1.65.

In an imaging lens according to the first embodiment of the present application, the following conditional expression (6) is preferably satisfied:

$$4.00<TL/Y\max<5.00 \qquad (6)$$

where TL denotes a total lens length of the imaging lens, and Ymax denotes the maximum image height of the imaging lens.

Conditional expression (6) defines an appropriate total lens length of the imaging lens. With satisfying conditional expression (6), an imaging lens according to the first embodiment of the present application makes it possible to harmonize high optical performance with further compactness.

When the ratio TL/Ymax is equal to or exceeds the upper limit of conditional expression (6), the total lens length of the imaging lens becomes large. Accordingly, it becomes impossible to harmonize high optical performance with compactness, so that it becomes opposite to the intension of the present application. Accordingly, it is undesirable. When the total lens length of the imaging lens is to be secured, coma and curvature of field become worse, so that it is undesirable. In order to secure the effect of the present application, it is preferable to set the upper limit of conditional expression (6) to 4.85. In order to further secure the effect of the present application, it is most preferable to set the upper limit of conditional expression (6) to 4.70.

On the other hand, when the ratio TL/Ymax is equal to or falls below the lower limit of conditional expression (6), although it is effective for downsizing, spherical aberration, coma and curvature of field generated in the whole system of the imaging lens cannot be excellently corrected, so that it is undesirable. In order to secure the effect of the present application, it is preferable to set the lower limit of conditional expression (6) to 4.20. In order to further secure the effect of the present application, it is most preferable to set the lower limit of conditional expression (6) to 4.40.

In an imaging lens according to the present application, in order to realize higher optical performance, an aperture stop is preferably disposed in the second lens group. With this configuration, refractive power distribution in the second lens group becomes close to a symmetric type, which is, in order from the object side, a lens group having positive refractive power, an aperture stop, and a lens group having positive refractive power, so that it becomes possible to excellently correct curvature of field and distortion.

An optical apparatus according to the first embodiment of the present application is characterized by including the imaging lens described above. With this configuration, it becomes possible to realize a compact optical apparatus having a large aperture and a wide angle of view and excellent optical performance over entire image frame with excellently correcting various aberrations upon focusing on an infinity object to a close object.

Moreover, a method for manufacturing an imaging lens according to the first embodiment of the present application is a method for manufacturing an imaging lens including, in order from an object side, a first lens group having positive refractive power, and a second lens group having positive refractive power, the method comprising steps of:

disposing the second lens group with a plurality of lens components;

disposing the imaging lens with satisfying the following conditional expression (1):

$$0.015<f/f1<0.085 \qquad (1)$$

where f denotes a focal length of the imaging lens, and f1 denotes a focal length of the first lens group; and fixing a position of the first lens group with respect to an image plane.

With this method for manufacturing an imaging lens according to the present application, it becomes possible to manufacture a compact imaging lens having a large aperture and a wide angle of view and excellent optical performance over entire image frame with excellently correcting various aberrations upon focusing on an infinity object to a close object.

Then, an imaging lens, an optical apparatus equipped with the imaging lens, and a method for manufacturing the imaging lens seen from another point of view according to the first embodiment of the present application are explained below.

An imaging lens seen from another point of view according to the first embodiment of the present application includes, in order from an object side, a first lens group having positive refractive power and a second lens group having positive refractive power. The first lens group consists of a single positive lens component having a convex surface facing an image side. The second lens group consists of, in order from the object side, a negative meniscus lens having a convex surface facing the object side, a positive lens having a convex surface facing the object side, an aperture stop, a cemented lens constructed by a negative lens having a concave surface facing the object side cemented with a positive lens having a convex surface facing the image side, and a positive lens. At least a portion of the second lens group is moved along the optical axis, thereby carrying out focusing from an infinity object to a close object.

As described above, an imaging lens seen from another point of view according to the first embodiment of the present application includes, in order from an object side, the first lens group having positive refractive power and the second lens group having positive refractive power. The first lens group consists of the single positive lens component having a convex surface facing an image side. The second lens group consists of, in order from the object side, the negative meniscus lens having a convex surface facing the object side, the positive lens having a convex surface facing the object side, the aperture stop, the cemented lens constructed by the negative lens having a concave surface facing the object side cemented with the positive lens having a convex surface facing the image side, and a positive lens. With this configuration, it becomes possible to realize a compact imaging lens having a wide-angle of view and excellent optical performance. Incidentally, a lens component is defines as a single lens or a cemented lens constructed by cementing two lenses or more.

As described above, in an imaging lens seen from another point of view according to the first embodiment of the present application, at least a portion of the second lens group is moved along the optical axis, thereby carrying out focusing from an infinity object to a close object. With this configuration, since a moving amount of the focusing lens group toward object side upon focusing becomes small, variations in spherical aberration and curvature of field can be excellently suppressed. Moreover, interference between lenses and mechanical parts that holds lenses can be prevented. In particular, when the whole of the second lens group is made to be the focusing lens group, the driving mechanism can be simplified. Moreover, when a portion of the second lens group is made to be the focusing lens group, since the focusing lens group can be lightened, response speed for focusing can be increased.

With the configuration described above, it becomes possible to realize a compact imaging lens having a large aperture, a wide angle of view and excellent optical performance over entire image frame with excellently correcting various aberrations upon focusing on an infinity object to a close object.

In an imaging lens seen from another point of view according to the first embodiment of the present application, the single positive lens component is preferably a single lens. With this configuration, distortion and curvature of field generated in the imaging lens can be excellently corrected.

In an imaging lens seen from another point of view according to the first embodiment of the present application, in order to realize higher optical performance, the position of the first lens group is preferably fixed with respect to the image plane. With this configuration, distortion and curvature of field generated in the imaging lens can be excellently corrected. Moreover, even if external force is inadvertently applied upon using the imaging lens, a moving portion of the imaging lens can be protected.

In an imaging lens seen from another point of view according to the first embodiment of the present application, the following conditional expression (2) is preferably satisfied:

$$0.015 < f2/f1 < 0.085 \quad (2)$$

where f1 denotes a focal length of the first lens group, and f2 denotes a focal length of the second lens group.

Conditional expression (2) defines the focal length of the first lens group and the focal length of the second lens group. However, conditional expression (2) has already been explained above, so that duplicated explanations are omitted.

In an imaging lens seen from another point of view according to the first embodiment of the present application, the following conditional expression (1) is preferably satisfied:

$$0.015 < f/f1 < 0.085 \quad (1)$$

where f denotes a focal length of the imaging lens, and f1 denotes a focal length of the first lens group.

Conditional expression (1) defines the focal length of the first lens group and the focal length of the imaging lens. However, conditional expression (1) has already been explained above, so that duplicated explanations are omitted.

In an imaging lens seen from another point of view according to the first embodiment of the present application, the following conditional expression (4) is preferably satisfied:

$$2.50 < (r3F + r2R)/(r3F - r2R) < 3.80 \quad (4)$$

where r2R denotes a radius of curvature of the image side surface of the most object side negative meniscus lens in the second lens group, and r3F denotes a radius of curvature of a lens surface adjacent to the image side of the image side surface.

Conditional expression (4) is for excellently correcting coma and curvature of field generated in the second lens group alone. However, conditional expression (4) has already been explained above, so that duplicated explanations are omitted.

In an imaging lens seen from another point of view according to the first embodiment of the present application, the following conditional expression (3) is preferably satisfied:

$$0.80 < f/f2 < 1.10 \quad (3)$$

where f denotes a focal length of the imaging lens, and f2 denotes a focal length of the second lens group.

Conditional expression (3) defines the focal length of the imaging lens and the focal length of the second lens group. However, conditional expression (3) has already been explained above, so that duplicated explanations are omitted.

In an imaging lens seen from another point of view according to the first embodiment of the present application, the following conditional expression (5) is preferably satisfied:

$$1.55 < TL/\Sigma d < 1.75 \quad (5)$$

where TL denotes a total lens length of the imaging lens, and $\Sigma d$ denotes a distance along an optical axis between the most object side lens surface in the first lens group and the most image side lens surface in the second lens group.

Conditional expression (5) defines an appropriate total lens length of the imaging lens. However, conditional expression (5) has already been explained above, so that duplicated explanations are omitted.

In an imaging lens seen from another point of view according to the first embodiment of the present application, the following conditional expression (6) is preferably satisfied:

$$4.00 < TL/Y\max < 5.00 \quad (6)$$

where TL denotes a total lens length of the imaging lens, and Ymax denotes the maximum image height of the imaging lens.

Conditional expression (6) defines an appropriate total lens length of the imaging lens. However, conditional expression (6) has already been explained above, so that duplicated explanations are omitted.

In an imaging lens seen from another point of view according to the first embodiment of the present application, in order to harmonize higher optical performance with compactness, the second lens group preferably includes at least one aspherical surface. With this configuration, spherical aberration and curvature of field can be excellently corrected.

In an imaging lens seen from another point of view according to the first embodiment of the present application, in order to harmonize high optical performance with compactness, the negative meniscus lens disposed to the most object side in the second lens group preferably includes at least one aspherical surface. With this configuration, spherical aberration and curvature of field can be excellently corrected and high optical performance and compactness can be harmonized.

In an imaging lens seen from another point of view according to the first embodiment of the present application, in order to realize higher optical performance, the positive lens disposed to the most image side in the second lens group preferably includes at least one aspherical surface. With this configuration, distortion and curvature of field generated upon focusing can be excellently corrected.

An optical apparatus seen from another point of view according to the first embodiment of the present application is equipped with the above-described imaging lens. With this configuration, it becomes possible to realize a compact optical apparatus having a large aperture and a wide angle of view and excellent optical performance over entire image frame with excellently correcting various aberrations upon focusing on an infinity object to a close object.

Then, a method for manufacturing an imaging lens seen from another point of view according to the first embodiment of the present application is a method for manufacturing an imaging lens including, in order from an object side, a first lens group having positive refractive power, and a second lens group having positive refractive power, the method comprising steps of:

disposing the first lens group with a single positive lens component having a convex surface facing an image side;

disposing the second lens group consisting of, in order from the object side, a negative meniscus lens having a convex surface facing the object side, a positive lens having a convex surface facing the object side, an aperture stop, a cemented lens constructed by a negative lens having a concave surface facing the object side cemented with a positive lens having a convex surface facing the image side, and a positive lens; and moving at least a portion of the second lens group along an optical axis, thereby carrying out focusing from an infinity object to a close object.

With this method for manufacturing an imaging lens seen from another point of view according to the first embodiment of the present application, it becomes possible to manufacture a compact imaging lens having a large aperture and a wide angle of view and excellent optical performance over entire image frame with excellently correcting various aberrations upon focusing on an infinity object to a close object.

Then, an imaging lens according to each numerical example of the first embodiment of the present application is explained below with reference to accompanying drawings.

Example 1

FIG. 1 is a sectional view showing a lens configuration of an imaging lens according to Example 1 of the first embodiment of the present application.

As shown in FIG. 1, the imaging lens according to Example 1 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a negative meniscus lens L21 having a convex surface facing the object side, a positive meniscus lens L22 having a convex surface facing the object side, a first flare stopper FS1, an aperture stop S, a second flare stopper FS2, a cemented lens constructed by a double concave negative lens L23 cemented with a double convex positive lens L24, and a double convex positive lens L25.

The filter group FL is composed of a low-pass filter, an infrared-light-blocking filter, and the like.

Incidentally, an unillustrated imaging device composed of a CCD, or a CMOS is disposed on the image plane I. This is the same in the other Examples explained later.

In the imaging lens according to Example 1, focusing from an infinity object to a close object is carried out by moving the whole of the second lens group G2 along the optical axis toward the object side. Incidentally, the position of the first lens group G1 is fixed with respect to the image plane I.

Various values associated with the imaging lens according to Example 1 are listed in Table 1.

In (Specifications) in Table 1, f denotes a focal length, FNO denotes an f-number, 2ω denotes an angle of view (unit: degree), Y denotes an image height, TL denotes a total lens length, which is a distance along the optical axis between the most object side lens surface of the first lens group G1 and the image plane I, BF denotes a back focal length, which is a distance along the optical axis between the most image side lens surface in the second lens group G2 and the image plane I, ACTL denotes an air converted value of the total lens length, and ACBF denotes an air converted value of the back focal length. In (Lens Data), the left most column "i" shows an optical surface number counted in order from the object side, the second column "r" shows a radius of curvature of an optical surface, the third column "d" shows a distance to the next optical surface along an optical axis, the fourth column "nd" shows a refractive index at d-line (wavelength λ=587.6 nm), and the fifth column "vd" shows an Abbe number at d-line (wavelength λ=587.6 nm). In (Lens Data), an aperture stop S, a first flare stopper FS1, and a second flare stopper FS2 are shown. In the fourth column "nd" refractive index of the air nd=1.000000 is omitted. In the second column "r", r=∞ indicates a plane surface.

An aspherical surface is expressed by the following expression when y is a height in the direction vertical to the optical axis, S(y) is a distance (sag amount) along the optical axis from a tangent plane of a vertex of each aspherical surface at the height y up to each aspherical surface, r is a radius of curvature (paraxial radius of curvature) of a reference sphere, k is a conical coefficient and Cn is an n-th order aspherical surface coefficient.

Note that [E-n] represents [×10$^{-n}$] in the subsequent Examples:

$$S(y)=(y^2/r)/[1+(1-k\times y^2/r^2)^{1/2}]+C4\times y^4+C6\times y^6+C8\times y^8+C10\times y^{10}.$$

It should be noted that a second order aspherical surface coefficient C2 is "0" in each of Examples.

In (Aspherical Surface Data), "E-n" denotes "×10$^{-n}$", in which "n" is an integer, and for example "1.234E-05" denotes "1.234×10$^{-5}$". Each aspherical surface is expressed in (Lens Data) by attaching "*" to the left side of the surface number. In (Variable Distances), INF denotes upon focusing on an infinity object, CLD denotes upon focusing on a close object (shooting rang=0.5 m), and di (i is an integer) denotes the surface distance of the i-th surface. In (Values for Conditional Expressions), values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples.

TABLE 1

(Specifications)

f = 10.30
FNO = 2.92
2ω = 78.61
Y = 8.20
TL = 37.96
Bf = 15.38
ACTL = 37.01
ACBF = 14.43

(Lens Data)

| i | r | d | nd | νd |
|---|---|---|---|---|
| 1 | 160.5145 | 1.55 | 1.48749 | 70.23 |
| 2 | −160.5440 | d2 | | |
| 3 | 26.1848 | 1.10 | 1.58913 | 61.16 |
| *4 | 4.8842 | 3.95 | | |
| 5 | 9.0140 | 2.50 | 1.74950 | 35.28 |
| 6 | 79.5499 | 0.30 | | |
| 7 | ∞ | 1.70 | Flare Stopper FS1 | |
| 8 | ∞ | 1.55 | Aperture Stop S | |
| 9 | ∞ | 0.75 | Flare Stopper FS2 | |
| 10 | −8.6375 | 1.20 | 1.80810 | 22.76 |
| 11 | 113.7348 | 2.50 | 1.75500 | 52.32 |
| 12 | −10.6165 | 0.40 | | |
| 13 | 21.1214 | 2.95 | 1.59201 | 67.02 |
| *14 | −13.9521 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

(Aspherical Surface Data)

Surface Number = 4 r = 4.8842
κ = +0.5528
C4 = +7.2260E−5
C6 = −3.0492E−6
C8 = +2.2154E−7
C10 = −7.9802E−10

Surface Number = 14 r = −13.9521
κ = −11.4868
C4 = −3.0331E−4
C6 = +1.1991E−5

TABLE 1-continued

C8 = −1.9031E−7
C10 = +1.4300E−9

(Variable Distances)

| | INF | CLD |
|---|---|---|
| d2 = | 2.1334 | 1.9061 |
| d14 = | 10.5166 | 10.7439 |
| d20 = | 0.6644 | 0.6644 |

(Lens Group Data)

| Group | I | Focal Length |
|---|---|---|
| 1 | 1 | 164.9097 |
| 2 | 3 | 9.9988 |

(Values for Conditional Expressions)

f = 10.3000
f1 = 164.9097
f2 = 9.9988
r2R = 4.8842
r3F = 9.0140
TL = 37.9644
Σd = 22.5834
Ymax = 8.2000
(1) f/f1 = 0.0625
(2) f2/f1 = 0.0606
(3) f/f2 = 1.0301
(4) (r3F + r2R)/(r3F − r2R) = 3.3653
(5) TL/Σd = 1.6811
(6) TL/Ymax = 4.6298

Figure 2B:
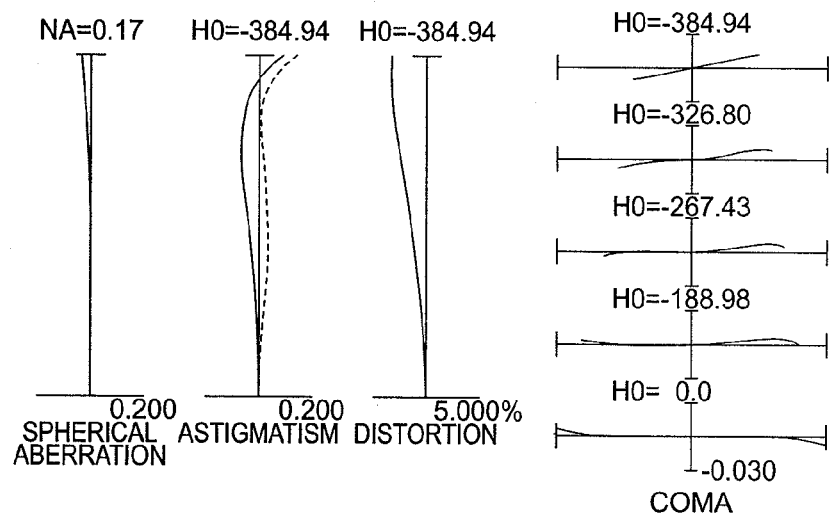

FIGS. 2A and 2B are graphs showing various aberrations of the imaging lens according to Example 1, in which FIG. 2A is upon focusing on infinity, and FIG. 2B is upon focusing on a close shooting distance.

In respective graphs, FNO denotes an f-number, A denotes a half angle of view, NA denotes a numerical aperture, H0 denotes an object height. In graphs showing astigmatism, a solid line indicates a sagittal image plane, and a broken line indicates a meridional image plane. The explanations of reference symbols are the same in the other Examples.

As is apparent from various graphs, the imaging lens according to Example 1 shows superb optical performance as a result of good corrections to various aberrations over entire focusing range from infinity to a close object.

Example 2

FIG. 3 is a sectional view showing a lens configuration of an imaging lens according to Example 2 of the present application.

As shown in FIG. 3, the imaging lens according to Example 2 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a negative meniscus lens L21 having a convex surface facing the object side, a positive meniscus lens L22 having a convex surface facing the object side, a first flare stopper FS1, an aperture stop S, a second flare stopper FS2, a cemented lens constructed by a double concave negative lens L23 cemented with a double convex positive lens L24, and a double convex positive lens L25.

The filter group FL is composed of a low-pass filter, an infrared-light-blocking filter, and the like.

In the imaging lens according to Example 2, focusing from an infinity object to a close object is carried out by moving a portion of the second lens group G2, in particular, a cemented lens constructed by the negative lens L23 cemented with the positive lens L24, and the positive lens L25 in a body along the optical axis toward the object side. Incidentally, the position of the first lens group G1 is fixed with respect to the image plane I.

Various values associated with the imaging lens according to Example 2 are listed in Table 2.

TABLE 2

(Specifications)

f = 10.30
FNO = 2.92
2ω = 78.60
Y = 8.20
TL = 37.97
BF = 15.46
ACTL = 37.02
ACBF = 14.51

(Lens Data)

| i | r | d | nd | vd |
|---|---|---|---|---|
| 1 | 346.0582 | 1.20 | 1.60300 | 65.44 |
| 2 | −346.0893 | d2 | | |
| 3 | 24.3607 | 1.20 | 1.58313 | 59.38 |
| *4 | 4.6967 | 3.70 | | |
| 5 | 9.3473 | 2.90 | 1.74950 | 35.28 |
| 6 | 305.1987 | 0.30 | | |
| 7 | ∞ | 1.70 | Flare Stopper FS1 | |
| 8 | ∞ | 1.40 | Aperture Stop S | |
| 9 | ∞ | d9 | Flare Stopper FS2 | |
| 10 | −9.2201 | 1.00 | 1.80810 | 22.76 |
| 11 | 77.4450 | 2.70 | 1.75500 | 52.32 |
| 12 | −10.9830 | 0.40 | | |
| 13 | 25.7154 | 2.95 | 1.59201 | 67.02 |
| *14 | −12.9856 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

(Aspherical Surface Data)

Surface Number = 4 r = 4.6967
κ = +0.1147
C4 = +5.5141E−4
C6 = +3.4495E−6
C8 = +3.3752E−7
C10 = −9.7228E−10

Surface Number = 14 r = −12.9856
κ = −10.9391
C4 = −4.1228E−4
C6 = +1.5051E−5
C8 = −2.5702E−7
C10 = +2.1453E−9

(Variable Distances)

| | INF | CLD |
|---|---|---|
| d2 = | 2.1557 | 2.1557 |
| d9 = | 0.9000 | 0.6716 |
| d14 = | 10.5637 | 10.7921 |
| d20 = | 0.7000 | 0.7000 |

TABLE 2-continued (Lens Group Data)

| Group | I | Focal Length |
|---|---|---|
| 1 | 1 | 287.1468 |
| 2 | 3 | 10.1322 |

(Values for Conditional Expressions)

f = 10.3000
f1 = 287.1468
f2 = 10.1322
r2R = 4.6967
r3F = 9.3473
TL = 37.9694
Σd = 22.5057
Ymax = 8.2000
(1) f/f1 = 0.0359
(2) f2/f1 = 0.0353
(3) f/f2 = 1.0166
(4) (r3F + r2R)/(r3F − r2R) = 3.0199
(5) TL/Σd = 1.6871
(6) TL/Ymax = 4.6304

Figure 4A:
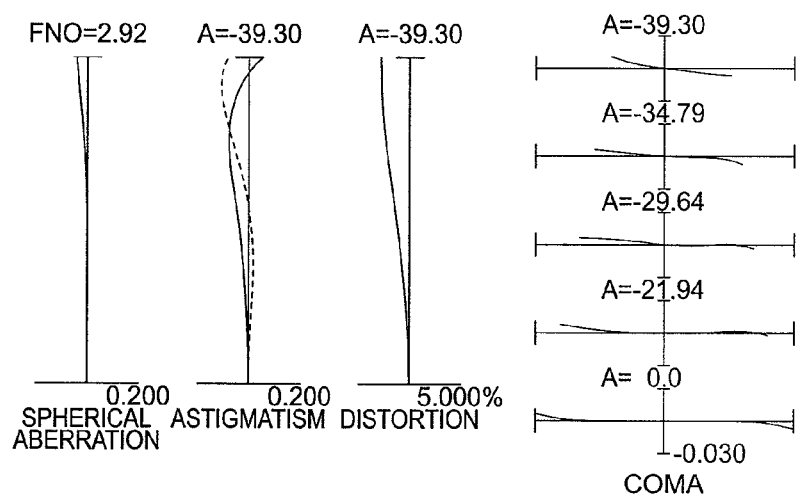
Figure 4B:
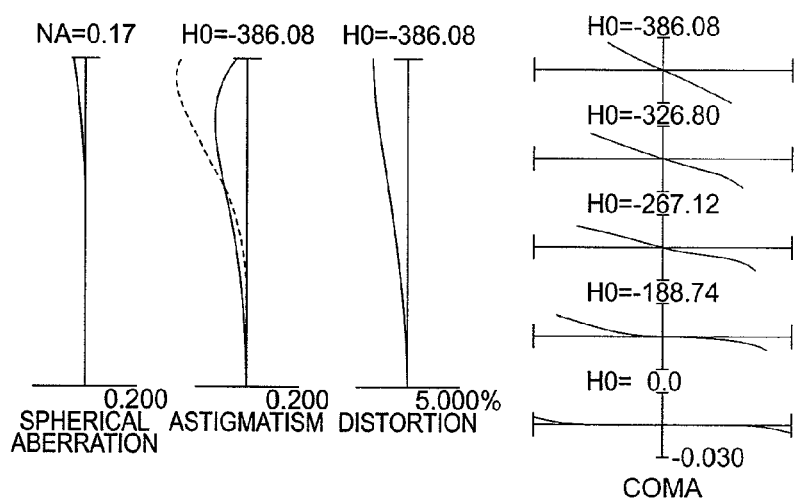

FIGS. 4A and 4B are graphs showing various aberrations of the imaging lens according to Example 2, in which FIG. 4A is upon focusing on infinity, and FIG. 4B is upon focusing on a close shooting distance.

As is apparent from various graphs, the imaging lens according to Example 2 shows superb optical performance as a result of good corrections to various aberrations over entire focusing range from infinity to a close object.

Example 3

FIG. 5 is a sectional view showing a lens configuration of an imaging lens according to Example 3 of the present application.

As shown in FIG. 5, the imaging lens according to Example 3 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a negative meniscus lens L21 having a convex surface facing the object side, a positive meniscus lens L22 having a convex surface facing the object side, a first flare stopper FS1, an aperture stop S, a second flare stopper FS2, a cemented lens constructed by a double concave negative lens L23 cemented with a double convex positive lens L24, and a double convex positive lens L25.

The filter group FL is composed of a low-pass filter, an infrared-light-blocking filter, and the like.

In the imaging lens according to Example 3, focusing from an infinity object to a close object is carried out by moving the whole of the second lens group G2 along the optical axis toward the object side. Incidentally, the position of the first lens group G1 is fixed with respect to the image plane I.

Various values associated with the imaging lens according to Example 3 are listed in Table 3.

TABLE 3

(Specifications)

f = 10.30
FNO = 2.91
2ω = 78.62
Y = 8.20

TABLE 3-continued

TL = 37.57
BF = 15.47
ACTL = 36.62
ACBF = 14.52

(Lens Data)

| i | r | d | nd | vd |
|---|---|---|---|---|
| 1 | 332.7704 | 1.00 | 1.60300 | 65.44 |
| 2 | −332.7936 | d2 | | |
| 3 | 22.0308 | 1.10 | 1.58313 | 59.38 |
| *4 | 4.5012 | 3.45 | | |
| 5 | 9.0325 | 3.05 | 1.74950 | 35.28 |
| 6 | 117.5529 | 0.30 | | |
| 7 | ∞ | 1.70 | Flare Stopper FS1 | |
| 8 | ∞ | 1.60 | Aperture Stop S | |
| 9 | ∞ | 0.70 | Flare Stopper FS2 | |
| 10 | −10.0955 | 1.00 | 1.80810 | 22.76 |
| 11 | 52.5077 | 2.70 | 1.75500 | 52.32 |
| 12 | −11.5974 | 0.40 | | |
| 13 | 24.8237 | 2.97 | 1.59201 | 67.05 |
| *14 | −12.8447 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

(Aspherical Surface Data)

Surface Number = 4 r = 4.5012
κ = +0.3479
C4 = +3.0704E−4
C6 = +9.9005E−7
C8 = +3.7811E−7
C10 = −1.2499E−9

Surface Number = 14 r = −12.8447
κ = −10.3357
C4 = −4.0200E−4
C6 = +1.4415E−5
C8 = −2.4522E−7
C10 = +2.0151E−9

(Variable Distances)

| | INF | CLD |
|---|---|---|
| d2 = | 2.1344 | 1.9074 |
| d14 = | 10.6000 | 10.8270 |
| d20 = | 0.6652 | 0.6652 |

(Lens Group Data)

| Group | I | Focal Length |
|---|---|---|
| 1 | 1 | 276.0942 |
| 2 | 3 | 10.1310 |

(Values for Conditional Expressions)

f = 10.2975
f1 = 276.0942
f2 = 10.1310
r2R = 4.5012
r3F = 9.0325
TL = 37.5652
Σd = 22.1000
Ymax = 8.2000
(1) f/f1 = 0.0373
(2) f2/f1 = 0.0367
(3) f/f2 = 1.0164
(4) (r3F + r2R)/(r3F − r2R) = 2.9867

TABLE 3-continued (5) TL/Σd = 1.6998
(6) TL/Ymax = 4.5811

Figure 6A:
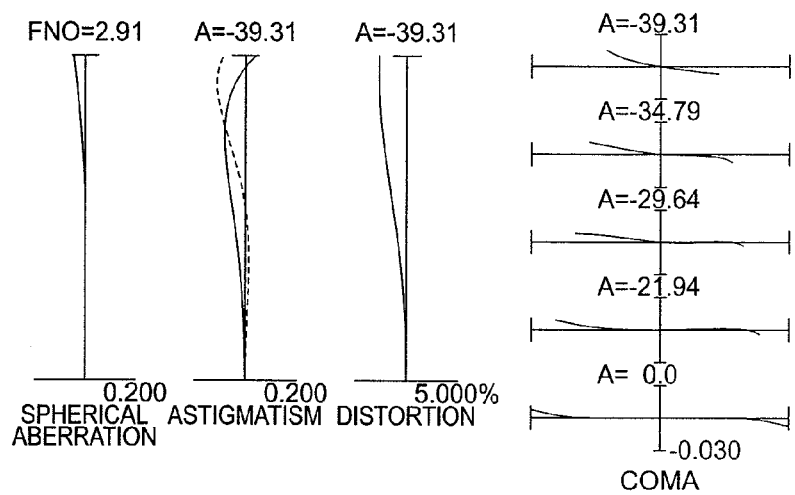
Figure 6B:
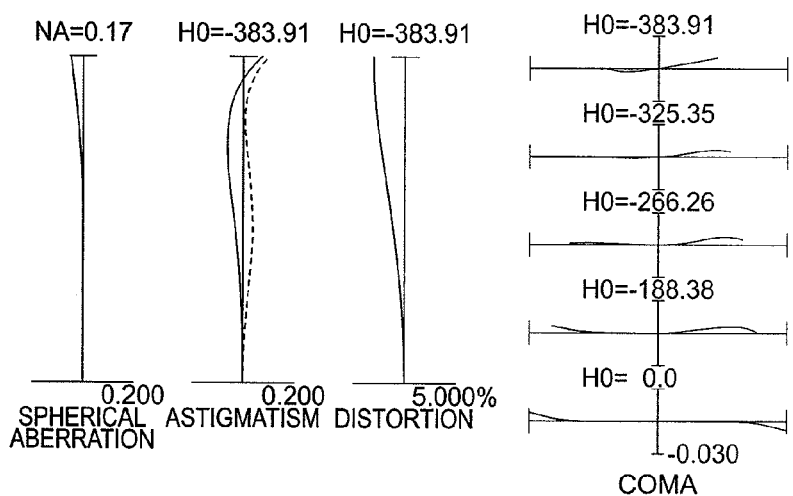

FIGS. 6A and 6B are graphs showing various aberrations of the imaging lens according to Example 3, in which FIG. 6A is upon focusing on infinity, and FIG. 6B is upon focusing on a close shooting distance.

As is apparent from various graphs, the imaging lens according to Example 3 shows superb optical performance as a result of good corrections to various aberrations over entire focusing range from infinity to a close object.

Example 4

FIG. 7 is a sectional view showing a lens configuration of an imaging lens according to Example 4 of the present application.

As shown in FIG. 7, the imaging lens according to Example 4 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a negative meniscus lens L21 having a convex surface facing the object side, a positive meniscus lens L22 having a convex surface facing the object side, a first flare stopper FS1, an aperture stop S, a second flare stopper FS2, a cemented lens constructed by a double concave negative lens L23 cemented with a double convex positive lens L24, and a double convex positive lens L25.

The filter group FL is composed of a low-pass filter, an infrared-light-blocking filter, and the like.

In the imaging lens according to Example 4, focusing from an infinity object to a close object is carried out by moving the whole of the second lens group G2 along the optical axis toward the object side. Incidentally, the position of the first lens group G1 is fixed with respect to the image plane I.

Various values associated with the imaging lens according to Example 4 are listed in Table 4.

TABLE 4

(Specifications)

f = 10.30
FNO = 2.89
2ω = 78.61
Y = 8.20
TL = 37.47
BF = 15.38
ACTL = 36.52
ACBF = 14.43

(Lens Data)

| i | r | d | nd | vd |
|---|---|---|---|---|
| 1 | 290.4936 | 1.00 | 1.51680 | 64.11 |
| 2 | −290.7707 | d2 | | |
| 3 | 19.6032 | 1.10 | 1.58913 | 61.15 |
| *4 | 4.4561 | 3.25 | | |
| 5 | 9.1671 | 3.75 | 1.74950 | 35.28 |
| 6 | 79.1129 | 0.30 | | |
| 7 | ∞ | 1.70 | Flare Stopper FS1 | |
| 8 | ∞ | 1.05 | Aperture Stop S | |
| 9 | ∞ | 1.25 | Flare Stopper FS2 | |

TABLE 4-continued

| | | | | |
|---|---|---|---|---|
| 10 | −11.3274 | 1.15 | 1.80810 | 22.76 |
| 11 | 44.4829 | 2.75 | 1.75500 | 52.32 |
| 12 | −11.5221 | 0.50 | | |
| 13 | 23.9759 | 3.00 | 1.59201 | 67.02 |
| *14 | −14.2191 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

(Aspherical Surface Data)

Surface Number = 4 r = 4.4561
κ = +0.6048
C4 = −2.4225E−5
C6 = −1.1037E−5
C8 = +5.0943E−7
C10 = −1.8920E−8

Surface Number = 14 r = −14.2191
κ = −11.3728
C4 = −3.1719E−4
C6 = +1.0532E−5
C8 = −1.6628E−7
C10 = +1.2559E−9

(Variable Distances)

| | INF | CLD |
|---|---|---|
| d2 = | 1.2865 | 1.0592 |
| d14 = | 10.5135 | 10.7408 |
| d20 = | 0.6702 | 0.6702 |

(Lens Group Data)

| Group | I | Focal Length |
|---|---|---|
| 1 | 1 | 281.3493 |
| 2 | 3 | 10.1574 |

(Values for Conditional Expressions)

f = 10.3000
f1 = 281.3493
f2 = 10.1574
r2R = 4.4561
r3F = 9.1671
TL = 37.4702
Σd = 22.0865
Ymax = 8.2000
(1) f/f1 = 0.0366
(2) f2/f1 = 0.0361
(3) f/f2 = 1.0140
(4) (r3F + r2R)/(r3F − r2R) = 2.8917
(5) TL/Σd = 1.6965
(6) TL/Ymax = 4.5695

Figure 8A:
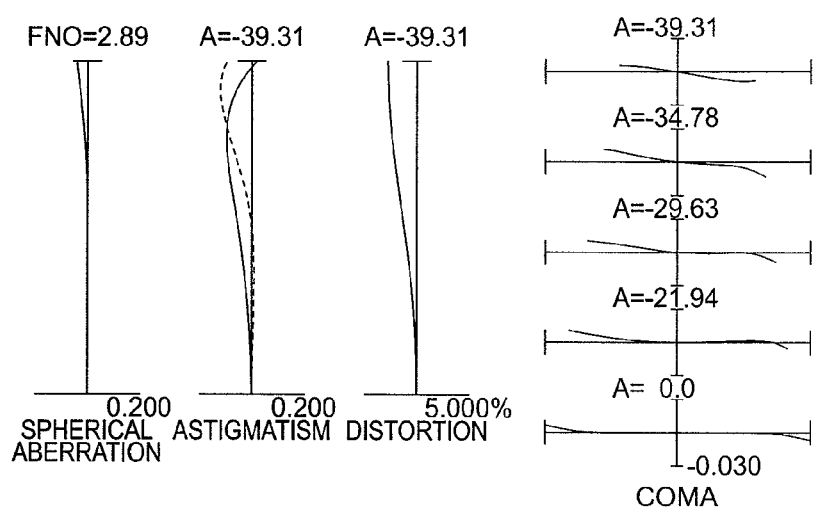
Figure 8B:
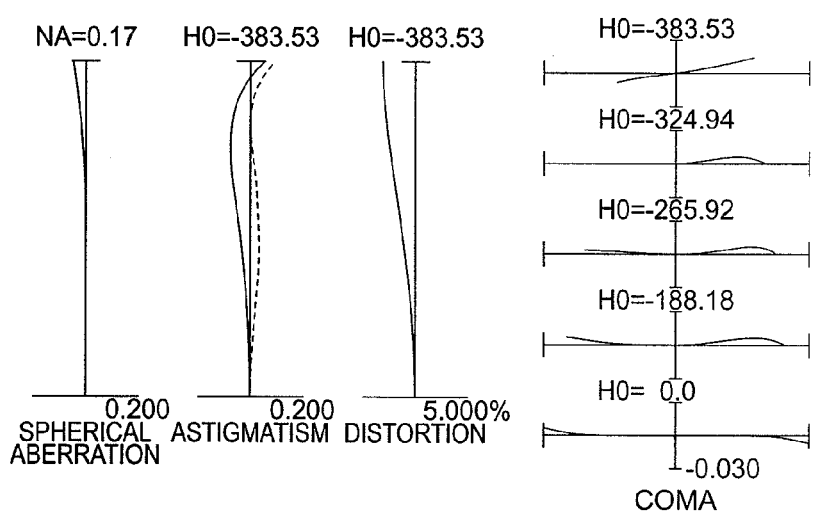

FIGS. 8A and 8B are graphs showing various aberrations of the imaging lens according to Example 4, in which FIG. 8A is upon focusing on infinity, and FIG. 8B is upon focusing on a close shooting distance.

As is apparent from various graphs, the imaging lens according to Example 4 shows superb optical performance as a result of good corrections to various aberrations over entire focusing range from infinity to a close object.

Example 5

Figure 9:
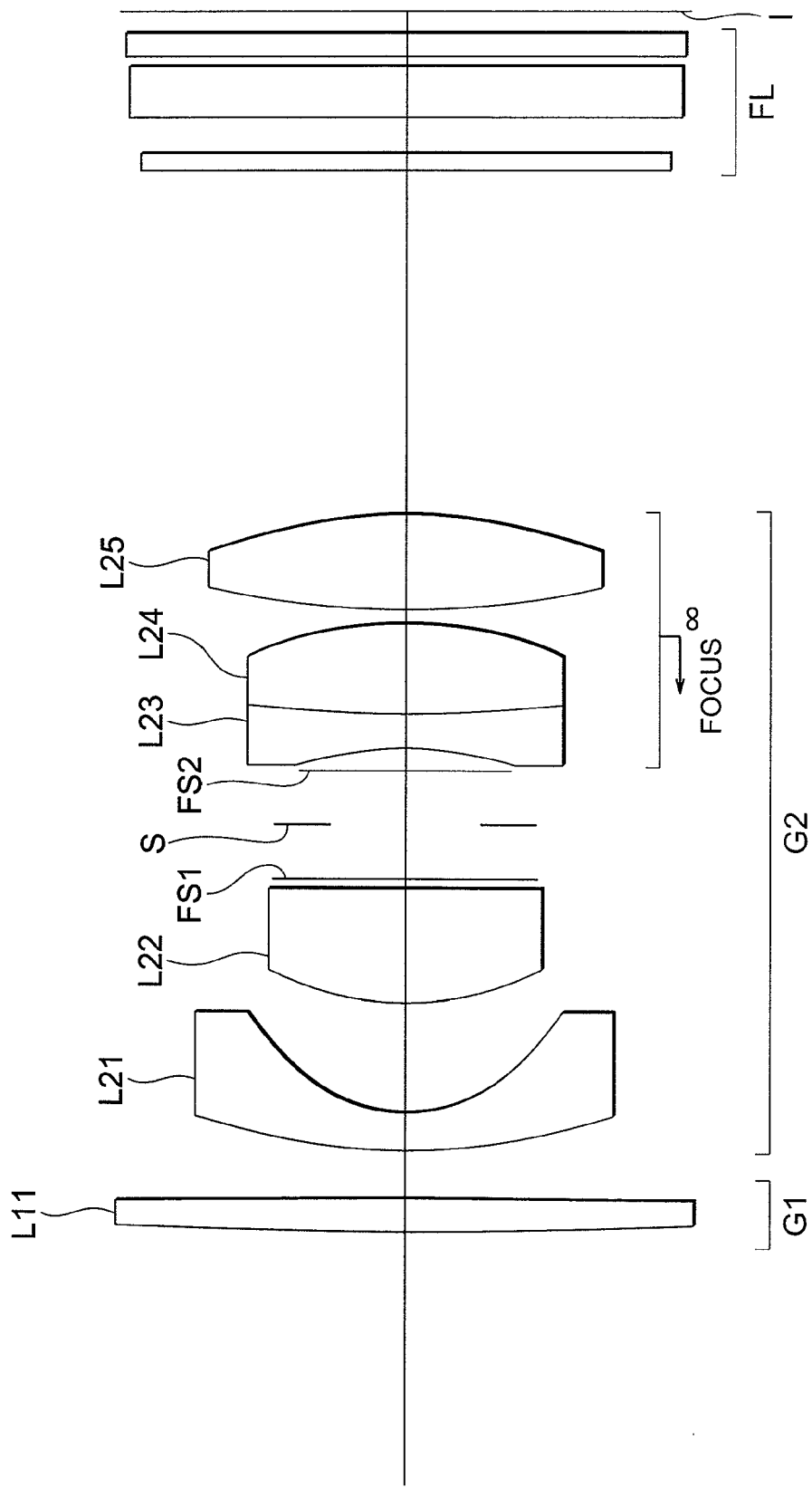
FIG. 9 is a sectional view showing a lens configuration of an imaging lens according to Example 5 of the first embodiment of the present application.

FIG. 9 is a sectional view showing a lens configuration of an imaging lens according to Example 5 of the present application.

As shown in FIG. 9, the imaging lens according to Example 5 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a negative meniscus lens L21 having a convex surface facing the object side, a positive meniscus lens L22 having a convex surface facing the object side, a first flare stopper FS1, an aperture stop S, a second flare stopper FS2, a cemented lens constructed by a double concave negative lens L23 cemented with a double convex positive lens L24, and a double convex positive lens L25.

The filter group FL is composed of a low-pass filter, an infrared-light-blocking filter, and the like.

In the imaging lens according to Example 5, focusing from an infinity object to a close object is carried out by moving a portion of the second lens group G2, in particular, a cemented lens constructed by the negative lens L23 cemented with the positive lens L24, and the positive lens L25 in a body along the optical axis toward the object side. Incidentally, the position of the first lens group G1 is fixed with respect to the image plane I.

Various values associated with the imaging lens according to Example 5 are listed in Table 5.

TABLE 5

(Specifications)

f = 10.30
FNO = 2.92
2ω = 78.60
Y = 8.20
TL = 37.45
BF = 15.52
ACTL = 36.50
ACBF = 14.57

(Lens Data)

| i | r | d | nd | νd |
|---|---|---|---|---|
| 1 | 367.5465 | 1.00 | 1.60300 | 65.44 |
| 2 | −368.4597 | d2 | | |
| 3 | 21.2966 | 1.10 | 1.58313 | 59.38 |
| *4 | 4.4652 | 3.35 | | |
| 5 | 9.2118 | 3.50 | 1.74950 | 35.28 |
| 6 | 129.9098 | 0.30 | | |
| 7 | ∞ | 1.70 | Flare Stopper FS1 | |
| 8 | ∞ | 1.60 | Aperture Stop S | |
| 9 | ∞ | d9 | Flare Stopper FS2 | |
| 10 | −10.7870 | 1.10 | 1.80810 | 22.76 |
| 11 | 46.2743 | 2.75 | 1.75500 | 52.32 |
| 12 | −11.6441 | 0.40 | | |
| 13 | 25.7948 | 2.95 | 1.59201 | 67.02 |
| *14 | −13.3762 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

TABLE 5-continued (Aspherical Surface Data)

Surface Number = 4 r = 4.4652
κ = +0.3656
C4 = +2.6809E−4
C6 = +1.6171E−6
C8 = +2.8446E−7
C10 = +2.2563E−10

Surface Number = 14 r = −13.3762
κ = −11.1665
C4 = −3.9072E−4
C6 = +1.3411E−5
C8 = −2.2460E−7
C10 = +1.8090E−9

(Variable Distances)

|  | INF | CLD |
| --- | --- | --- |
| d2 = | 1.4850 | 1.4850 |
| d9 = | 0.7000 | 0.4728 |
| d14 = | 10.6489 | 10.8762 |
| d20 = | 0.6663 | 0.6663 |

(Lens Group Data)

| Group | I | Focal Length |
| --- | --- | --- |
| 1 | 1 | 305.2986 |
| 2 | 3 | 10.1676 |

(Values for Conditional Expressions)

f = 10.3000
f1 = 305.2986
f2 = 10.1676
r2R = 4.4652
r3F = 9.2118
TL = 37.4502
Σd = 21.9350
Ymax = 8.2000
(1) f/f1 = 0.0337
(2) f2/f1 = 0.0333
(3) f/f2 = 1.0130
(4) (r3F + r2R)/(r3F − r2R) = 2.8814
(5) TL/Σd = 1.7073
(6) TL/Ymax = 4.5671

Figure 10A:
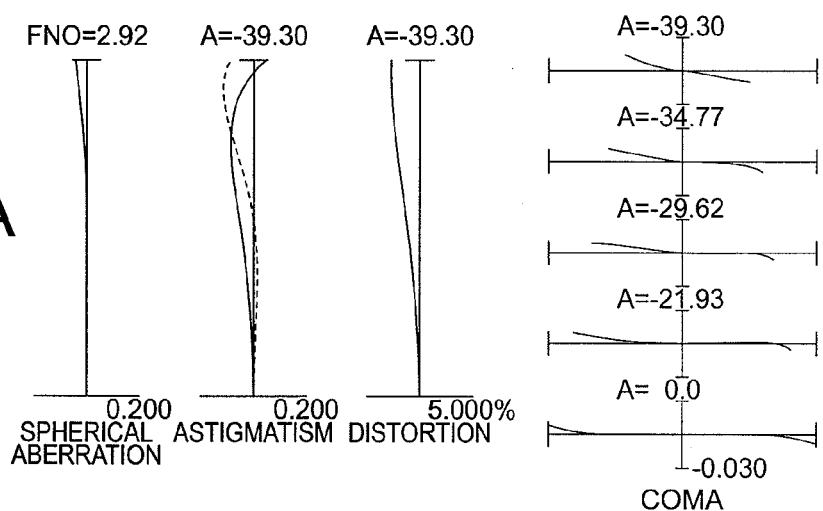
Figure 10B:
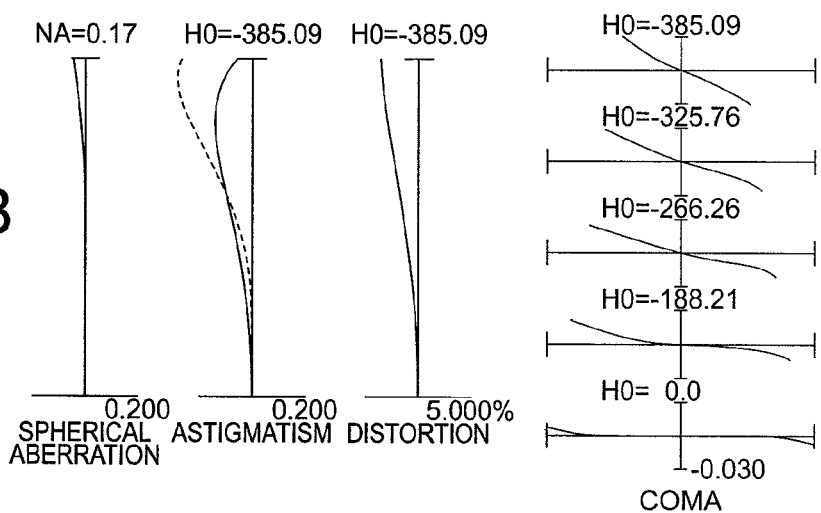

FIGS. 10A and 10B are graphs showing various aberrations of the imaging lens according to Example 5, in which FIG. 10A is upon focusing on infinity, and FIG. 10B is upon focusing on a close shooting distance.

As is apparent from various graphs, the imaging lens according to Example 5 shows superb optical performance as a result of good corrections to various aberrations over entire focusing range from infinity to a close object.

Example 6

FIG. 11 is a sectional view showing a lens configuration of an imaging lens according to Example 6 of the present application.

As shown in FIG. 11, the imaging lens according to Example 6 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a negative meniscus lens L21 having a convex surface facing the object side, a positive meniscus lens L22 having a convex surface facing the object side, a first flare stopper FS1, an aperture stop S, a second flare stopper FS2, a cemented lens constructed by a double concave negative lens L23 cemented with a double convex positive lens L24, and a double convex positive lens L25.

The filter group FL is composed of a low-pass filter, an infrared-light-blocking filter, and the like.

In the imaging lens according to Example 6, focusing from an infinity object to a close object is carried out by moving the whole of the second lens group G2 along the optical axis toward the object side. Incidentally, the position of the first lens group G1 is fixed with respect to the image plane I.

Various values associated with the imaging lens according to Example 6 are listed in Table 6.

TABLE 6

(Specifications)

f = 10.30
FNO = 2.91
2ω = 78.61
Y = 8.20
TL = 37.79
BF = 15.45
ACTL = 36.84
ACBF = 14.50

(Lens Data)

| i | r | d | nd | vd |
| --- | --- | --- | --- | --- |
| 1 | 160.4134 | 1.52 | 1.51633 | 64.14 |
| 2 | −160.4538 | d2 | | |
| 3 | 23.9005 | 1.10 | 1.58313 | 59.38 |
| *4 | 4.4680 | 3.19 | | |
| 5 | 8.8845 | 3.00 | 1.74950 | 35.28 |
| 6 | 59.7352 | 0.30 | | |
| 7 | ∞ | 1.70 | Flare Stopper FS1 | |
| 8 | ∞ | 1.05 | Aperture Stop S | |
| 9 | ∞ | 1.25 | Flare Stopper FS2 | |
| 10 | −10.3948 | 1.00 | 1.80810 | 22.76 |
| 11 | 53.0153 | 2.70 | 1.75500 | 52.32 |
| 12 | −10.8113 | 0.40 | | |
| 13 | 22.9281 | 2.99 | 1.59201 | 67.05 |
| *14 | −14.0952 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

(Aspherical Surface Data)

Surface Number = 4 r = 4.4680
κ = +0.4037
C4 = +2.7434E−4
C6 = +4.0423E−6
C8 = +1.7001E−7
C10 = +1.0858E−8

Surface Number = 14 r = −14.0952
κ = −11.0203
C4 = −3.0335E−4
C6 = +1.0309E−5
C8 = −1.5359E−7
C10 = +1.0836E−9

TABLE 6-continued (Variable Distances)

| | INF | CLD |
|---|---|---|
| d2 = | 2.1336 | 1.9062 |
| d14 = | 10.5627 | 10.7901 |
| d20 = | 0.6862 | 0.6862 |

(Lens Group Data)

| Group | I | Focal Length |
|---|---|---|
| 1 | 1 | 155.6106 |
| 2 | 3 | 9.9966 |

(Values for Conditional Expressions)

f = 10.3014
f1 = 155.6106
f2 = 9.9966
r2R = 4.4680
r3F = 8.8845
TL = 37.7862
Σd = 22.3373
Ymax = 8.2000
(1) f/f1 = 0.0662
(2) f2/f1 = 0.0642
(3) f/f2 = 1.0305
(4) (r3F + r2R)/(r3F − r2R) = 3.0233
(5) TL/Σd = 1.6916
(6) TL/Ymax = 4.6081

Figure 12A:
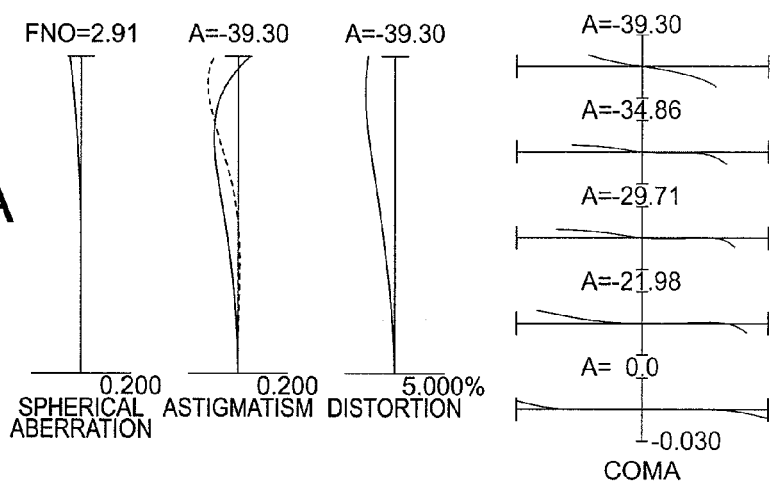
Figure 12B:
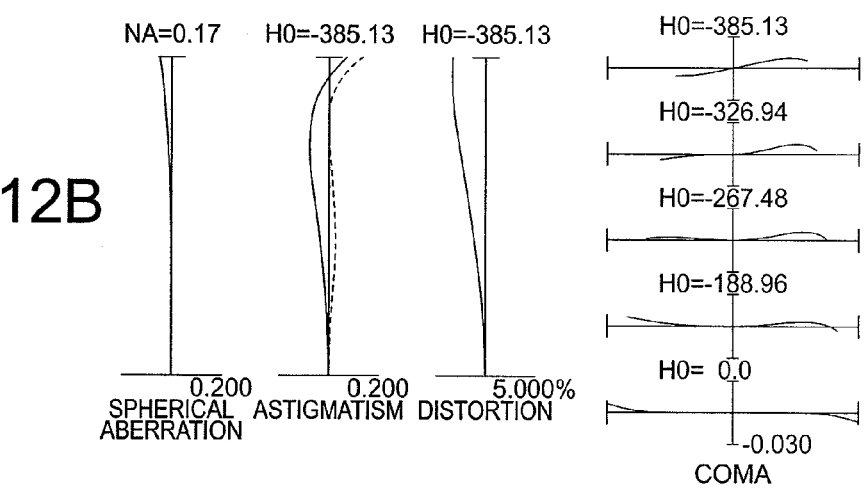

FIGS. 12A and 12B are graphs showing various aberrations of the imaging lens according to Example 6, in which FIG. 12A is upon focusing on infinity, and FIG. 12B is upon focusing on a close shooting distance.

As is apparent from various graphs, the imaging lens according to Example 6 shows superb optical performance as a result of good corrections to various aberrations over entire focusing range from infinity to a close object.

Example 7

FIG. 13 is a sectional view showing a lens configuration of an imaging lens according to Example 7 of the present application.

As shown in FIG. 13, the imaging lens according to Example 7 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a negative meniscus lens L21 having a convex surface facing the object side, a positive meniscus lens L22 having a convex surface facing the object side, a first flare stopper FS1, an aperture stop S, a second flare stopper FS2, a cemented lens constructed by a double concave negative lens L23 cemented with a double convex positive lens L24, and a double convex positive lens L25.

The filter group FL is composed of a low-pass filter, an infrared-light-blocking filter, and the like.

In the imaging lens according to Example 7, focusing from an infinity object to a close object is carried out by moving the whole of the second lens group G2 along the optical axis toward the object side. Incidentally, the position of the first lens group G1 is fixed with respect to the image plane I.

Various values associated with the imaging lens according to Example 7 are listed in Table 7.

TABLE 7

(Specifications)

f = 10.30
FNO = 2.94
2ω = 78.61
Y = 8.20
TL = 37.86
BF = 15.56
ACTL = 36.91
ACBF = 14.61

(Lens Data)

| i | r | d | nd | νd |
|---|---|---|---|---|
| 1 | 307.5313 | 1.20 | 1.48749 | 70.23 |
| 2 | −307.5947 | d2 | | |
| 3 | 21.9567 | 1.10 | 1.58313 | 59.38 |
| *4 | 4.5581 | 3.45 | | |
| 5 | 9.6306 | 3.05 | 1.74950 | 35.28 |
| 6 | 292.4663 | 0.30 | | |
| 7 | ∞ | 1.70 | Flare Stopper FS1 | |
| 8 | ∞ | 1.05 | Aperture Stop S | |
| 9 | ∞ | 1.25 | Flare Stopper FS2 | |
| 10 | −8.9112 | 1.00 | 1.80810 | 22.76 |
| 11 | 506.5428 | 2.70 | 1.75500 | 52.32 |
| 12 | −9.3793 | 0.40 | | |
| 13 | 21.0314 | 2.97 | 1.49700 | 81.61 |
| *14 | −13.3938 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

(Aspherical Surface Data)

Surface Number = 4 r = 4.5581
κ = +0.1979
C4 = +4.8517E−4
C6 = +5.1785E−6
C8 = +2.7432E−7
C10 = +2.0130E−9

Surface Number = 14 r = −13.3938
κ = −12.8217
C4 = −4.2055E−4
C6 = +1.6915E−5
C8 = −2.9730E−7
C10 = +2.4991E−9

(Variable Distances)

| | INF | CLD |
|---|---|---|
| d2 = | 2.1354 | 1.9083 |
| d14 = | 10.6990 | 10.9261 |
| d20 = | 0.6645 | 0.6645 |

(Lens Group Data)

| Group | I | Focal Length |
|---|---|---|
| 1 | 1 | 315.6575 |
| 2 | 3 | 10.1518 |

(Values for Conditional Expressions)

f = 10.3000
f1 = 315.6575
f2 = 10.1518
r2R = 4.5581

TABLE 7-continued

```
r3F = 9.6306
TL = 37.8645
Σd = 22.3010
Ymax = 8.2000
(1) f/f1 = 0.0326
(2) f2/f1 = 0.0322
(3) f/f2 = 1.0146
(4) (r3F + r2R)/(r3F − r2R) = 2.7972
(5) TL/Σd = 1.6979
(6) TL/Ymax = 4.6176
```

Figure 14A:
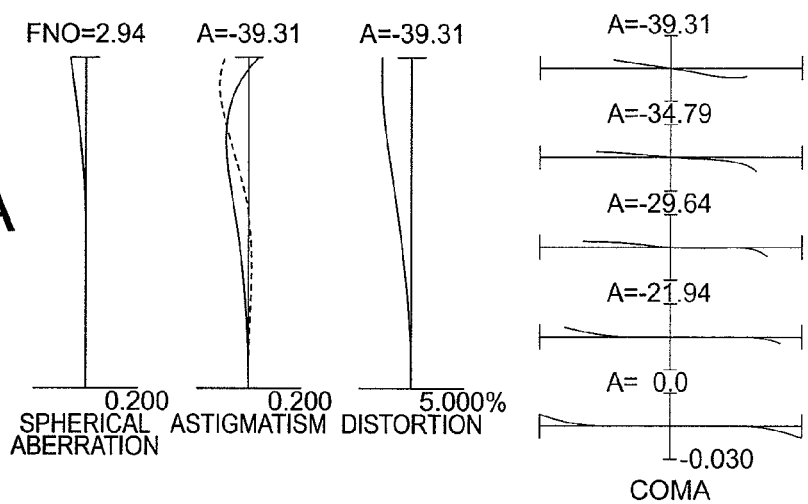
Figure 14B:
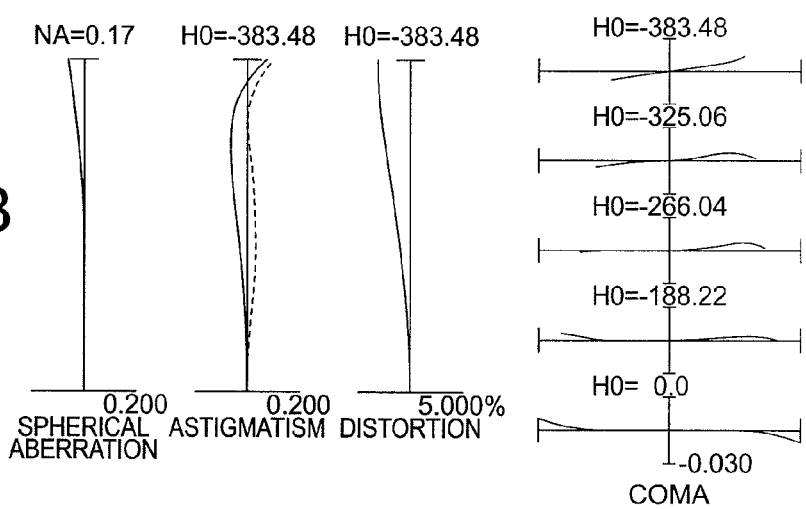

FIGS. 14A and 14B are graphs showing various aberrations of the imaging lens according to Example 7, in which FIG. 14A is upon focusing on infinity, and FIG. 14B is upon focusing on a close shooting distance.

As is apparent from various graphs, the imaging lens according to Example 6 shows superb optical performance as a result of good corrections to various aberrations over entire focusing range from infinity to a close object.

Each example described above makes it possible to provide a compact imaging lens having a wide angle of view of 60 degrees or more, a large aperture of an f-number of about 2.8 and excellent optical performance over entire image frame with excellently correcting various aberrations upon focusing on an infinity object to a close object.

In an imaging lens according to each Example, a back focal length, which is a distance along the optical axis between the image side lens surface of a lens disposed to the most image side and the image plane, is preferably from about 10.0 mm to 30.0 mm in the smallest state. Moreover, in an imaging lens according to each Example, the image height is preferably 5.0 mm to 12.5 mm, and most preferably 5.0 mm to 9.5 mm.

Then, an outline of a method for manufacturing an imaging lens according to the first embodiment of the present application is explained below with reference to FIG. 31.

Figure 31:
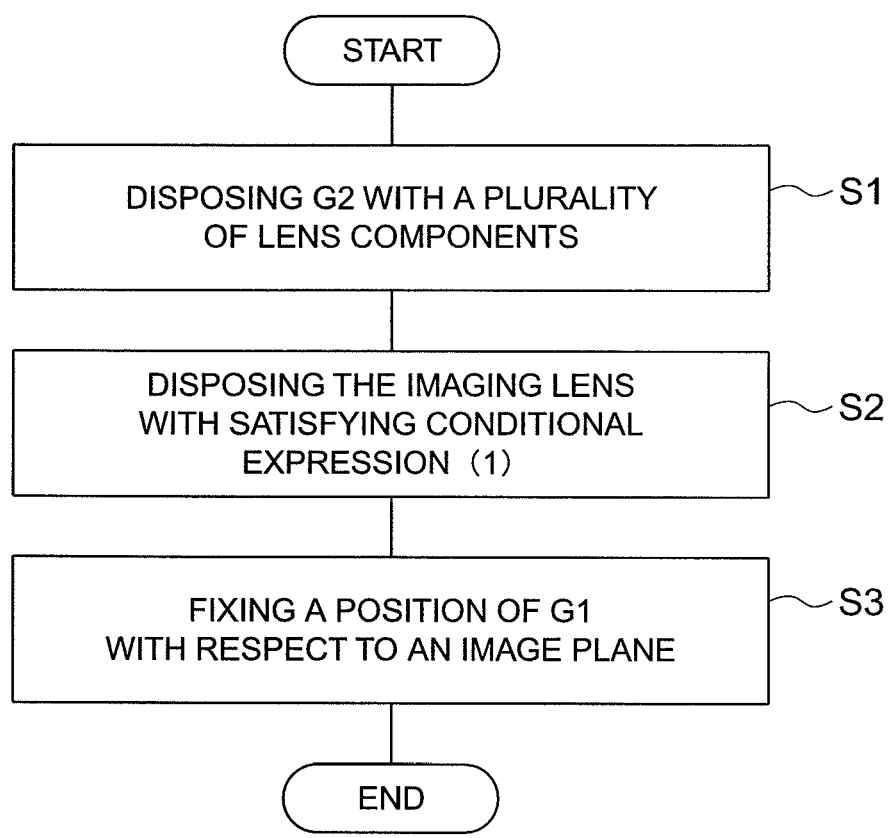
FIG. 31 is a flowchart showing a method for manufacturing an imaging lens according to the first embodiment of the present embodiment.

FIG. 31 is a flowchart showing a method for manufacturing an imaging lens according to the present embodiment.

The method for manufacturing an imaging lens is a method for manufacturing an imaging lens including, in order from an object side, a first lens group having positive refractive power and a second lens group having positive refractive, the method includes the following steps S1 through S3:

Step S1: disposing the second lens group with a plurality of lens components;

Step S2: disposing the imaging lens with satisfying the following conditional expression (1):

$$0.015 < f/f1 < 0.085 \quad (1)$$

where f denotes a focal length of the imaging lens, and f1 denotes a focal length of the first lens group; and Step S3: fixing a position of the first lens group with respect to an image plane.

With the method for manufacturing an imaging lens according to the present application, it becomes possible to manufacture a compact imaging lens having a wide angle of view, a large aperture and excellent optical performance over entire image frame with excellently correcting various aberrations upon focusing on an infinity object to a close object.

Then, an outline of a method for manufacturing an imaging lens seen from another point of view according to the first embodiment of the present application is explained below with reference to FIG. 32.

Figure 32:
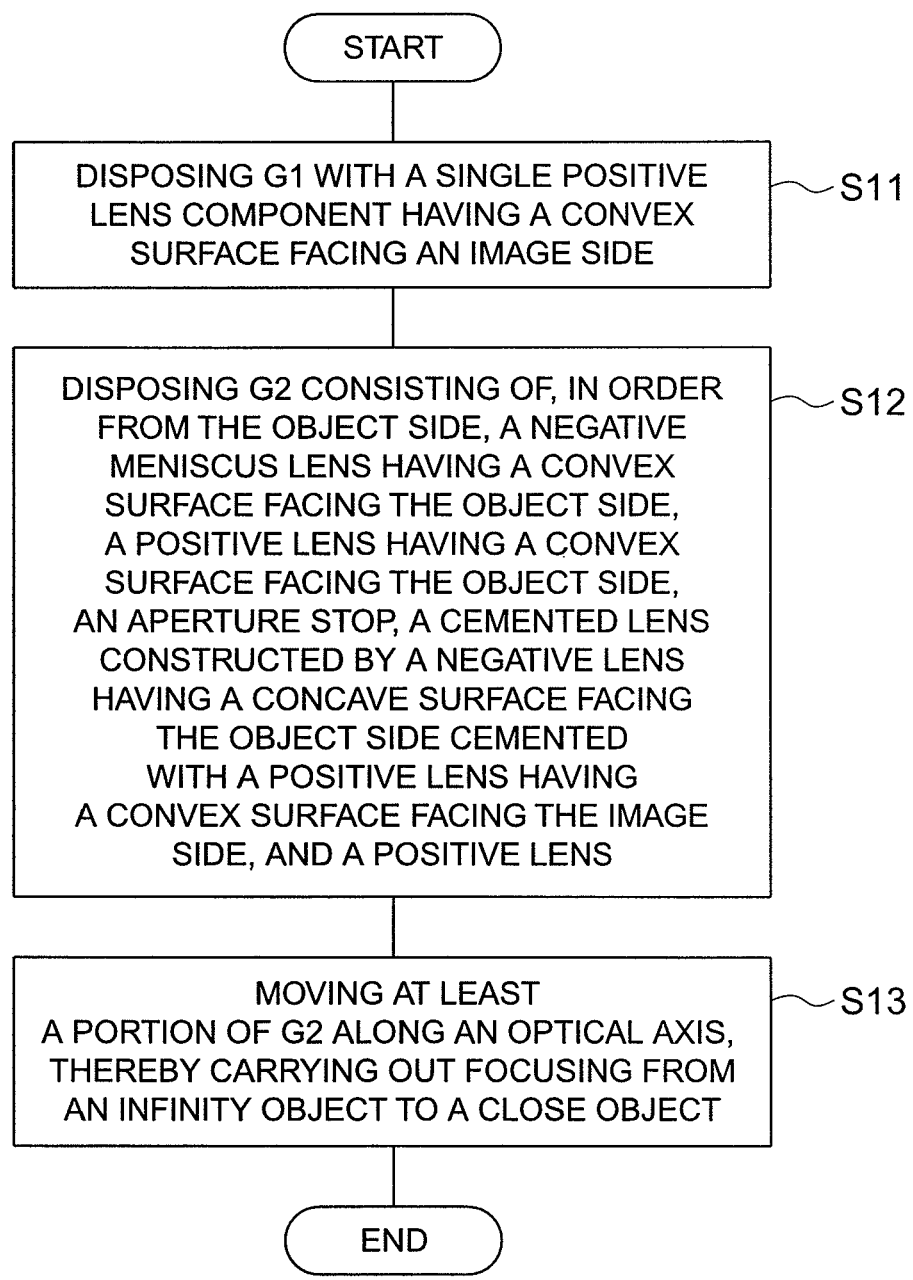
FIG. 32 is a flowchart showing a method for manufacturing an imaging lens seen from another point of view according to the first embodiment of the present application.

FIG. 32 is a flowchart showing a method for manufacturing an imaging lens seen from another point of view according to the first embodiment of the present application.

The method for manufacturing an imaging lens seen from another point of view according to the first embodiment is a method for manufacturing an imaging lens including, in order from an object side, a first lens group having positive refractive power and a second lens group having positive refractive, the method includes the following steps S11 through S13:

Step S11: disposing the first lens group with a single positive lens component having a convex surface facing an image side;

Step S12: disposing the second lens group consisting of, in order from the object side, a negative meniscus lens having a convex surface facing the object side, a positive lens having a convex surface facing the object side, an aperture stop, a cemented lens constructed by a negative lens having a concave surface facing the object side cemented with a positive lens having a convex surface facing the image side, and a positive lens into a lens barrel in order from the object side; and Step S13: moving the whole or a portion of the second lens group along an optical axis by providing a well-known moving mechanism in the lens barrel, thereby carrying out focusing from an infinity object to a close object.

With this method for manufacturing an imaging lens seen from another point of view according to the first embodiment of the present application, it becomes possible to manufacture a compact imaging lens having a wide angle of view, a large aperture and excellent optical performance over entire image frame with excellently correcting various aberrations upon focusing on an infinity object to a close object.

Second Embodiment

Then, an imaging lens, an optical apparatus equipped with the imaging lens, and a method for manufacturing the imaging lens according to a second embodiment of the present application are explained below.

An imaging lens according to the second embodiment of the present application includes, in order from an object side, a first lens group having positive refractive power, and a second lens group having positive refractive power. The first lens group consists of a single lens component. The second lens group consists of, in order from the object side, a front lens group, an aperture stop, and a rear lens group. The whole or the rear lens group of the second lens group is moved as a shift lens group in a direction including a component perpendicular to an optical axis.

As described above, an imaging lens according to the second embodiment of the present application includes, in order from the object side, the first lens group having positive refractive power, and the second lens group having positive refractive power. The first lens group consists of a single lens component. The second lens group consists of, in order from the object side, the front lens group, the aperture stop, and the rear lens group. With this configuration, it becomes possible to realize a compact imaging lens having a wide angle of view and high optical performance. In particular, the second lens group becomes close to a symmetric type refractive power distribution, which is, in order from the object side, the front lens group, the aperture stop, and the rear lens group, so that it becomes possible to excellently correct curvature of field and distortion. Incidentally, a lens component is defined as a single lens or a cemented lens constructed by cementing two lenses or more.

Moreover, at least a portion of the second lens group is moved as a shift lens group in a direction including a component perpendicular to the optical axis so as to shifting the image, thereby correcting an image blur caused by a camera shake (vibration reduction). In particular, when the whole of the second lens group is made to be the shift lens group, driving mechanism can be simplified. Moreover, when the rear lens group in the second lens group is made to be the shift lens group, since the shift lens group can be lightened, response speed upon vibration reduction can be increased.

With this configuration, it becomes possible to excellently correct various aberrations and realize a compact imaging lens having excellent optical performance over entire image frame with minimally suppressing deterioration in optical performance upon vibration reduction.

In an imaging lens according to the second embodiment of the present application, the following conditional expression (7) is preferably satisfied:

$$0.00 < f2R/|f2F| < 0.20 \tag{7}$$

where f2F denotes a focal length of the front lens group, and f2R denotes a focal length of the rear lens group.

Conditional expression (7) defines the focal length of the front lens group and the focal length of the rear lens group. With satisfying conditional expression (7), an imaging lens seen from another point of view according to the present application makes it possible to excellently correct curvature of field, spherical aberration, coma and spherical aberration generated in the front lens group alone, and coma generated in the second lens group.

When the ratio f2R/|f2F| is equal to or exceeds the upper limit of conditional expression (7), refractive power of the front lens group becomes relatively strong, so that it becomes difficult to correct spherical aberration and coma generated in the front lens group alone. Moreover, refractive power of the rear lens group becomes relatively weak, so that it becomes difficult to correct curvature of field. Accordingly, it is undesirable. In order to secure the effect of the present application, it is preferable to set the upper limit of conditional expression (7) to 0.17. In order to further secure the effect of the present application, it is most preferable to set the upper limit of conditional expression (7) to 0.15.

On the other hand, when the ratio f2R/|f2F| is equal to or falls below the lower limit of conditional expression (7), refractive power of the front lens group becomes relatively weak, correction of spherical aberration becomes insufficient, so that it is undesirable. Moreover, refractive power of the rear lens group becomes relatively strong, so that coma generated in the second lens group becomes excessively large. Accordingly, the purpose of the present application to obtain excellent optical performance cannot be realized. In order to secure the effect of the present application, it is preferable to set the lower limit of conditional expression (7) to 0.003. In order to further secure the effect of the present application, it is most preferable to set the lower limit of conditional expression (7) to 0.005.

In an imaging lens according to the second embodiment of the present application, in order to obtain higher optical performance, the rear lens group preferably includes, in order from the object side, a cemented lens constructed by a negative lens having a concave surface facing the object side cemented with a positive lens having a convex surface facing an image side, and a double convex positive lens. With this configuration, it becomes possible to excellently correct curvature of field and coma.

In an imaging lens according to the second embodiment of the present application, at least a portion of the second lens group is preferably moved as a focusing lens group along the optical axis, thereby carrying out focusing from an infinity object to a close object. With this configuration, a moving amount of the focusing lens group toward the object upon focusing becomes extremely small, so that variations in spherical aberration and curvature of field can be excellently suppressed. Moreover, interference between lenses and mechanical parts that holds lenses can be prevented.

In an imaging lens according to the second embodiment of the present application, in order to harmonize high optical performance with compactness, the front lens group preferably includes, in order from the object side, a negative meniscus lens having a convex surface facing the object side, and a positive meniscus lens having a convex surface facing the object side. With this configuration, it becomes possible to excellently correct spherical aberration and curvature of field generated in the front lens group alone.

In an imaging lens according to the second embodiment of the present application, the front lens group preferably includes a plurality of lens components, and the following conditional expression (4) is preferably satisfied:

$$2.50 < (r3F+r2R)/(r3F-r2R) < 3.80 \tag{4}$$

where r2R denotes a radius of curvature of the image side lens surface of a lens component disposed to the most object side in the front lens group, and r3F denotes a radius of curvature of a lens surface adjacent to the image side of the image side lens surface.

Conditional expression (4) is for excellently correcting coma and curvature of field generated in the second lens group alone. However, conditional expression (4) has already been explained above, so that duplicated explanations are omitted.

In an imaging lens according to the second embodiment of the present application, the following conditional expression (5) is preferably satisfied:

$$1.55 < TL/\Sigma d < 1.75 \tag{5}$$

where TL denotes a total lens length of the imaging lens, and $\Sigma d$ denotes a distance along an optical axis between the most object side lens surface in the first lens group and the most image side lens surface in the second lens group.

Conditional expression (5) defines an appropriate total lens length of the imaging lens. However, conditional expression (5) has already been explained above, so that duplicated explanations are omitted.

In an imaging lens according to the second embodiment of the present application, the following conditional expression (6) is preferably satisfied:

$$4.00 < TL/Y\text{max} < 5.00 \tag{6}$$

where TL denotes a total lens length of the imaging lens, and Ymax denotes the maximum image height of the imaging lens.

Conditional expression (6) defines an appropriate total lens length of the imaging lens. However, conditional expression (6) has already been explained above, so that duplicated explanations are omitted.

In an imaging lens according to the second embodiment of the present application, the following conditional expression (2) is preferably satisfied:

$$0.015 < f2/f1 < 0.085 \tag{2}$$

where f1 denotes a focal length of the first lens group, and f2 denotes a focal length of the second lens group.

Conditional expression (2) defines the focal length of the first lens group and the focal length of the second lens group. However, conditional expression (2) has already been explained above, so that duplicated explanations are omitted.

In an imaging lens according to the second embodiment of the present application, the following conditional expression (8) is preferably satisfied:

$$0.70 < f/f2R < 0.85 \tag{8}$$

where f denotes a focal length of the imaging lens, and f2R denotes a focal length of the rear lens group.

Conditional expression (8) defines the focal length of the imaging lens and the focal length of the rear lens group. With satisfying conditional expression (8), an imaging lens seen from another point of view according to the present application makes it possible to suppress variation in curvature of field upon vibration reduction with excellently correcting spherical aberration generated in the rear lens group alone.

When the ratio f/f2R is equal to or exceeds the upper limit of conditional expression (8), refractive power of the rear lens group becomes strong, so that spherical aberration generated in the rear lens group alone becomes large. Accordingly, it is undesirable. In order to secure the effect of the present application, it is preferable to set the upper limit of conditional expression (8) to 0.83. In order to further secure the effect of the present application, it is most preferable to set the upper limit of conditional expression (8) to 0.82.

On the other hand, when the ratio f/f2R is equal to or falls below the lower limit of conditional expression (8), refractive power of the rear lens group becomes weak, so that the rear lens group does not become afocal. Accordingly, variation in curvature of field upon vibration reduction becomes large. In order to secure the effect of the present application, it is preferable to set the lower limit of conditional expression (8) to 0.72. In order to further secure the effect of the present application, it is most preferable to set the lower limit of conditional expression (8) to 0.74.

In an imaging lens according to the second embodiment of the present application, in order to realize higher optical performance, the first lens group preferably consists of a positive lens having a convex surface facing the object side. With this configuration, it becomes possible to excellently correct distortion and curvature of field generated in the whole system of the imaging lens.

In an imaging lens according to the second embodiment of the present application, in order to realize higher optical performance, the position of the first lens group is preferably fixed with respect to the image plane. With this configuration, it becomes possible to excellently correct distortion and curvature of field generated in the whole system of the imaging lens. Moreover, even if external force is inadvertently applied upon using the imaging lens, a moving portion of the imaging lens can be protected.

In an imaging lens according to the second embodiment of the present application, the following conditional expression (1) is preferably satisfied:

$$0.015 < f/f1 < 0.085 \tag{1}$$

where f denotes a focal length of the imaging lens, and f1 denotes a focal length of the first lens group.

Conditional expression (1) defines the focal length of the first lens group and the focal length of the imaging lens. However, conditional expression (1) has already been explained above, so that duplicated explanations are omitted.

In an imaging lens according to the second embodiment of the present application, in order to harmonize higher optical performance with compactness, the front lens group preferably includes at least one aspherical surface. With this configuration, spherical aberration and curvature of field can be excellently corrected.

In an imaging lens according to the second embodiment of the present application, in order to harmonize high optical performance with compactness, the front lens group preferably includes a plurality of lens components, and the most object side lens component in the first lens group preferably includes at least one aspherical surface. With this configuration, spherical aberration and curvature of field can be excellently corrected and higher optical performance and compactness can be harmonized.

In an imaging lens according to the second embodiment of the present application, in order to harmonize higher optical performance with compactness, the rear lens group preferably includes at least one aspherical surface. With this configuration, distortion and curvature of field can be excellently corrected.

In an imaging lens according to the second embodiment of the present application, in order to realize higher optical performance, it is preferable that the rear lens group includes a plurality of lens components and the most image side lens component in the rear lens group includes at least one aspherical surface. With this configuration, distortion and curvature of field generated upon focusing can be excellently corrected.

An optical apparatus according to the second embodiment of the present application is equipped with the above-described imaging lens. With this configuration, it becomes possible to realize a compact optical apparatus capable of correcting various aberrations, suppressing deterioration in optical performance minimally upon vibration reduction, and having excellent optical performance over entire image frame.

Then, a method for manufacturing an imaging lens according to the second embodiment of the present application is a method for manufacturing an imaging lens including, in order from an object side, a first lens group having positive refractive power, and a second lens group having positive refractive power, the method comprising steps of:

disposing the first lens group with a single lens component;

disposing the second lens group consisting of, in order from the object side, a front lens group, an aperture stop, and a rear lens group; and moving the whole of the second lens group or the rear lens group as a shift lens group in a direction including a component perpendicular to an optical axis.

With this method for manufacturing an imaging lens according to the second embodiment of the present application, it becomes possible to manufacture a compact imaging lens capable of correcting various aberrations, suppressing deterioration in optical performance minimally upon vibration reduction, and having excellent optical performance over entire image frame.

Then, an imaging lens according to each numerical example of the second embodiment of the present application is explained below with reference to accompanying drawings.

Example 8

Figure 15:
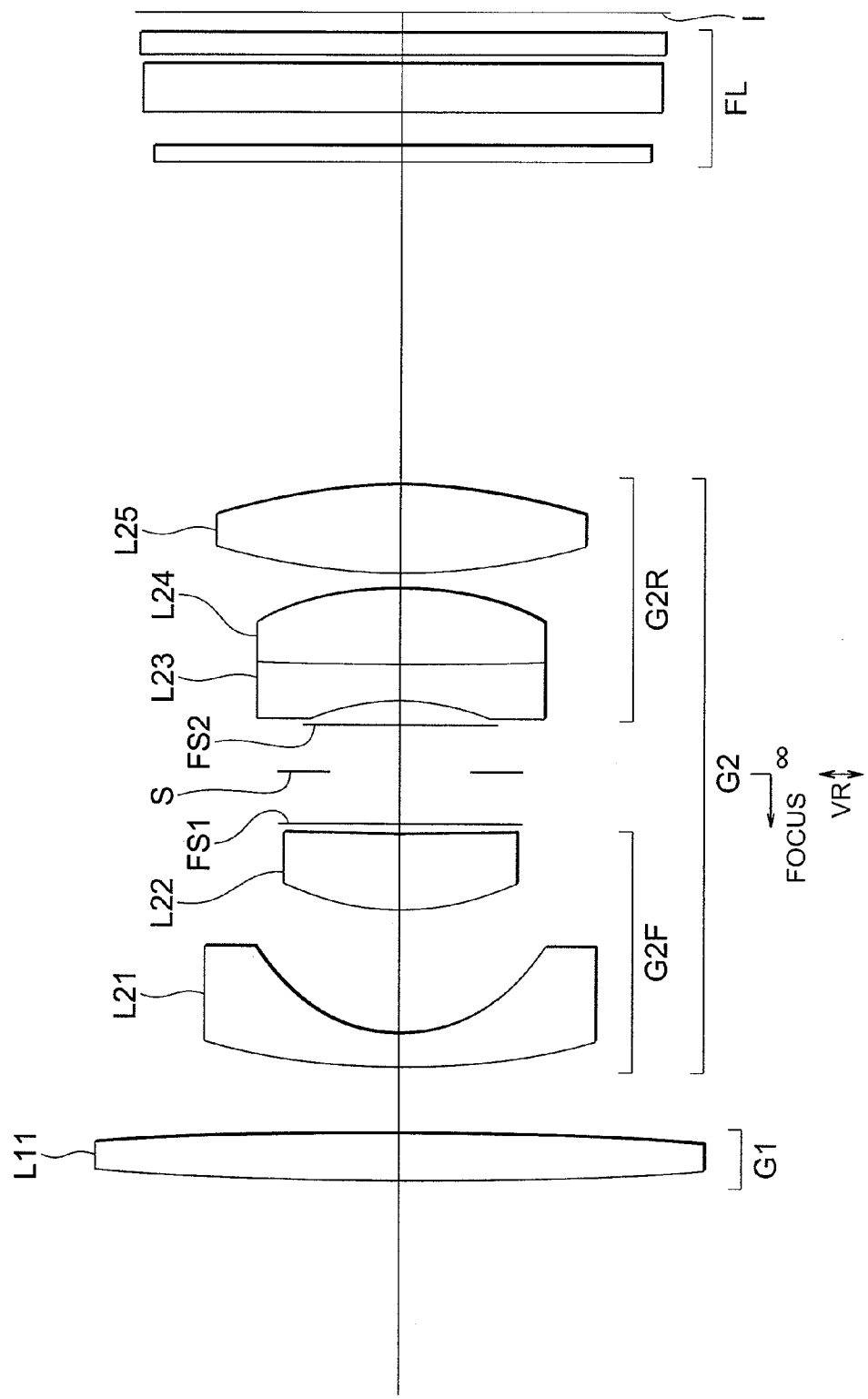
FIG. 15 is a sectional view showing a lens configuration of an imaging lens according to Example 8 of a second embodiment of the present application.

FIG. 15 is a sectional view showing a lens configuration of an imaging lens according to Example 8 of the second embodiment of the present application.

As shown in FIG. 15, the imaging lens according to Example 8 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a front lens group G2F having positive refractive power, a first flare stopper FS1, an aperture stop S, a second flare stopper FS2, and a rear lens group G2R having positive refractive power.

The front lens group G2F is composed of, in order from the object side, a negative meniscus lens L21 having a convex surface facing the object side, and a positive meniscus lens L22 having a convex surface facing the object side.

The rear lens group G2R is composed of, in order from the object side, a cemented lens constructed by a double concave negative lens L23 cemented with a double convex positive lens L24, and a double convex positive lens L25.

The filter group FL is composed of a low-pass filter, an infrared-light-blocking filter, and the like.

In the imaging lens according to Example 8, focusing from an infinity object to a close object is carried out by moving the whole of the second lens group G2 along the optical axis toward the object side. Incidentally, the position of the first lens group G1 is fixed with respect to the image plane I.

Moreover, in the imaging lens according to Example 8, the whole of the second lens group is moved as a shift lens group in a direction including a component perpendicular to the optical axis, thereby correcting an image blur upon generating a camera shake.

Various values associated with the imaging lens according to Example 8 are listed in Table 8.

TABLE 8

(Specifications)

$f = 10.30$
$FNO = 2.92$
$2\omega = 78.61$
$Y = 8.20$
$TL = 37.96$
$Bf = 15.38$
$ACTL = 37.01$
$ACBF = 14.43$ (Lens Data)

| i | r | d | nd | νd |
|---|---|---|---|---|
| 1 | 160.5145 | 1.55 | 1.48749 | 70.23 |
| 2 | −160.5440 | d2 | | |
| 3 | 26.1848 | 1.10 | 1.58913 | 61.16 |
| *4 | 4.8842 | 3.95 | | |
| 5 | 9.0140 | 2.50 | 1.74950 | 35.28 |
| 6 | 79.5499 | 0.30 | | |
| 7 | ∞ | 1.70 | Flare Stopper FS1 | |
| 8 | ∞ | 1.55 | Aperture Stop S | |
| 9 | ∞ | 0.75 | Flare Stopper FS2 | |
| 10 | −8.6375 | 1.20 | 1.80810 | 22.76 |
| 11 | 113.7348 | 2.50 | 1.75500 | 52.32 |
| 12 | −10.6165 | 0.40 | | |
| 13 | 21.1214 | 2.95 | 1.59201 | 67.02 |
| *14 | −13.9521 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

(Aspherical Surface Data)

Surface Number = 4

$r = 4.8842$
$\kappa = +0.5528$
$C4 = +7.2260E-5$
$C6 = -3.0492E-6$
$C8 = +2.2154E-7$
$C10 = -7.9802E-10$
Surface Number = 14

$r = -13.9521$
$\kappa = -11.4868$
$C4 = -3.0331E-4$

TABLE 8-continued $C6 = +1.1991E-5$
$C8 = -1.9031E-7$
$C10 = +1.4300E-9$ (Variable Distances)

| | INF | CLD |
|---|---|---|
| d2 = | 2.1334 | 1.9061 |
| d14 = | 10.5166 | 10.7439 |
| d20 = | 0.6644 | 0.6644 |

(Lens Group Data)

| Group | I | Focal Length |
|---|---|---|
| 1 | 1 | 164.9097 |
| 2 | 3 | 9.9988 |

(Values for Conditional Expressions)

Figure 16A:
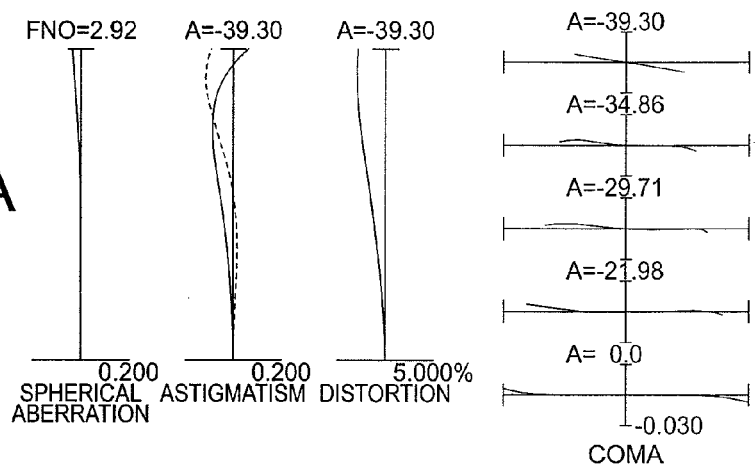
Figure 16B:
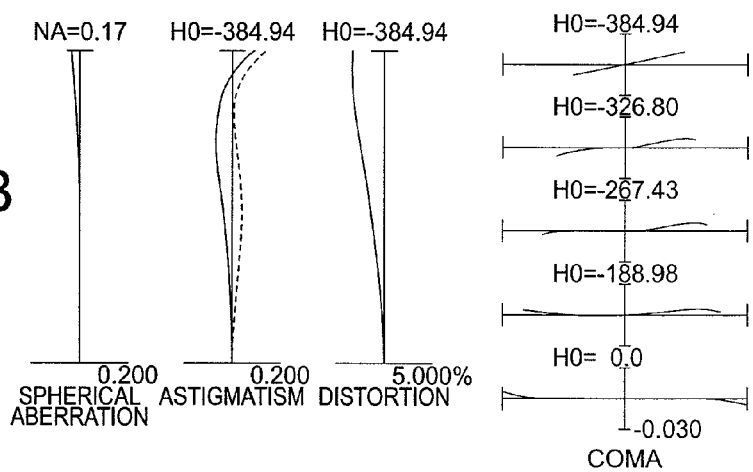
Figure 16C:
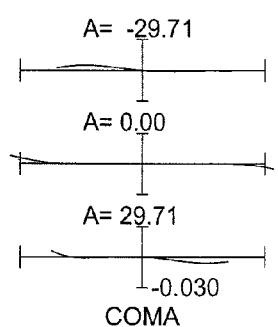

$f = 10.3000$
$f1 = 164.9097$
$f2 = 9.9988$
$f2F = 217.6430$
$f2R = 13.5869$
$r2R = 4.8842$
$r3F = 9.0140$
$TL = 37.9644$
$\Sigma d = 22.5834$
$Ymax = 8.2000$
(1) $f/f1 = 0.0625$
(2) $f2/f1 = 0.0606$
(4) $(r3F + r2R)/(r3F - r2R) = 3.3653$
(5) $TL/\Sigma d = 1.6811$
(6) $TL/Ymax = 4.6298$
(7) $f2R/|f2F| = 0.0624$
(8) $f/f2R = 0.7581$ FIGS. 16A, 16B and 16C are graphs showing various aberrations of the imaging lens according to Example 8 of the second embodiment, in which FIG. 16A is upon focusing on an infinity object, FIG. 16B is upon focusing on a close shooting distance, and FIG. 16C is coma upon focusing on an infinity object upon moving the shift lens group vertically upward in FIG. 15 by an amount of 0.1 mm.

As is apparent from various graphs, the imaging lens according to Example 8 shows superb optical performance as a result of good corrections to various aberrations over entire focusing range from infinity to a close object with minimally suppressing deterioration in optical performance upon vibration reduction.

Example 9

FIG. 17 is a sectional view showing a lens configuration of an imaging lens according to Example 9 of the second embodiment of the present application.

As shown in FIG. 17, the imaging lens according to Example 9 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a front lens group G2F having positive refractive power, a first flare stopper FS1, an aperture stop S, a second flare stopper FS2, and a rear lens group G2R having positive refractive power.

The front lens group G2F is composed of, in order from the object side, a negative meniscus lens L21 having a convex surface facing the object side, and a positive meniscus lens L22 having a convex surface facing the object side.

The rear lens group G2R is composed of, in order from the object side, a cemented lens constructed by a double concave negative lens L23 cemented with a double convex positive lens L24, and a double convex positive lens L25.

The filter group FL is composed of a low-pass filter, an infrared-light-blocking filter, and the like.

In the imaging lens according to Example 9, focusing from an infinity object to a close object is carried out by moving the rear lens group G2R, which is a portion of the second lens group G2, along the optical axis toward the object side. Incidentally, the position of the first lens group G1 is fixed with respect to the image plane I.

Moreover, in the imaging lens according to Example 9, the whole of the second lens group is moved as a shift lens group in a direction including a component perpendicular to the optical axis, thereby correcting an image blur upon generating a camera shake.

Various values associated with the imaging lens according to Example 9 are listed in Table 9.

TABLE 9

(Specifications)

f = 10.30
FNO = 2.92
2ω = 78.60
Y = 8.20
TL = 37.97
BF = 15.46
ACTL = 37.02
ACBF = 14.51

(Lens Data)

| i | r | d | nd | vd |
|---|---|---|---|---|
| 1 | 346.0582 | 1.20 | 1.60300 | 65.44 |
| 2 | −346.0893 | d2 | | |
| 3 | 24.3607 | 1.20 | 1.58313 | 59.38 |
| *4 | 4.6967 | 3.70 | | |
| 5 | 9.3473 | 2.90 | 1.74950 | 35.28 |
| 6 | 305.1987 | 0.30 | | |
| 7 | ∞ | 1.70 | Flare Stopper FS1 | |
| 8 | ∞ | 1.40 | Aperture Stop S | |
| 9 | ∞ | d9 | Flare Stopper FS2 | |
| 10 | −9.2201 | 1.00 | 1.80810 | 22.76 |
| 11 | 77.4450 | 2.70 | 1.75500 | 52.32 |
| 12 | −10.9830 | 0.40 | | |
| 13 | 25.7154 | 2.95 | 1.59201 | 67.02 |
| *14 | −12.9856 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

(Aspherical Surface Data)

Surface Number = 4 r = 4.6967
κ = +0.1147
C4 = +5.5141E−4
C6 = +3.4495E−6
C8 = +3.3752E−7
C10 = −9.7228E−10
Surface Number = 14 r = −12.9856
κ = −10.9391

TABLE 9-continued

C4 = −4.1228E−4
C6 = +1.5051E−5
C8 = −2.5702E−7
C10 = +2.1453E−9

(Variable Distances)

| | INF | CLD |
|---|---|---|
| d2 = | 2.1557 | 2.1557 |
| d9 = | 0.9000 | 0.6716 |
| d14 = | 10.5637 | 10.7921 |
| d20 = | 0.7000 | 0.7000 |

(Lens Group Data)

| Group | I | Focal Length |
|---|---|---|
| 1 | 1 | 287.1468 |
| 2 | 3 | 10.1322 |

(Values for Conditional Expressions)

f = 10.3000
f1 = 287.1468
f2 = 10.1322
f2F = 152.2949
f2R = 13.7383
r2R = 4.6967
r3F = 9.3473
TL = 37.9694
Σd = 22.5057
Ymax = 8.2000
(1) f/f1 = 0.0359
(2) f2/f1 = 0.0353
(4) (r3F + r2R)/(r3F − r2R) = 3.0199
(5) TL/Σd = 1.6871
(6) TL/Ymax = 4.6304
(7) f2R/|f2F| = 0.0902
(8) f/f2R = 0.7497

Figure 18A:
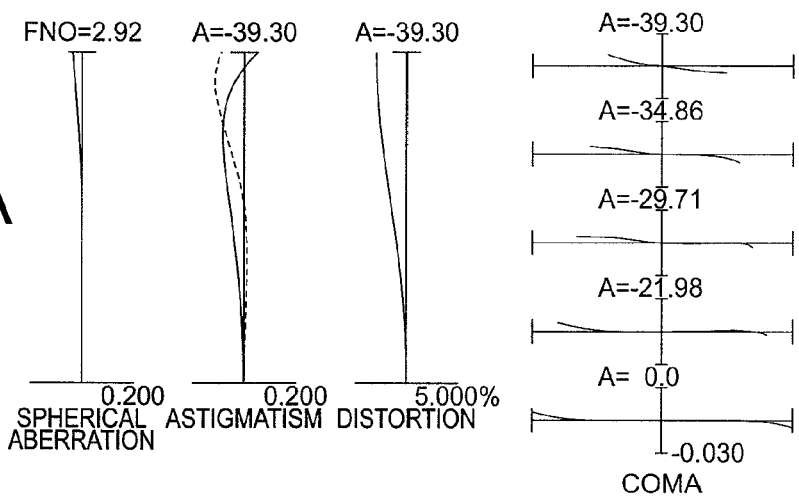
Figure 18B:
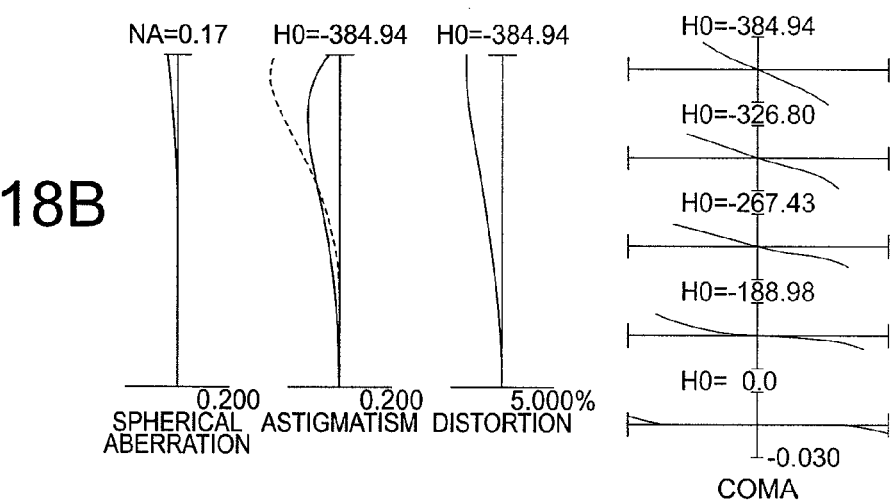
Figure 18C:
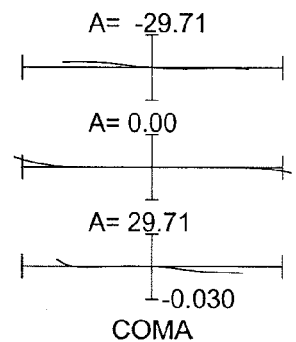

FIGS. 18A, 18B and 18C are graphs showing various aberrations of the imaging lens according to Example 9 of the second embodiment, in which FIG. 18A is upon focusing on an infinity object, FIG. 18B is upon focusing on a close shooting distance, and FIG. 18C is coma upon focusing on an infinity object upon moving the shift lens group vertically upward in FIG. 17 by an amount of 0.1 mm.

As is apparent from various graphs, the imaging lens according to Example 9 shows superb optical performance as a result of good corrections to various aberrations over entire focusing range from infinity to a close object with minimally suppressing deterioration in optical performance upon vibration reduction.

Example 10

FIG. 19 is a sectional view showing a lens configuration of an imaging lens according to Example 10 of the second embodiment of the present application.

As shown in FIG. 19, the imaging lens according to Example 10 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a front lens group G2F having positive refractive power, a first flare stopper FS1, an aperture stop S, a second flare stopper FS2, and a rear lens group G2R having positive refractive power.

The front lens group G2F is composed of, in order from the object side, a negative meniscus lens L21 having a convex surface facing the object side, and a positive meniscus lens L22 having a convex surface facing the object side.

The rear lens group G2R is composed of, in order from the object side, a cemented lens constructed by a double concave negative lens L23 cemented with a double convex positive lens L24, and a double convex positive lens L25.

The filter group FL is composed of a low-pass filter, an infrared-light-blocking filter, and the like.

In the imaging lens according to Example 10, focusing from an infinity object to a close object is carried out by moving the whole of the second lens group G2 along the optical axis toward the object side. Incidentally, the position of the first lens group G1 is fixed with respect to the image plane I.

Moreover, in the imaging lens according to Example 10, the rear lens group G2R of the second lens group is moved as a shift lens group in a direction including a component perpendicular to the optical axis, thereby correcting an image blur upon generating a camera shake.

Various values associated with the imaging lens according to Example 10 are listed in Table 10.

TABLE 10

(Specifications)

f = 10.30
FNO = 2.91
2ω = 78.62
Y = 8.20
TL = 37.57
BF = 15.47
ACTL = 36.62
ACBF = 14.52

(Lens Data)

| i | r | d | nd | vd |
|---|---|---|---|---|
| 1 | 332.7704 | 1.00 | 1.60300 | 65.44 |
| 2 | −332.7936 | d2 | | |
| 3 | 22.0308 | 1.10 | 1.58313 | 59.38 |
| *4 | 4.5012 | 3.45 | | |
| 5 | 9.0325 | 3.05 | 1.74950 | 35.28 |
| 6 | 117.5529 | 0.30 | | |
| 7 | ∞ | 1.70 | Flare Stopper FS1 | |
| 8 | ∞ | 1.60 | Aperture Stop S | |
| 9 | ∞ | 0.70 | Flare Stopper FS2 | |
| 10 | −10.0955 | 1.00 | 1.80810 | 22.76 |
| 11 | 52.5077 | 2.70 | 1.75500 | 52.32 |
| 12 | −11.5974 | 0.40 | | |
| 13 | 24.8237 | 2.97 | 1.59201 | 67.05 |
| *14 | −12.8447 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

(Aspherical Surface Data)

Surface Number = 4 r = 4.5012
κ = +0.3479
C4 = +3.0704E−4
C6 = +9.9005E−7
C8 = +3.7811E−7
C10 = −1.2499E−9

Surface Number = 14 r = −12.8447
κ = −10.3357

TABLE 10-continued

C4 = −4.0200E−4
C6 = +1.4415E−5
C8 = −2.4522E−7
C10 = +2.0151E−9

(Variable Distances)

| | INF | CLD |
|---|---|---|
| d2 = | 2.1344 | 1.9074 |
| d14 = | 10.6000 | 10.8270 |
| d20 = | 0.6652 | 0.6652 |

(Lens Group Data)

| Group | I | Focal Length |
|---|---|---|
| 1 | 1 | 276.0942 |
| 2 | 3 | 10.1310 |

(Values for Conditional Expressions)

f = 10.2975
f1 = 276.0942
f2 = 10.1310
f2F = 824.1941
f2R = 13.3447
r2R = 4.5012
r3F = 9.0325
TL = 37.5652
Σd = 22.1000
Ymax = 8.2000
(1) f/f1 = 0.0373
(2) f2/f1 = 0.0367
(4) (r3F + r2R)/(r3F − r2R) = 2.9867
(5) TL/Σd = 1.6998
(6) TL/Ymax = 4.5811
(7) f2R/|f2F| = 0.0162
(8) f/f2R = 0.7717

FIGS. 20A, 20B and 20C are graphs showing various aberrations of the imaging lens according to Example 10 of the second embodiment, in which FIG. 20A is upon focusing on an infinity object, FIG. 20B is upon focusing on a close shooting distance, and FIG. 20C is coma upon focusing on an infinity object upon moving the shift lens group vertically upward in FIG. 19 by an amount of 0.1 mm.

As is apparent from various graphs, the imaging lens according to Example 10 shows superb optical performance as a result of good corrections to various aberrations over entire focusing range from infinity to a close object with minimally suppressing deterioration in optical performance upon vibration reduction.

Example 11

Figure 21:
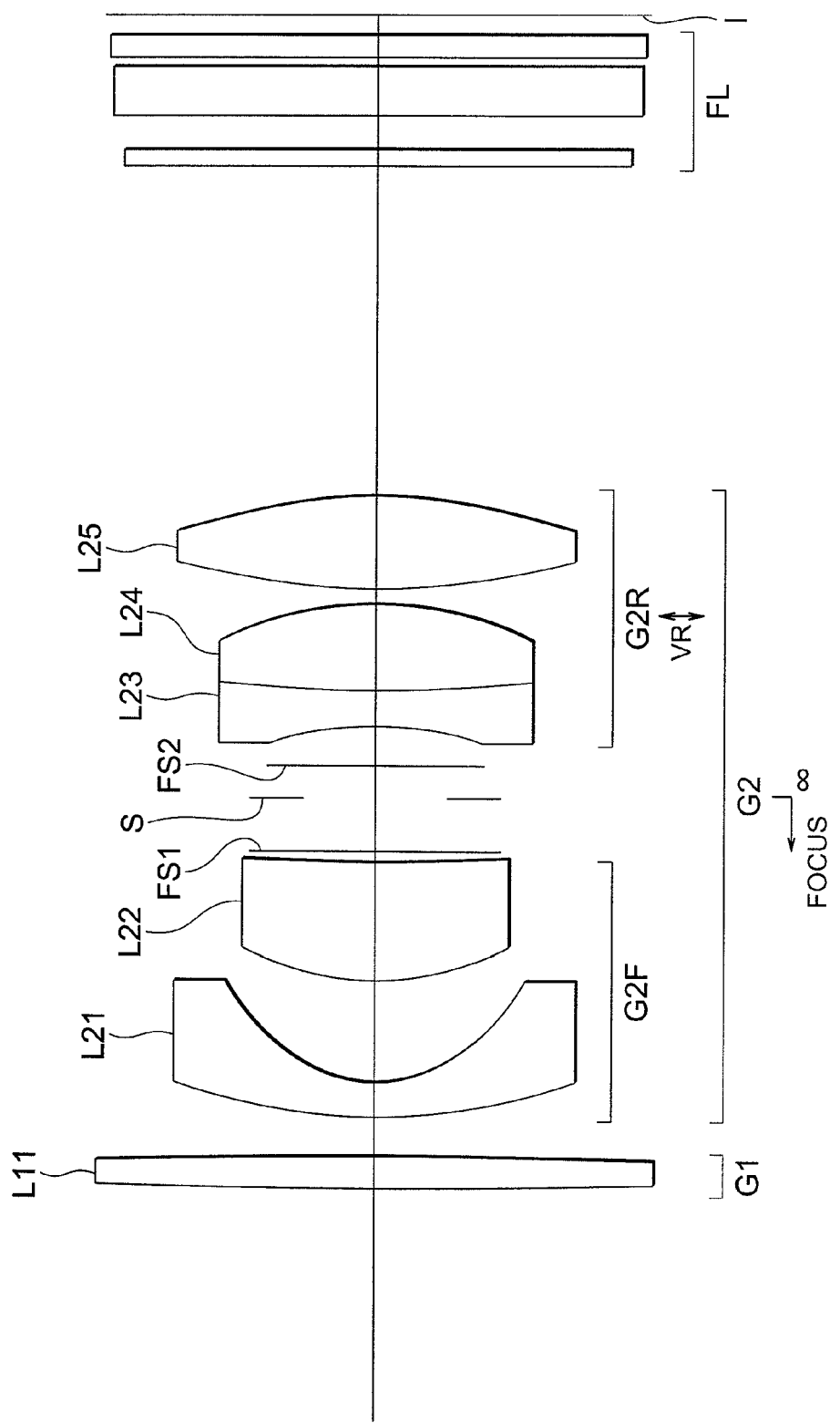
FIG. 21 is a sectional view showing a lens configuration of an imaging lens according to Example 11 of the second embodiment of the present application.

FIG. 21 is a sectional view showing a lens configuration of an imaging lens according to Example 11 of the second embodiment of the present application.

As shown in FIG. 21, the imaging lens according to Example 11 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a front lens group G2F having positive refractive power, a first flare stopper FS1, an aperture stop S, a second flare stopper FS2, and a rear lens group G2R having positive refractive power.

The front lens group G2F is composed of, in order from the object side, a negative meniscus lens L21 having a convex surface facing the object side, and a positive meniscus lens L22 having a convex surface facing the object side.

The rear lens group G2R is composed of, in order from the object side, a cemented lens constructed by a double concave negative lens L23 cemented with a double convex positive lens L24, and a double convex positive lens L25.

The filter group FL is composed of a low-pass filter, an infrared-light-blocking filter, and the like.

In the imaging lens according to Example 11, focusing from an infinity object to a close object is carried out by moving the whole of the second lens group G2 along the optical axis toward the object side. Incidentally, the position of the first lens group G1 is fixed with respect to the image plane I.

Moreover, in the imaging lens according to Example 11, the rear lens group G2R of the second lens group is moved as a shift lens group in a direction including a component perpendicular to the optical axis, thereby correcting an image blur upon generating a camera shake.

Various values associated with the imaging lens according to Example 11 are listed in Table 11.

TABLE 11

(Specifications)

f = 10.30
FNO = 2.89
2ω = 78.61
Y = 8.20
TL = 37.47
BF = 15.38
ACTL = 36.52
ACBF = 14.43

(Lens Data)

| i | r | d | nd | vd |
|---|---|---|---|---|
| 1 | 290.4936 | 1.00 | 1.51680 | 64.11 |
| 2 | −290.7707 | d2 | | |
| 3 | 19.6032 | 1.10 | 1.58913 | 61.15 |
| *4 | 4.4561 | 3.25 | | |
| 5 | 9.1671 | 3.75 | 1.74950 | 35.28 |
| 6 | 79.1129 | 0.30 | | |
| 7 | ∞ | 1.70 | Flare Stopper FS1 | |
| 8 | ∞ | 1.05 | Aperture Stop S | |
| 9 | ∞ | 1.25 | Flare Stopper FS2 | |
| 10 | −11.3274 | 1.15 | 1.80810 | 22.76 |
| 11 | 44.4829 | 2.75 | 1.75500 | 52.32 |
| 12 | −11.5221 | 0.50 | | |
| 13 | 23.9759 | 3.00 | 1.59201 | 67.02 |
| *14 | −14.2191 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

(Aspherical Surface Data)

Surface Number = 4 r = 4.4561
κ = +0.6048
C4 = −2.4225E−5
C6 = −1.1037E−5
C8 = +5.0943E−7
C10 = −1.8920E−8

Surface Number = 14 r = −14.2191
κ = −11.3728

TABLE 11-continued

C4 = −3.1719E−4
C6 = +1.0532E−5
C8 = −1.6628E−7
C10 = +1.2559E−9

(Variable Distances)

| | INF | CLD |
|---|---|---|
| d2 = | 1.2865 | 1.0592 |
| d14 = | 10.5135 | 10.7408 |
| d20 = | 0.6702 | 0.6702 |

(Lens Group Data)

| Group | I | Focal Length |
|---|---|---|
| 1 | 1 | 281.3493 |
| 2 | 3 | 10.1574 |

(Values for Conditional Expressions)

f = 10.3000
f1 = 281.3493
f2 = 10.1574
f2F = −195.0408
f2R = 12.8820
r2R = 4.4561
r3F = 9.1671
TL = 37.4702
Σd = 22.0865
Ymax = 8.2000
(1) f/f1 = 0.0366
(2) f2/f1 = 0.0361
(4) (r3F + r2R)/(r3F − r2R) = 2.8917
(5) TL/Σd = 1.6965
(6) TL/Ymax = 4.5695
(7) f2R/|f2F| = 0.0660
(8) f/f2R = 0.7996

Figure 22A:
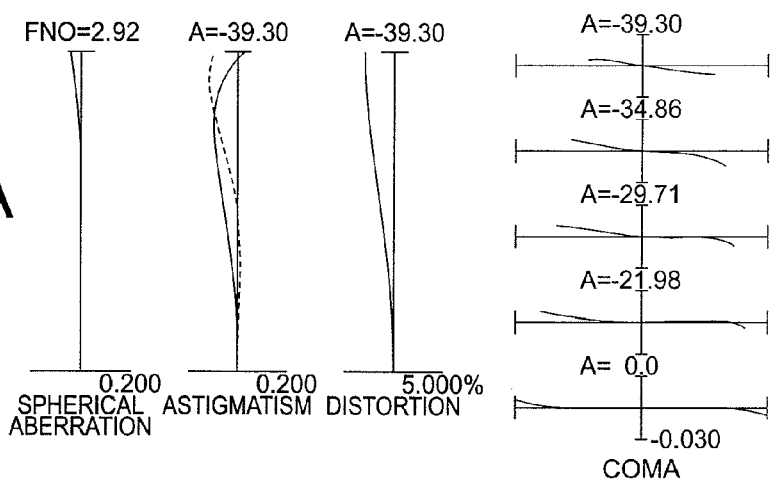
Figure 22B:
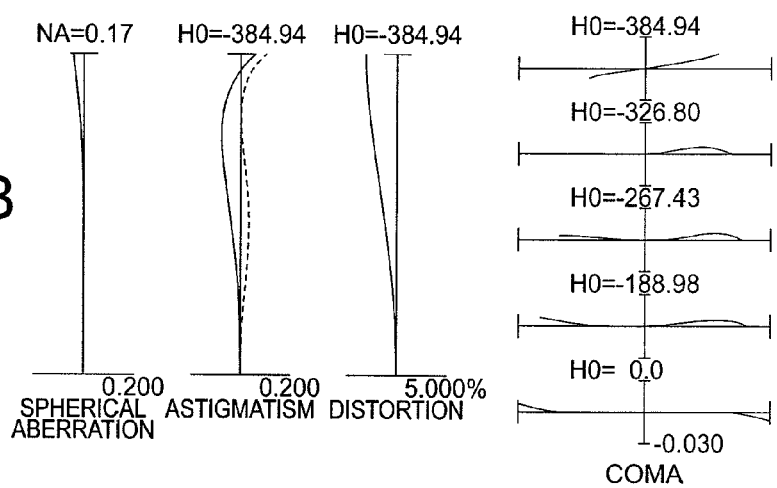
Figure 22C:
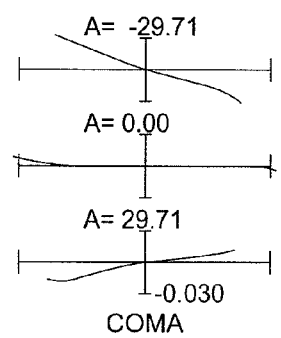

FIGS. 22A, 22B and 22C are graphs showing various aberrations of the imaging lens according to Example 11 of the second embodiment, in which FIG. 22A is upon focusing on an infinity object, FIG. 22B is upon focusing on a close shooting distance, and FIG. 22C is coma upon focusing on an infinity object upon moving the shift lens group vertically upward in FIG. 21 by an amount of 0.1 mm.

As is apparent from various graphs, the imaging lens according to Example 11 shows superb optical performance as a result of good corrections to various aberrations over entire focusing range from infinity to a close object with minimally suppressing deterioration in optical performance upon vibration reduction.

Example 12

Figure 23:
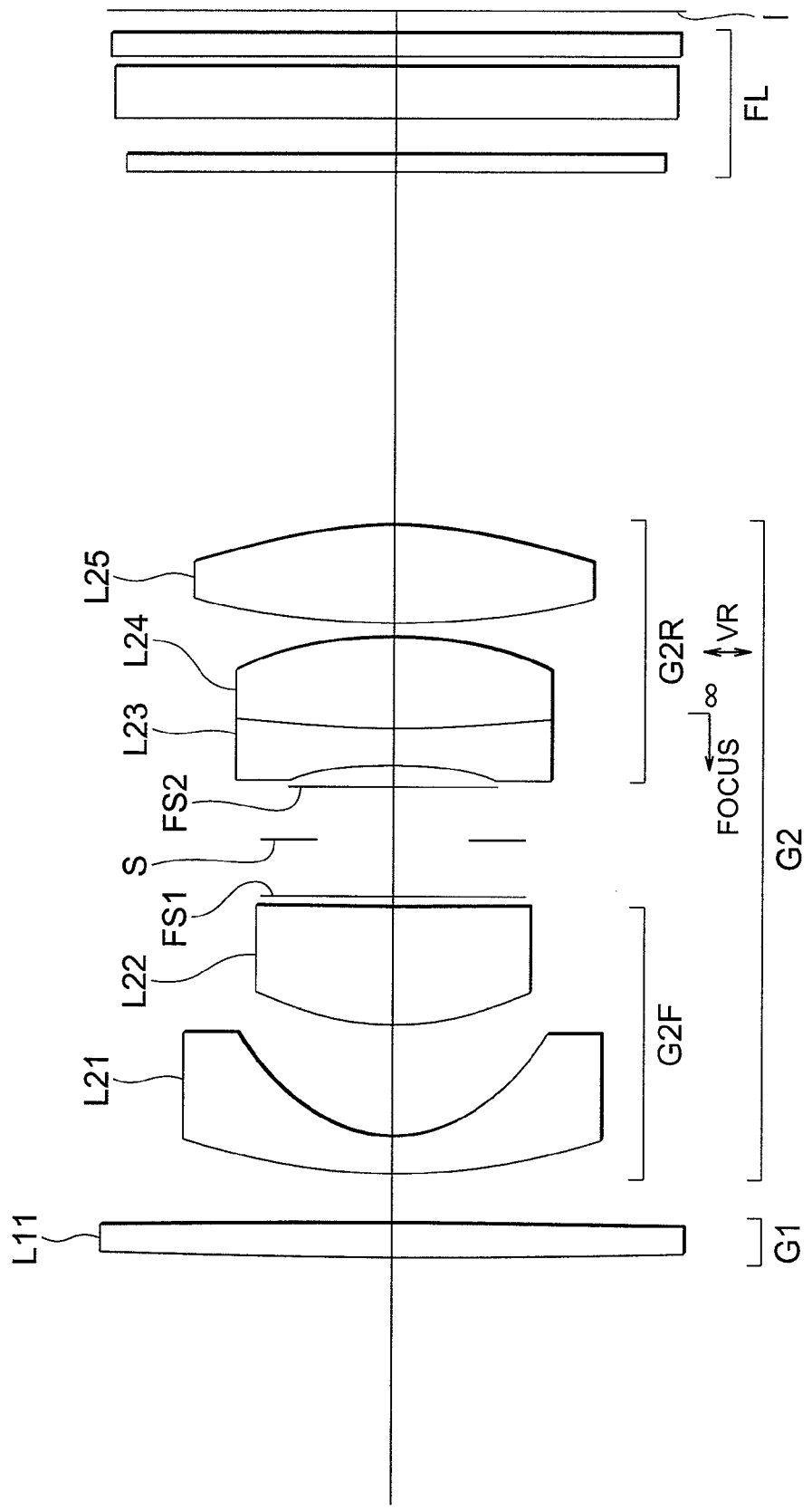
FIG. 23 is a sectional view showing a lens configuration of an imaging lens according to Example 12 of the second embodiment of the present application.

FIG. 23 is a sectional view showing a lens configuration of an imaging lens according to Example 12 of the second embodiment of the present application.

As shown in FIG. 23, the imaging lens according to Example 12 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a front lens group G2F having positive refractive power, a first flare stopper FS1, an aperture stop S, a second flare stopper FS2, and a rear lens group G2R having positive refractive power.

The front lens group G2F is composed of, in order from the object side, a negative meniscus lens L21 having a convex surface facing the object side, and a positive meniscus lens L22 having a convex surface facing the object side.

The rear lens group G2R is composed of, in order from the object side, a cemented lens constructed by a double concave negative lens L23 cemented with a double convex positive lens L24, and a double convex positive lens L25.

The filter group FL is composed of a low-pass filter, an infrared-light-blocking filter, and the like.

In the imaging lens according to Example 12, focusing from an infinity object to a close object is carried out by moving the rear lens group G2R, which is a portion of the second lens group G2, along the optical axis toward the object side. Incidentally, the position of the first lens group G1 is fixed with respect to the image plane I.

Moreover, in the imaging lens according to Example 12, the rear lens group G2R of the second lens group G2 is moved as a shift lens group in a direction including a component perpendicular to the optical axis, thereby correcting an image blur upon generating a camera shake.

Various values associated with the imaging lens according to Example 12 are listed in Table 12.

TABLE 12

(Specifications)

f = 10.30
FNO = 2.92
2ω = 78.60
Y = 8.20
TL = 37.45
BF = 15.52
ACTL = 36.50
ACBF = 14.57

(Lens Data)

| i | r | d | nd | νd |
|---|---|---|---|---|
| 1 | 367.5465 | 1.00 | 1.60300 | 65.44 |
| 2 | −368.4597 | d2 | | |
| 3 | 21.2966 | 1.10 | 1.58313 | 59.38 |
| *4 | 4.4652 | 3.35 | | |
| 5 | 9.2118 | 3.50 | 1.74950 | 35.28 |
| 6 | 129.9098 | 0.30 | | |
| 7 | ∞ | 1.70 | Flare Stopper FS1 | |
| 8 | ∞ | 1.60 | Aperture Stop S | |
| 9 | ∞ | d9 | Flare Stopper FS2 | |
| 10 | −10.7870 | 1.10 | 1.80810 | 22.76 |
| 11 | 46.2743 | 2.75 | 1.75500 | 52.32 |
| 12 | −11.6441 | 0.40 | | |
| 13 | 25.7948 | 2.95 | 1.59201 | 67.02 |
| *14 | −13.3762 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

(Aspherical Surface Data)

Surface Number = 4 r = 4.4652
κ = +0.3656
C4 = +2.6809E−4
C6 = +1.6171E−6
C8 = +2.8446E−7
C10 = +2.2563E−10
Surface Number = 14 r = −13.3762
κ = −11.1665

TABLE 12-continued

C4 = −3.9072E−4
C6 = +1.3411E−5
C8 = −2.2460E−7
C10 = +1.8090E−9

(Variable Distances)

| | INF | CLD |
|---|---|---|
| d2 = | 1.4850 | 1.4850 |
| d9 = | 0.7000 | 0.4728 |
| d14 = | 10.6489 | 10.8762 |
| d20 = | 0.6663 | 0.6663 |

(Lens Group Data)

| Group | I | Focal Length |
|---|---|---|
| 1 | 1 | 305.2986 |
| 2 | 3 | 10.1676 |

(Values for Conditional Expressions)

f = 10.3000
f1 = 305.2986
f2 = 10.1676
f2F = −1011.0523
f2R = 13.2321
r2R = 4.4652
r3F = 9.2118
TL = 37.4502
Σd = 21.9350
Ymax = 8.2000
(1) f/f1 = 0.0337
(2) f2/f1 = 0.0333
(4) (r3F + r2R)/(r3F − r2R) = 2.8814
(5) TL/Σd = 1.7073
(6) TL/Ymax = 4.5671
(7) f2R/|f2F| = 0.0131
(8) f/f2R = 0.7784

Figure 24A:
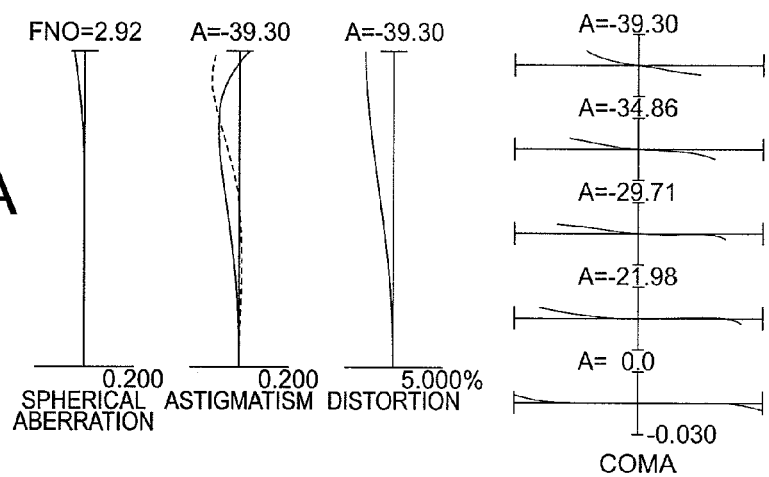
Figure 24B:
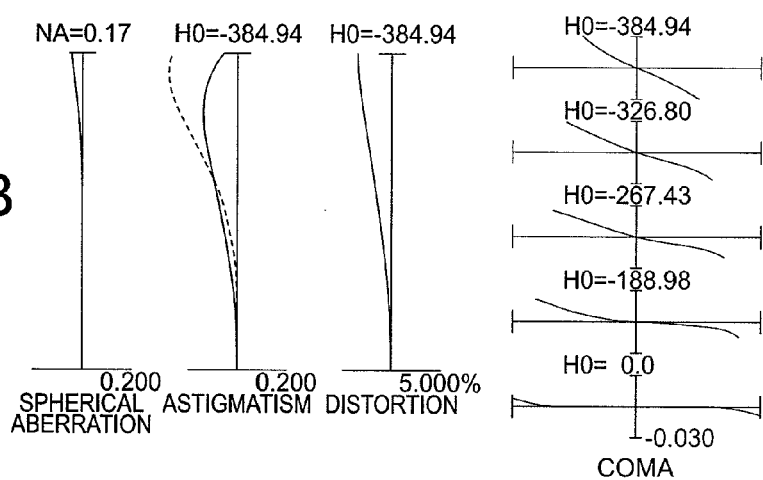
Figure 24C:
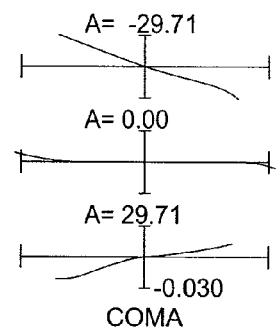

FIGS. 24A, 24B and 24C are graphs showing various aberrations of the imaging lens according to Example 12 of the second embodiment, in which FIG. 24A is upon focusing on an infinity object, FIG. 24B is upon focusing on a close shooting distance, and FIG. 24C is coma upon focusing on an infinity object upon moving the shift lens group vertically upward in FIG. 23 by an amount of 0.1 mm.

As is apparent from various graphs, the imaging lens according to Example 12 shows superb optical performance as a result of good corrections to various aberrations over entire focusing range from infinity to a close object with minimally suppressing deterioration in optical performance upon vibration reduction.

Example 13

Figure 25:
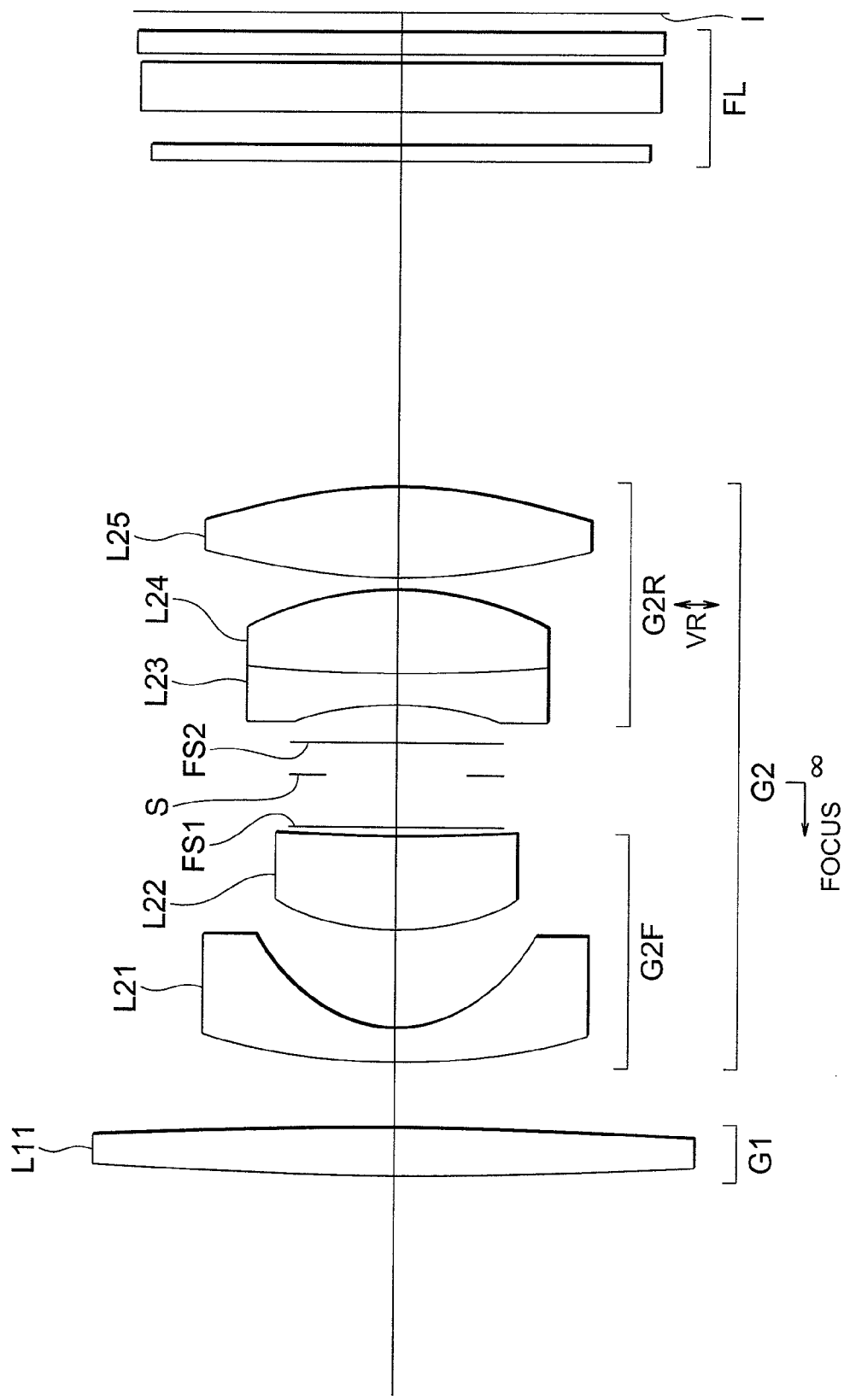
FIG. 25 is a sectional view showing a lens configuration of an imaging lens according to Example 13 of the second embodiment of the present application.

FIG. 25 is a sectional view showing a lens configuration of an imaging lens according to Example 13 of the second embodiment of the present application.

As shown in FIG. 25, the imaging lens according to Example 11 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a front lens group G2F having positive refractive power, a first flare stopper FS1, an aperture stop S, a second flare stopper FS2, and rear lens group G2R having positive refractive power.

The front lens group G2F is composed of, in order from the object side, a negative meniscus lens L21 having a convex surface facing the object side, and a positive meniscus lens L22 having a convex surface facing the object side.

The rear lens group G2R is composed of, in order from the object side, a cemented lens constructed by a double concave negative lens L23 cemented with a double convex positive lens L24, and a double convex positive lens L25.

The filter group FL is composed of a low-pass filter, an infrared-light-blocking filter, and the like.

In the imaging lens according to Example 13, focusing from an infinity object to a close object is carried out by moving the whole of the second lens group G2 along the optical axis toward the object side. Incidentally, the position of the first lens group G1 is fixed with respect to the image plane I.

Moreover, in the imaging lens according to Example 13, the rear lens group G2R of the second lens group is moved as a shift lens group in a direction including a component perpendicular to the optical axis, thereby correcting an image blur upon generating a camera shake.

Various values associated with the imaging lens according to Example 13 are listed in Table 13.

TABLE 13

(Specifications)

f = 10.30
FNO = 2.91
2ω = 78.61
Y = 8.20
TL = 37.79
BF = 15.45
ACTL = 36.84
ACBF = 14.50

(Lens Data)

| i | r | d | nd | νd |
|---|---|---|----|----|
| 1 | 160.4134 | 1.52 | 1.51633 | 64.14 |
| 2 | −160.4538 | d2 | | |
| 3 | 23.9005 | 1.10 | 1.58313 | 59.38 |
| *4 | 4.4680 | 3.19 | | |
| 5 | 8.8845 | 3.00 | 1.74950 | 35.28 |
| 6 | 59.7352 | 0.30 | | |
| 7 | ∞ | 1.70 | Flare Stopper FS1 | |
| 8 | ∞ | 1.05 | Aperture Stop S | |
| 9 | ∞ | 1.25 | Flare Stopper FS2 | |
| 10 | −10.3948 | 1.00 | 1.80810 | 22.76 |
| 11 | 53.0153 | 2.70 | 1.75500 | 52.32 |
| 12 | −10.8113 | 0.40 | | |
| 13 | 22.9281 | 2.99 | 1.59201 | 67.05 |
| *14 | −14.0952 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

(Aspherical Surface Data)

Surface Number = 4 r = 4.4680
κ = +0.4037
C4 = +2.7434E−4
C6 = +4.0423E−6
C8 = +1.7001E−7
C10 = +1.0858E−8

Surface Number = 14 r = −14.0952
κ = −11.0203

TABLE 13-continued

C4 = −3.0335E−4
C6 = +1.0309E−5
C8 = −1.5359E−7
C10 = +1.0836E−9

(Variable Distances)

| | INF | CLD |
|---|---|---|
| d2 = | 2.1336 | 1.9062 |
| d14 = | 10.5627 | 10.7901 |
| d20 = | 0.6862 | 0.6862 |

(Lens Group Data)

| Group | I | Focal Length |
|-------|---|--------------|
| 1 | 1 | 155.6106 |
| 2 | 3 | 9.9966 |

(Values for Conditional Expressions)

f = 10.3014
f1 = 155.6106
f2 = 9.9966
f2F = −107.3070
f2R = 12.6842
r2R = 4.4680
r3F = 8.8845
TL = 37.7862
Σd = 22.3373
Ymax = 8.2000
(1) f/f1 = 0.0662
(2) f2/f1 = 0.0642
(4) (r3F + r2R)/(r3F − r2R) = 3.0233
(5) TL/Σd = 1.6916
(6) TL/Ymax = 4.6081
(7) f2R/|f2F| = 0.1182
(8) f/f2R = 0.8121

Figure 26A:
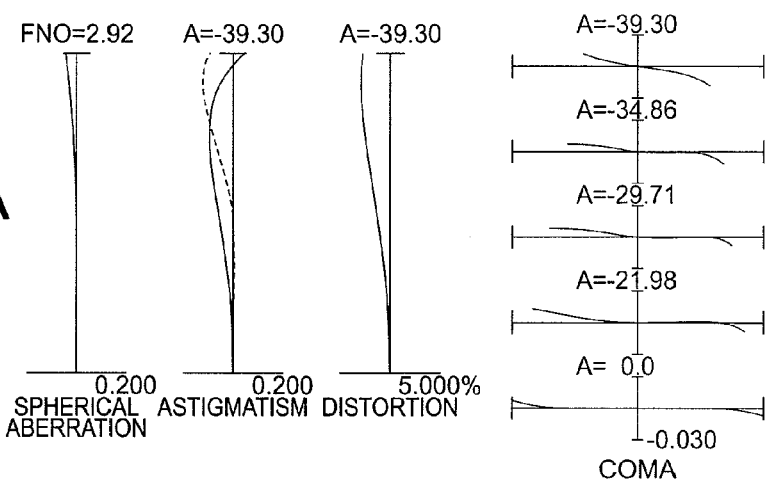
Figure 26B:
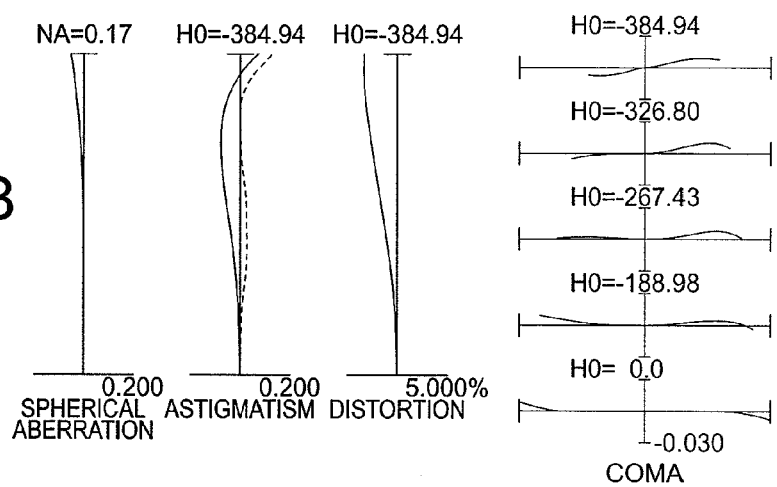
Figure 26C:
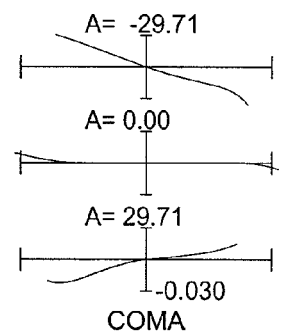

FIGS. 26A, 26B and 26C are graphs showing various aberrations of the imaging lens according to Example 13 of the second embodiment, in which FIG. 26A is upon focusing on an infinity object, FIG. 26B is upon focusing on a close shooting distance, and FIG. 26C is coma upon focusing on an infinity object upon moving the shift lens group vertically upward in FIG. 25 by an amount of 0.1 mm.

As is apparent from various graphs, the imaging lens according to Example 13 shows superb optical performance as a result of good corrections to various aberrations over entire focusing range from infinity to a close object with minimally suppressing deterioration in optical performance upon vibration reduction.

Example 14

FIG. 27 is a sectional view showing a lens configuration of an imaging lens according to Example 14 of the second embodiment of the present application.

As shown in FIG. 27, the imaging lens according to Example 14 is composed of, in order from an unillustrated object side, a first lens group G1 having positive refractive power, a second lens group G2 having positive refractive power disposed with a distance from the first lens group G1, and a filter group FL disposed with a distance from the second lens group G2.

The first lens group G1 is composed of a double convex positive lens L11 only.

The second lens group G2 is composed of, in order from the object side, a front lens group G2F having positive refractive power, a first flare stopper FS1, an aperture stop S, a second flare stopper FS2, and a rear lens group G2R having positive refractive power.

The front lens group G2F is composed of, in order from the object side, a negative meniscus lens L21 having a convex surface facing the object side, and a positive meniscus lens L22 having a convex surface facing the object side.

The rear lens group G2R is composed of, in order from the object side, a cemented lens constructed by a double concave negative lens L23 cemented with a double convex positive lens L24, and a double convex positive lens L25.

The filter group FL is composed of a low-pass filter, an infrared-light-blocking filter, and the like.

In the imaging lens according to Example 14, focusing from an infinity object to a close object is carried out by moving the whole of the second lens group G2 along the optical axis toward the object side. Incidentally, the position of the first lens group G1 is fixed with respect to the image plane I.

Moreover, in the imaging lens according to Example 14, the whole of the second lens group is moved as a shift lens group in a direction including a component perpendicular to the optical axis, thereby correcting an image blur upon generating a camera shake.

Various values associated with the imaging lens according to Example 14 are listed in Table 14.

TABLE 14

(Specifications)

f = 10.30
FNO = 2.94
2ω = 78.61
Y = 8.20
TL = 37.86
BF = 15.56
ACTL = 36.91
ACBF = 14.61

(Lens Data)

| i | r | d | nd | νd |
|---|---|---|---|---|
| 1 | 307.5313 | 1.20 | 1.48749 | 70.23 |
| 2 | −307.5947 | d2 | | |
| 3 | 21.9567 | 1.10 | 1.58313 | 59.38 |
| *4 | 4.5581 | 3.45 | | |
| 5 | 9.6306 | 3.05 | 1.74950 | 35.28 |
| 6 | 292.4663 | 0.30 | | |
| 7 | ∞ | 1.70 | Flare Stopper FS1 | |
| 8 | ∞ | 1.05 | Aperture Stop S | |
| 9 | ∞ | 1.25 | Flare Stopper FS2 | |
| 10 | −8.9112 | 1.00 | 1.80810 | 22.76 |
| 11 | 506.5428 | 2.70 | 1.75500 | 52.32 |
| 12 | −9.3793 | 0.40 | | |
| 13 | 21.0314 | 2.97 | 1.49700 | 81.61 |
| *14 | −13.3938 | d14 | | |
| 15 | ∞ | 0.50 | 1.51633 | 64.14 |
| 16 | ∞ | 1.11 | | |
| 17 | ∞ | 1.59 | 1.51633 | 64.14 |
| 18 | ∞ | 0.30 | | |
| 19 | ∞ | 0.70 | 1.51633 | 64.14 |
| 20 | ∞ | d20 | | |

(Aspherical Surface Data)

Surface Number = 4 r = 4.5581
κ = +0.1979
C4 = +4.8517E−4
C6 = +5.1785E−6
C8 = +2.7432E−7
C10 = +2.0130E−9

Surface Number = 14 r = −13.3938
κ = −12.8217

TABLE 14-continued

C4 = −4.2055E−4
C6 = +1.6915E−5
C8 = −2.9730E−7
C10 = +2.4991E−9

(Variable Distances)

| | INF | CLD |
|---|---|---|
| d2 = | 2.1354 | 1.9083 |
| d14 = | 10.6990 | 10.9261 |
| d20 = | 0.6645 | 0.6645 |

(Lens Group Data)

| Group | I | Focal Length |
|---|---|---|
| 1 | 1 | 315.6575 |
| 2 | 3 | 10.1518 |

(Values for Conditional Expressions)

f = 10.3000
f1 = 315.6575
f2 = 10.1518
f2F = 1702.3764
f2R = 13.3866
r2R = 4.5581
r3F = 9.6306
TL = 37.8645
Σd = 22.3010
Ymax = 8.2000
(1) f/f1 = 0.0326
(2) f2/f1 = 0.0322
(4) (r3F + r2R)/(r3F − r2R) = 2.7972
(5) TL/Σd = 1.6979
(6) TL/Ymax = 4.6176
(7) f2R/|f2F| = 0.0079
(8) f/f2R = 0.7694

Figure 28A:
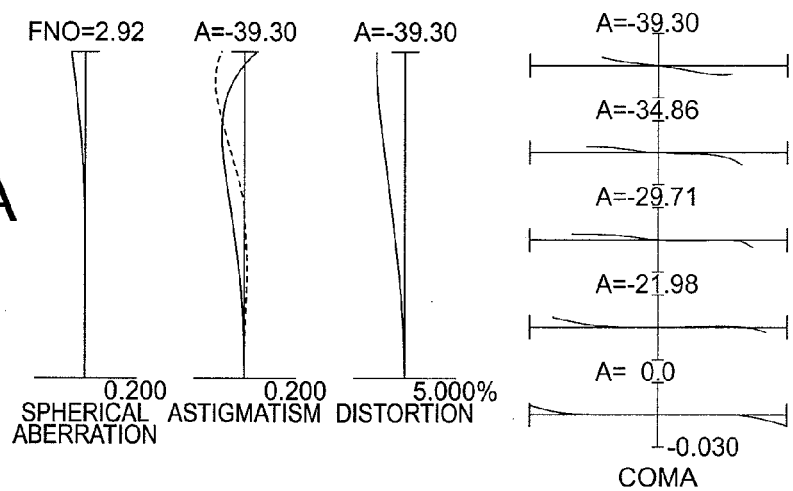
Figure 28B:
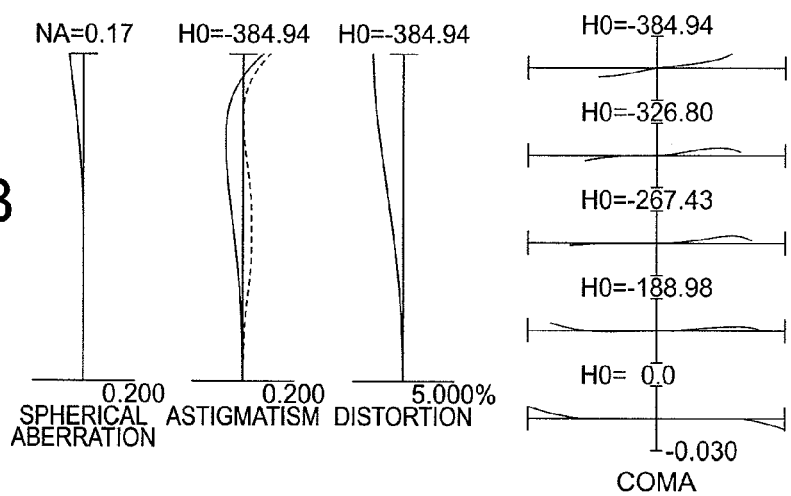
Figure 28C:
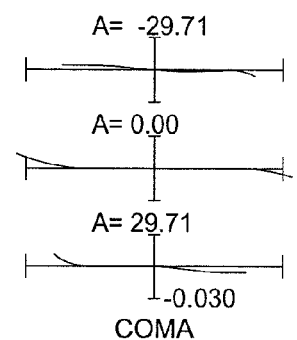

FIGS. 28A, 28B and 28C are graphs showing various aberrations of the imaging lens according to Example 14 of the second embodiment, in which FIG. 28A is upon focusing on an infinity object, FIG. 28B is upon focusing on a close shooting distance, and FIG. 28C is coma upon focusing on an infinity object upon moving the shift lens group vertically upward in FIG. 27 by an amount of 0.1 mm.

As is apparent from various graphs, the imaging lens according to Example 13 shows superb optical performance as a result of good corrections to various aberrations over entire focusing range from infinity to a close object with minimally suppressing deterioration in optical performance upon vibration reduction.

Each example described above makes it possible to provide a compact imaging lens having a wide angle of view of 60 degrees or more, a large aperture of an f-number of about 2.8 and excellent optical performance over entire image frame with excellently correcting various aberrations upon focusing on an infinity object to a close object, and minimally suppressing deterioration in optical performance upon vibration reduction.

In an imaging lens according to each Example, a back focal length, which is a distance along the optical axis between the image side lens surface of a lens disposed to the most image side and the image plane, is preferably from about 10.0 mm to 30.0 mm in the smallest state. Moreover, in an imaging lens according to each Example, the image height is preferably 5.0 mm to 12.5 mm, and most preferably 5.0 mm to 9.5 mm.

Then, an outline of a method for manufacturing an imaging lens according to the second embodiment is explained below with reference to FIG. 33.

FIG. 33 is a flowchart showing a method for manufacturing an imaging lens according to the second embodiment of the present application.

The method for manufacturing an imaging lens according to the second embodiment of the present application is a method for manufacturing an imaging lens including, in order from an object side, a first lens group having positive refractive power and a second lens group having positive refractive, the method includes the following steps S21 through S23:

Step S21: disposing the first lens group with a single lens component;

Step S22: disposing the second lens group consisting of, in order from the object side, a front lens group, an aperture stop, and a rear lens group into a lens barrel in order from the object side; and Step S23: moving the second lens group or the rear lens group as a shift lens group in a direction including a component perpendicular to the optical axis by providing a well-known moving mechanism in the lens barrel.

With this method for manufacturing an imaging lens according to the second embodiment of the present application, it becomes possible to manufacture a compact imaging lens having a wide angle of view, a large aperture and excellent optical performance over entire image frame with excellently correcting various aberrations upon focusing on an infinity object to a close object.

The present embodiment only shows a specific example for the purpose of better understanding of the present application. Accordingly, it is needless to say that the present application in its broader aspect is not limited to the specific details and representative devices. Incidentally, the following description may suitably be applied within limits that do not deteriorate optical performance.

As numerical examples of an imaging lens according to the present application, although a two-lens-group configuration is shown, the lens-group configuration according to the present application is not limited to this, other lens-group configurations such as a three-lens-group configuration is possible to configure an imaging lens. Specifically, a lens configuration that a lens or a lens group is added to the most object side or the most image side of an imaging lens according to the present application is possible. Incidentally, a lens group means a portion that includes at least one lens and is separated by air spaces.

In an imaging lens according to the present application, in order to vary focusing from infinity to a close object, a portion of a lens group, a single lens group, or a plurality of lens groups may be moved along the optical axis as a focusing lens group. Focusing may be carried out by other configuration than the above-described Examples such as an object side portion of the second lens group (the negative meniscus lens L21 and the positive meniscus lens L22), or each single lens component of the whole lens system.

In this case, the focusing lens group can be used for auto focus, and suitable for being driven by a motor such as an ultrasonic motor. It is particularly preferable that a portion or the whole of the second lens group G2 is moved as the focusing lens group.

A lens group or a portion of a lens group may be shifted in a direction including a component perpendicular to the optical axis as a vibration reduction lens group, or tilted (swayed) in a direction including the optical axis for correcting an image blur caused by a camera shake, in other words, vibration correction. It is particularly preferable that a portion or the whole of the second lens group is used as a shift lens group.

A lens surface of a lens may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the image plane is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

Although an aperture stop S is preferably provided in or in the vicinity of the second lens group, the function may be substituted by a lens frame without disposing a member as an aperture stop. Moreover, this is the same to the first and the second flare stoppers provided in an imaging lens according to each Example of the present application.

An antireflection coating having high transmittance over a broad wavelength range may be applied to each lens surface of an imaging lens according to the present application to reduce flare or ghost images, so that high optical performance with high contrast can be achieved.

In an imaging lens according to the present application, the first lens group preferably includes one positive lens component. The second lens group preferably includes three positive lens components and one negative lens component, and, in particular, these lens components are preferably disposed, in order from the object side, positive-positive-positive-negative with air spaces in between. Alternatively, the second lens group preferably includes two positive lens components and two negative lens components, and these lens components are preferably disposed, in order from the object side, positive-negative-positive-negative with air spaces in between.

Then, a camera equipped with an imaging lens according to the present application is explained with reference to FIGS. 29A, 29B and 30.

Figure 29A:
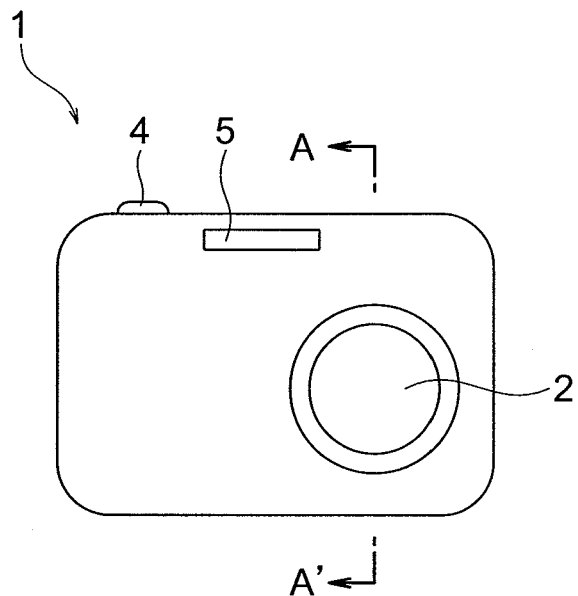
Figure 29B:
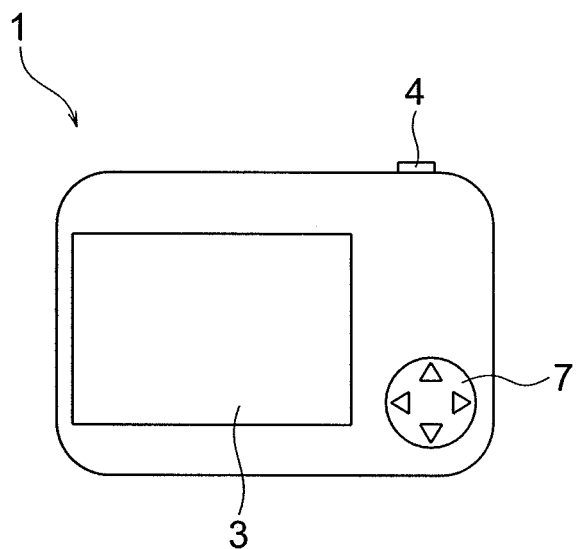

FIGS. 29A and 29B are diagrams showing an electronic camera according to the present application, in which FIG. 29A is a front view and FIG. 29B is a rear view. FIG. 30 is a sectional view along A-A' line in FIG. 29A.

Figure 30:
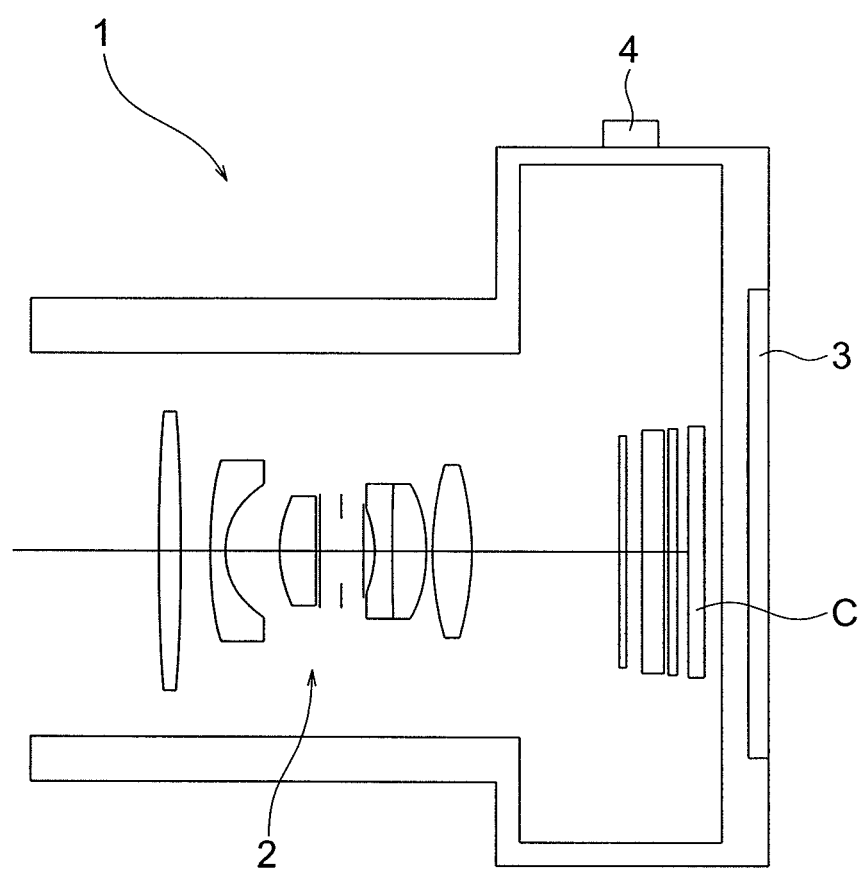
FIG. 30 is a sectional view along A-A' line in FIG. 29A.

The camera 1 is an electronic still camera equipped with the imaging lens according to Example 1 as an image-taking lens 2 as shown in FIGS. 29A through 30.

In the camera 1, when a power switch button (not shown) is pressed by a photographer, a shutter (not shown) of an image-taking lens, which blocks light from transmitting the image-taking lens 2, is opened. Accordingly, light from an object (not shown) is incident on the image-taking lens 2, and converged on an imaging device C (for example, a CCD or CMOS) disposed on an image plane I by the image-taking lens 2, thereby forming an image of the object. The object image formed on the imaging device C is displayed on a liquid crystal monitor 3 disposed backside of the camera 1. After fixing the image composition of the object image with observing the liquid crystal monitor 3, a photographer depresses a release button 4 to take a picture of the object image by the imaging device C, and stores in a memory (not shown). In this manner, the photographer can take a picture of the object by the camera 1. In the camera 1, the following members are disposed such as an auxiliary light emitter 5 that emits auxiliary light when the object is dark, and a function button 7 that is used for setting various conditions of the camera 1.

With this configuration, the camera 1 equipped with the imaging lens according to Example 1 as an image-taking lens 2 makes it possible to realize a compact optical apparatus having a wide angle of view, a large aperture and excellent optical performance over entire image frame with excellently correcting various aberrations upon focusing on an infinity object to a close object. Incidentally, the same effect as the camera 1 can be obtained by constructing a camera equipped with any one of the imaging lenses according to Example 2 through 7 as an image-taking lens 2. Moreover, an imaging lens according to the present application is not limited to the electronic still camera, and can be adopted to any other optical apparatus such as a digital video camera, and a film camera. Moreover, it may be adopted to an interchangeable lens.

What is claimed is:

1. An imaging lens comprising, in order from an object side:
   a first lens group having positive refractive power; and
   a second lens group having positive refractive power,
   a position of the first lens group being fixed with respect to an image plane,
   the second lens group consisting of a plurality of lens components, and
   the following conditional expressions being satisfied:

$0.015 < f/f1 < 0.085$ $0.80 < f/f2 < 1.10$ where f denotes a focal length of the imaging lens, f1 denotes a focal length of the first lens group, and f2 denotes a focal length of the second lens group.

2. The imaging lens according to claim 1, wherein the first lens group consists of a single positive lens component having a convex surface facing the object side.

3. The imaging lens according to claim 2, wherein the single positive lens component is a single lens.

4. The imaging lens according to claim 1, wherein at least a portion of the second lens group is moved toward the object side, thereby carrying out focusing from an infinity object to a close object.

5. The imaging lens according to claim 1, wherein the following conditional expression is satisfied:

$0.015 < f2/f1 < 0.085$ where f1 denotes a focal length of the first lens group, and f2 denotes a focal length of the second lens group.

6. The imaging lens according to claim 1, wherein the second lens group includes at least one aspherical surface.

7. The imaging lens according to claim 1, wherein the second lens group includes, in order from the object side, a negative meniscus lens having a convex surface facing the object side, a positive meniscus lens having a convex surface facing the object side, an aperture stop, a cemented lens constructed by a negative lens having a concave surface facing the object side cemented with a positive lens having a convex surface facing the image side, and a positive lens.

8. The imaging lens according to claim 1, wherein the following conditional expression is satisfied:

$2.50 < (r3F + r2R)/(r3F - r2R) < 3.80$ where r2R denotes a radius of curvature of the image side surface of the most object side lens component in the second lens group, and r3F denotes a radius of curvature of a lens surface adjacent to the image side of the image side surface.

9. The imaging lens according to claim 1, wherein the most object side lens component of the second lens group includes at least one aspherical surface.

10. The imaging lens according to claim 1, wherein the plurality of lens components in the second lens group includes at least one positive lens component, and the most image side positive lens component in the at least one positive lens component includes at least one aspherical surface.

11. The imaging lens according to claim 1, wherein the following conditional expression is satisfied:

$1.55 < TL/\Sigma d < 1.75$ where TL denotes a total lens length of the imaging lens, and $\Sigma d$ denotes a distance along an optical axis between the most object side lens surface in the first lens group and the most image side lens surface in the second lens group.

12. The imaging lens according to claim 1, wherein the following conditional expression is satisfied:

$4.00 < TL/Y\max < 5.00$ where TL denotes a total lens length of the imaging lens, and Ymax denotes the maximum image height of the imaging lens.

13. The imaging lens according to claim 1, wherein an aperture stop is disposed in the second lens group.

14. An optical apparatus equipped with the imaging lens according to claim 1.

15. An imaging lens comprising, in order from an object side:
    a first lens group having positive refractive power; and
    a second lens group having positive refractive power,
    the first lens group consisting of a single lens component having positive refractive power and having a convex surface facing an image side,
    the second lens group consisting of, in order from the object side, a negative meniscus lens having a convex surface facing the object side, a positive lens having a convex surface facing the object side, an aperture stop, a cemented lens constructed by a negative lens having a concave surface facing the object side cemented with a positive lens having a convex surface facing the image side, and a positive lens, and
    at least a portion of the second lens group being moved along an optical axis, thereby carrying out focusing from an infinity object to a close object.

16. An optical apparatus equipped with the imaging lens according to claim 15.

17. A method for manufacturing an imaging lens including, in order from an object side, a first lens group having positive refractive power and a second lens group having positive refractive power, the method comprising steps of:
    disposing the second lens group with consisting of a plurality of lens components;
    disposing the imaging lens with satisfying the following conditional expressions:

$0.015 < f/f1 < 0.085$ $0.80 < f/f2 < 1.10$ where f denotes a focal length of the imaging lens, f1 denotes a focal length of the first lens group, and f2 denotes a focal length of the second lens group; and fixing a position of the first lens group with respect to the image plane.

18. The method according to claim 17, further comprising a step of:
disposing the first lens group consisting of a single positive lens component having a convex surface facing the object side.

19. The method according to claim 17, further comprising a step of:
satisfying the following conditional expression:

$$0.015 < f/f1 < 0.085$$

where f1 denotes a focal length of the first lens group, and f2 denotes a focal length of the second lens group.

20. The method according to claim 17, further comprising a step of:
satisfying the following conditional expression:

$$2.50 < (r3F + r2R)/(r3F - r2R) < 3.80$$

where r2R denotes a radius of curvature of the image side surface of the most object side lens component in the second lens group, and r3F denotes a radius of curvature of a lens surface adjacent to the image side of the image side surface.

21. A method for manufacturing an imaging lens including, in order from an object side, a first lens group having positive refractive power and a second lens group having positive refractive power, the method comprising steps of:
disposing the first lens group consisting of a single positive lens component having a positive refractive power and having a convex surface facing an image side;
disposing the second lens group consisting of, in order from the object side, a negative meniscus lens having a convex surface facing the object side, a positive lens having a convex surface facing the object side, an aperture stop, a cemented lens constructed by a negative lens having a concave surface facing the object side cemented with a positive lens having a convex surface facing the image side, and a positive lens; and
moving at least a portion of the second lens group along an optical axis, thereby carrying out focusing from an infinity object to a close object.

22. An imaging lens comprising, in order from an object side:
a first lens group having positive refractive power; and
a second lens group having positive refractive power,
a position of the first lens group being fixed with respect to an image plane,
the second lens group consisting of a plurality of lens components, and
the following conditional expressions being satisfied:

$$0.015 < f/f1 < 0.085$$

$$1.55 < TL/\Sigma d < 1.75$$

where f denotes a focal length of the imaging lens, f1 denotes a focal length of the first lens group, TL denotes a total lens length of the imaging lens, and Σd denotes a distance along an optical axis between the most object side lens surface in the first lens group and the most image side lens surface in the second lens group.

23. An imaging lens comprising, in order from an object side:
a first lens group having positive refractive power; and
a second lens group having positive refractive power,
a position of the first lens group being fixed with respect to an image plane,
the second lens group consisting of a plurality of lens components, and
the following conditional expressions being satisfied:

$$0.015 < f/f1 < 0.085$$

$$4.00 < TL/Y\max < 5.00$$

where f denotes a focal length of the imaging lens, and f1 denotes a focal length of the first lens group, TL denotes a total lens length of the imaging lens, and Ymax denotes the maximum image height of the imaging lens group.

24. A method for manufacturing an imaging lens including, in order from an object side, a first lens group having positive refractive power and a second lens group having positive refractive power, the method comprising steps of:
disposing the second lens group with consisting of a plurality of lens components;
disposing the imaging lens with satisfying the following conditional expressions:

$$0.015 < f/f1 < 0.085$$

$$1.55 < TL/\Sigma d < 1.75$$

where f denotes a focal length of the imaging lens, f1 denotes a focal length of the first lens group, TL denotes a total lens length of the imaging lens, and Σd denotes a distance along an optical axis between the most object side lens surface in the first lens group and the most image side lens surface in the second lens group; and
fixing a position of the first lens group with respect to the image plane.

25. A method for manufacturing an imaging lens including, in order from an object side, a first lens group having positive refractive power and a second lens group having positive refractive power, the method comprising steps of:
disposing the second lens group with consisting of a plurality of lens components;
disposing the imaging lens with satisfying the following conditional expressions:

$$0.015 < f/f1 < 0.085$$

$$4.00 < TL/Y\max < 5.00$$

where f denotes a focal length of the imaging lens, f1 denotes a focal length of the first lens group, TL denotes a total lens length of the imaging lens, and Ymax denotes the maximum image height of the imaging lens; and
fixing a position of the first lens group with respect to the image plane.

* * * * *